(12) United States Patent
Siminoff et al.

(10) Patent No.: US 10,142,597 B2
(45) Date of Patent: *Nov. 27, 2018

(54) WIRELESS ENTRANCE COMMUNICATION DEVICE

(71) Applicant: Ring LLC, Santa Monica, CA (US)

(72) Inventors: James Siminoff, Pacific Palisades, CA (US); John Modestine, Los Angeles, CA (US); Changsoo Jeong, Rancho Palos Verdes, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/839,772

(22) Filed: Dec. 12, 2017

(65) Prior Publication Data

US 2018/0103239 A1    Apr. 12, 2018

Related U.S. Application Data

(63) Continuation of application No. 14/981,096, filed on Dec. 28, 2015, now Pat. No. 9,894,328, which is a continuation-in-part of application No. 14/499,828, filed on Sep. 29, 2014, now Pat. No. 9,584,775, which is a continuation-in-part of application No. 14/334,992, filed on Jul. 18, 2014.

(60) Provisional application No. 61/847,816, filed on Jul. 18, 2013.

(51) Int. Cl.
*H04N 7/18* (2006.01)
*H04M 1/02* (2006.01)
*H04M 11/02* (2006.01)

(52) U.S. Cl.
CPC .......... *H04N 7/186* (2013.01); *H04M 1/0291* (2013.01); *H04M 11/025* (2013.01)

(58) Field of Classification Search
CPC ........................... H04N 7/186; H05B 37/0227
See application file for complete search history.

(56) References Cited

U.S. PATENT DOCUMENTS

| | | | | |
|---|---|---|---|---|
| 5,276,427 A | * | 1/1994 | Peterson | G08B 13/2494 340/506 |
| 2002/0135476 A1 | * | 9/2002 | McKinney, Jr. | H05B 37/0227 340/540 |
| 2007/0008081 A1 | | 1/2007 | Tylicki et al. | |

(Continued)

*Primary Examiner* — Maria El-Zoobi
(74) *Attorney, Agent, or Firm* — Chong IP Law, LLP

(57) ABSTRACT

A device for communicating including a housing including a camera, a microphone, a speaker, a button, a battery, a sensor, non-volatile memory, a processor, and a wireless communications module, wherein the non-volatile memory stores code operable by the processor for switching the processor from low-power mode to active mode in response to an activation trigger, receiving, from the one of the microphone and the camera, outbound audio and video signals, then sending a signal to a server via the wireless communications module during active mode, the signal including one or more of an alert signal, a signal based on the outbound audio signal, and a signal based on the outbound video signal, receiving from the server an inbound audio signal and outputting a signal based on the inbound audio signal via the speaker, and switching the processor from active mode to low-power mode in response to a deactivation trigger.

20 Claims, 43 Drawing Sheets

(56) References Cited

U.S. PATENT DOCUMENTS

| | | | |
|---|---|---|---|
| 2010/0195810 A1* | 8/2010 | Mota | H04N 7/186 |
| | | | 379/167.12 |
| 2010/0225455 A1 | 9/2010 | Claiborne et al. | |
| 2014/0267716 A1 | 9/2014 | Child et al. | |
| 2015/0163463 A1 | 6/2015 | Hwang et al. | |
| 2016/0283074 A1* | 9/2016 | Drive | G08B 13/19693 |

* cited by examiner

WIRELESS ENTRANCE COMMUNICATION DEVICE

CROSS-REFERENCE TO RELATED APPLICATIONS

This application is a Continuation of application Ser. No. 14/981,096 filed on Dec. 28, 2015, which is a Continuation In Part of U.S. Non-provisional application Ser. No. 14/499,828 filed Sep. 29, 2014, which is a Continuation In Part of U.S. Non-provisional application Ser. No. 14/334,922 filed Jul. 18, 2014, and claims the benefit of earlier filed U.S. Provisional Application No. 61/847,816, filed on Jul. 18, 2013, all of which are incorporated by reference herein in their entirety.

BACKGROUND

Home safety is a concern for many homeowners and renters. Those seeking to protect or monitor their homes often wish to have video and audio communications with visitors, for example, those visiting an external door or entryway. Existing wireless intercom systems require installation and configuration of multiple devices placed throughout the home that must operate together. Wireless intercom systems that use Wi-Fi communication require hard wiring to a power source and are thereby limited in placement. Therefore, it may be desirable to have a door monitor that may operate independently and consumes reduced energy.

SUMMARY OF DISCLOSURE

A device for communicating including a housing including a camera, a microphone, a speaker, a button, a battery, a sensor, non-volatile memory, a processor, and a wireless communications module, wherein the non-volatile memory stores code operable by the processor for switching the processor from low-power mode to active mode in response to an activation trigger, receiving, from the one of the microphone and the camera, outbound audio and video signals, then sending a signal to a server via the wireless communications module during active mode, the signal including one or more of an alert signal, a signal based on the outbound audio signal, and a signal based on the outbound video signal, receiving from the server an inbound audio signal and outputting a signal based on the inbound audio signal via the speaker, and switching the processor from active mode to low-power mode in response to a deactivation trigger.

In a first aspect, a method for a client device associated with a doorbell comprising a plurality of motion sensors, the method for modifying motion detection sensitivity of the doorbell is provided, the method comprising: displaying, on a graphical user interface (GUI) displayed on a display of the client device, a plurality of motion zones, wherein each of the motion zones represents a range of motion detection for a field of view of at least one of the motion sensors of the doorbell; receiving an input to adjust the range of motion detection of the motion sensors; determining whether any of the plurality of motion zones is selected for motion detection; and adjusting, based on the received input, the range of motion detection for at least a subset of the motion sensors that is associated with the selected motion zone or zones In an embodiment of the first aspect, the method comprises receiving an input to save the adjusted motion detection range as a current motion detection sensitivity of the doorbell.

In another embodiment of the first aspect, the receiving the input to adjust the range comprises receiving an input to increase a distance within which the motion sensors detect motion.

In another embodiment of the first aspect, the receiving the input to adjust the range comprises receiving an input to decrease a distance within which the motion sensors detect motion.

In another embodiment of the first aspect, the method further comprises displaying, on the GUI, a slider for adjusting the range, and wherein receiving the input to adjust the range comprises receiving movement of the slider.

In another embodiment of the first aspect, the selected motion zone or zones are displayed differently on the GUI than unselected motion zones.

In another embodiment of the first aspect, the selected motion zone or zones are displayed in a darker color on the GUI and unselected motion zones are displayed in a lighter color on the GUI.

In another embodiment of the first aspect, the plurality of motion zones comprises displaying, on the GUI, a diagram comprising boundary lines that separate the motion zones and each motion zone is enumerated with a unique zone number.

In another embodiment of the first aspect, the diagram further comprises an indicator for each of the motion zones, the indicator for indicating whether the motion zone is selected or unselected.

In another embodiment of the first aspect, the adjusting the range of motion detection of motion sensors that are associated with the selected motion zone or zones comprises adjusting a motion detection distance from the doorbell for each motion sensor that is associated with the selected motion zone or zones.

In another embodiment of the first aspect, the client device receives a motion alert from each motion sensor that is associated with the selected motion zone or zones when the motion sensor detects motion within the motion detection range of the motion sensor.

In another embodiment of the first aspect, the method further comprises receiving an input to select one of the unselected motion zones.

In a second aspect, an non-transitory machine-readable medium of a client device associated with a doorbell comprising video camera and a plurality of motion sensors is provided, the non-transitory machine-readable medium storing a program executable by at least one processing unit of the client device, the program comprising sets of instructions for: displaying, on a graphical user interface (GUI) displayed on a display of the client device, a plurality of motion zones, wherein each of the motion zones represents a range of motion detection for a field of view of at least one of the motion sensors of the doorbell, and wherein when any of the motion sensors detects motion within the motion detection range of the motion sensor, the camera starts capturing video images of an area within a field of view of the video camera; receiving an input to increase the range of motion detection of the motion sensors; determining whether any of the plurality of motion zones is selected for motion detection; and increasing, based on the received input, the range of motion detection for at least a subset of the motion sensors that is associated with the selected motion zone or zones.

In an embodiment of the second aspect, the plurality of motion sensors comprises at least one Passive Infrared (PIR) motion sensor.

In another embodiment of the second aspect, the program further comprises a set of instructions for receiving an input to save the adjusted motion detection range as a current motion detection sensitivity of the doorbell.

In another embodiment of the second aspect, the program further comprises a set of instructions for displaying, on the GUI, numbers that are indicative of minimum and maximum motion detection ranges of the motion sensors.

In another embodiment of the second aspect, the program further comprises a set of instructions for receiving an input to decrease the range of motion detection of the motion sensors.

In another embodiment of the second aspect, the set of instructions for receiving the input to adjust the range comprises sets of instructions for: displaying, on the GUI, a slider for adjusting the range; and receiving movement of the slider.

In another embodiment of the second aspect, the set of instructions for displaying the plurality of motion zones comprises a set of instructions for displaying, on the GUI, a diagram comprising boundary lines that separate the motion zones and each motion zone is enumerated with a unique zone number.

In another embodiment of the second aspect, the program further comprises a set of instructions for receiving a motion alert from each motion sensor that is associated with a selected motion zone when the motion sensor detects motion within the motion detection range of the motion sensor.

DETAILED DESCRIPTION

Figure 1:
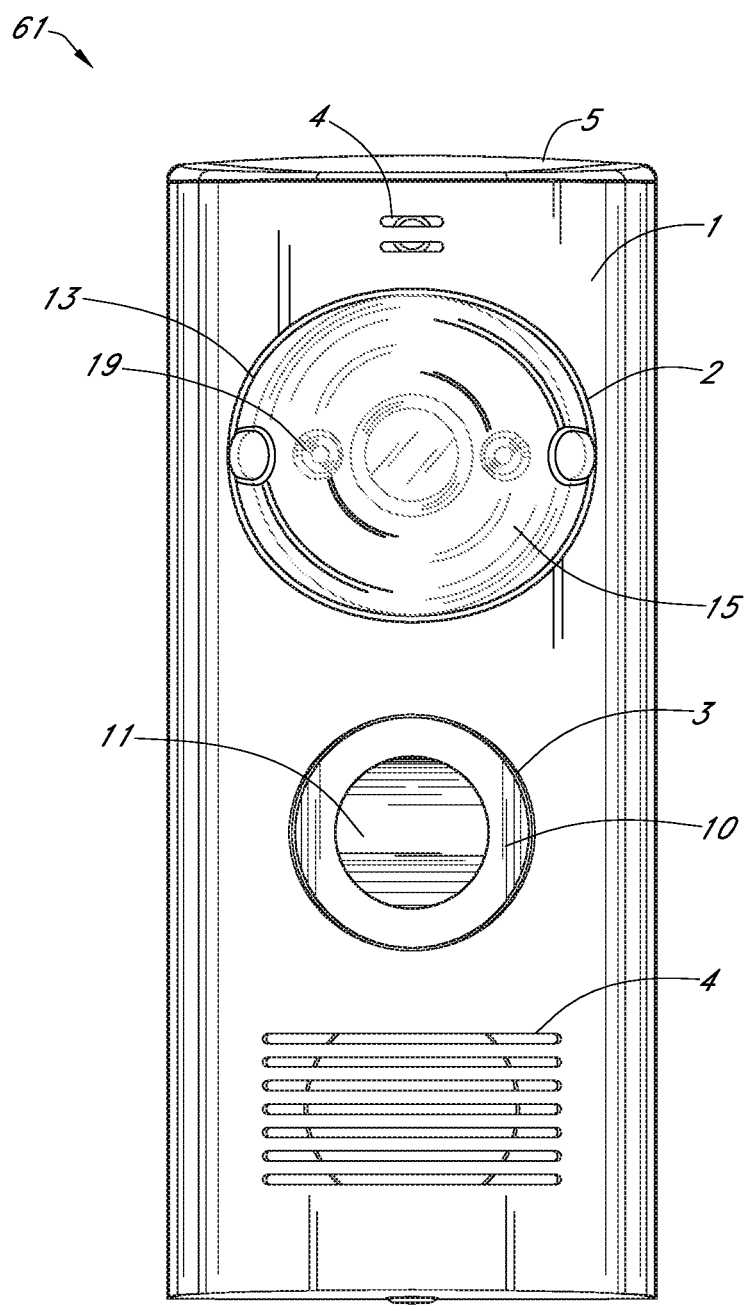
FIG. 1 is a front view of Wireless Communication Doorbell according to an aspect of the present disclosure.

FIG. 1 shows a front view of the Wireless Communication Doorbell 61 according to an aspect of present disclosure. The Wireless Communication Doorbell 61 may have Faceplate 1 mounted to Housing 5. Faceplate 1 may be but not limited to brushed aluminum, stainless steel, wood or plastic. Faceplate 1 may contain Perforated Pattern 4 oriented to allow sound to travel in and out of Housing 5 to Microphone 21 and from Speaker 20. Faceplate 1 may be convex and include Button Aperture 3 to allow Button 11 and Light Pipe 10 to mount flush to Faceplate 1. Button 11 and Light Pipe 10 may have convex profiles to match the convex profile of Faceplate 1. Button 11 may be coupled to Housing 5 and may have a stem that protrudes through Housing 5, so Button 11 may make contact with Button Actuator 12 when Button 11 is pressed by Visitor 63. When Button 11 is pressed and makes initial contact with Button Actuator 12, Button Actuator 12 may activate or "wake" components within Wireless Communication Doorbell 61 such as Surface Mount LEDs 9. When Button 11 is pressed, Button Actuator 12 may trigger the activation of Surface Mount LED's 9, mounted to Microcontroller 22 within Housing 5, to illuminate Light Pipe 10. Light Pipe 10 is a transparent ring that encases Button 11. Light Pipe 10 may be any material capable of projecting light, such as transparent plastic, from Surface Mount LEDs 9 out to exterior front face of Wireless Communication Doorbell 61. In one aspect, Faceplate 1 may have multiple Button 11's, each of which may contact a different User 62, in the case of multiple tenant facilities.

Still referencing FIG. 1, Wireless Communication Doorbell 61 may be triggered to wake through Infrared Sensor 42, installed within Housing 5. Infrared Sensor 42 may trigger Camera 18 to record live video or still images of Visitor 63 when Visitor 63 crosses the path of the Infrared Sensor 42. Faceplate Dome Aperture 2, located on the front face of Faceplate 1, allows Clear Dome 13 to protrude from the interior of Housing 5. Clear Dome 13 is a transparent dome shaped component, made of injection molded plastic, glass, or any other material with transparent characteristics. Clear Dome 13 couples to the interior of Housing 5 using screws, fasteners or adhesives, and protrudes through Housing Dome Aperture 6. Camera Ball Assembly 15 may sit within Clear Dome 13 concentrically and share the same origin. Camera Ball Assembly 15 may be smaller in diameter compared to Clear Dome 13, allowing Camera Ball Assembly 15 to rotate and pivot in any direction. Clear Dome 13 protects Camera Ball Assembly 15 against weather elements such as rain and snow. Clear Dome 13 may be transparent to allow for Camera 18, mounted within Camera Ball Assembly 15 to view Visitors 63. Night Vision LEDs 19, also mounted with Camera Ball Assembly 15 may be activated by Microcontroller 22, depending on the time of day, to help illuminate the area in front of Wireless Communication Doorbell 61.

Figure 2:
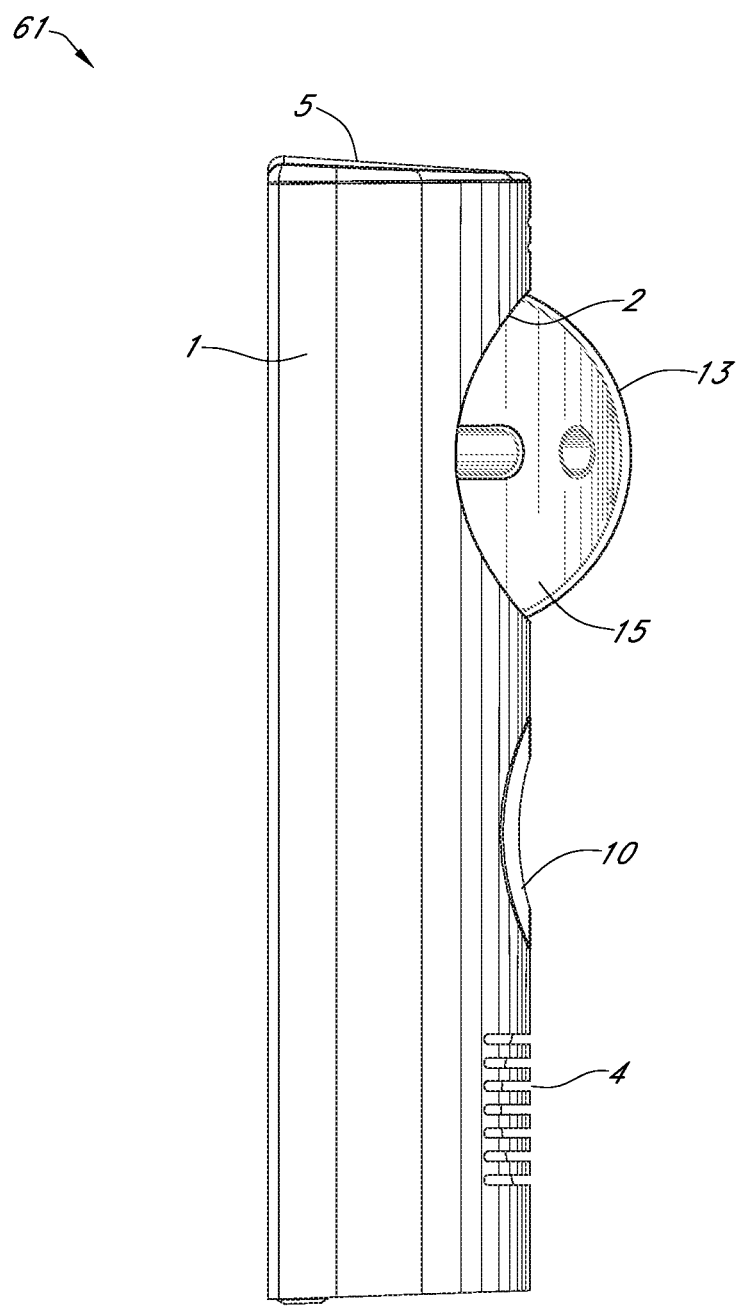
FIG. 2 is a side view of Wireless Communication Doorbell according to an aspect of the present disclosure.

FIG. 2 is a side profile of Wireless Communication Doorbell 61 according to an aspect of the present disclosure. Faceplate 1 may extend around the side of Housing 5, and may be coupled to Housing 5 at the rear of the device. As described in further detail in FIG. 3, Faceplate 1 may be inset into Housing 5 so the top of housing 5 transitions flush into Faceplate 1. Faceplate Dome Aperture 2 allows Camera Assembly 15 and Clear Dome 13 protrude out over Housing 5 and Faceplate 1 to provide maximum visibility. Housing 5 may contain the inset depth required to encase Housing Enclosure 28 and Mounting Plate 35 when all components are coupled together. In this aspect, when Wireless Communication Doorbell 61 is mounted to a mountable surface, Wireless Communication Doorbell 61 sits flush with the surface.

Figure 3:
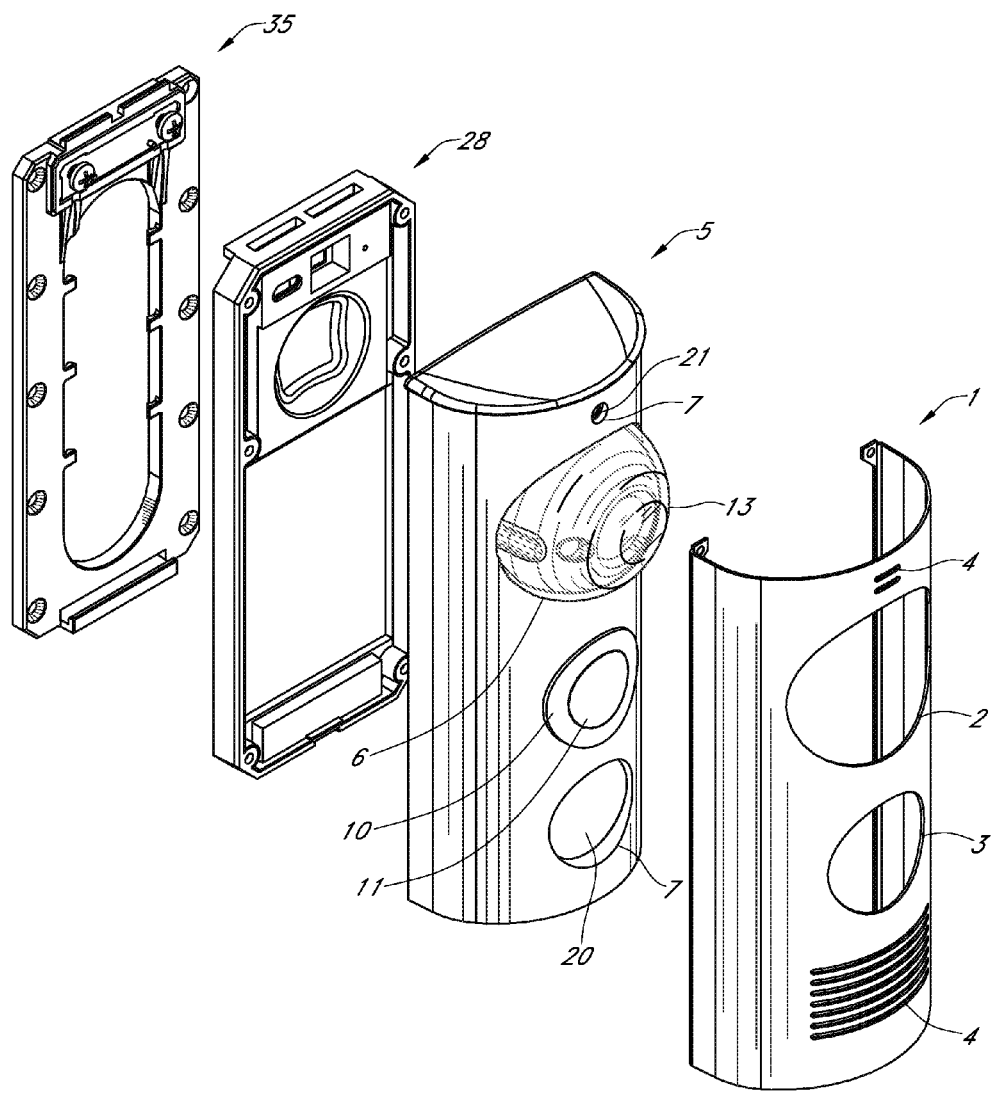
FIG. 3 is an exploded view of Wireless Communication Doorbell according to an aspect of the present disclosure.

FIG. 3 is an exploded view of Wireless Communication Doorbell 61 according to an aspect of the present disclosure. Faceplate 1 and Housing Enclosure 28 may couple to Housing 5 using fasteners, screws or adhesives. Mounting Plate 35 may be mounted to a mountable surface such as wood, concrete, stucco, brick and vinyl siding using fasteners, screws, or adhesives. The assembly consisting of Faceplate 1, Housing 5 and Housing Enclosure 28 may then be coupled to Mounting Plate 35 using fasteners, screws, or adhesives. As shown in FIG. 2, Housing 5 may contain the inset depth required to encase Housing Enclosure 28 and Mounting Plate 35 when all components are coupled together. In this aspect, when Wireless Communication Doorbell 61 is mounted to a mountable surface, Wireless Communication Doorbell 61 sits flush with the surface.

Still referencing FIG. 3, Faceplate 1 may extend around the side of Housing 5, and may be coupled to Housing 5 at the rear of the device using fasteners, screws or adhesives. Housing 5 may have a protruding lip on the top surface so that Faceplate 1 sits below said protruding lip. Faceplate 1 may contain Perforated Pattern 4 positioned to allow audio to be transmitted via Audio Apertures 7. Housing 5 may have Audio Apertures 7 oriented on the front face of Housing 5 to allow audio to be emitted to and from Speaker 20 and Microphone 21. Housing Dome Aperture 6 may be located on the front face of Housing 5 to allow Clear Dome 13 and Camera Assembly 15 to protrude through Housing 5. Housing Dome Aperture 6 may be positioned on the front face of Housing 5 to line up with Faceplate Dome Aperture 2, to allow Clear Dome 13 and Camera Assembly 15 to protrude through Housing 5. Light Pipe 10 and Button 11 may be mounted to the front face of Housing 5, and may be oriented so it may protrude through Button Aperture 3 on Faceplate 1.

Figure 4:
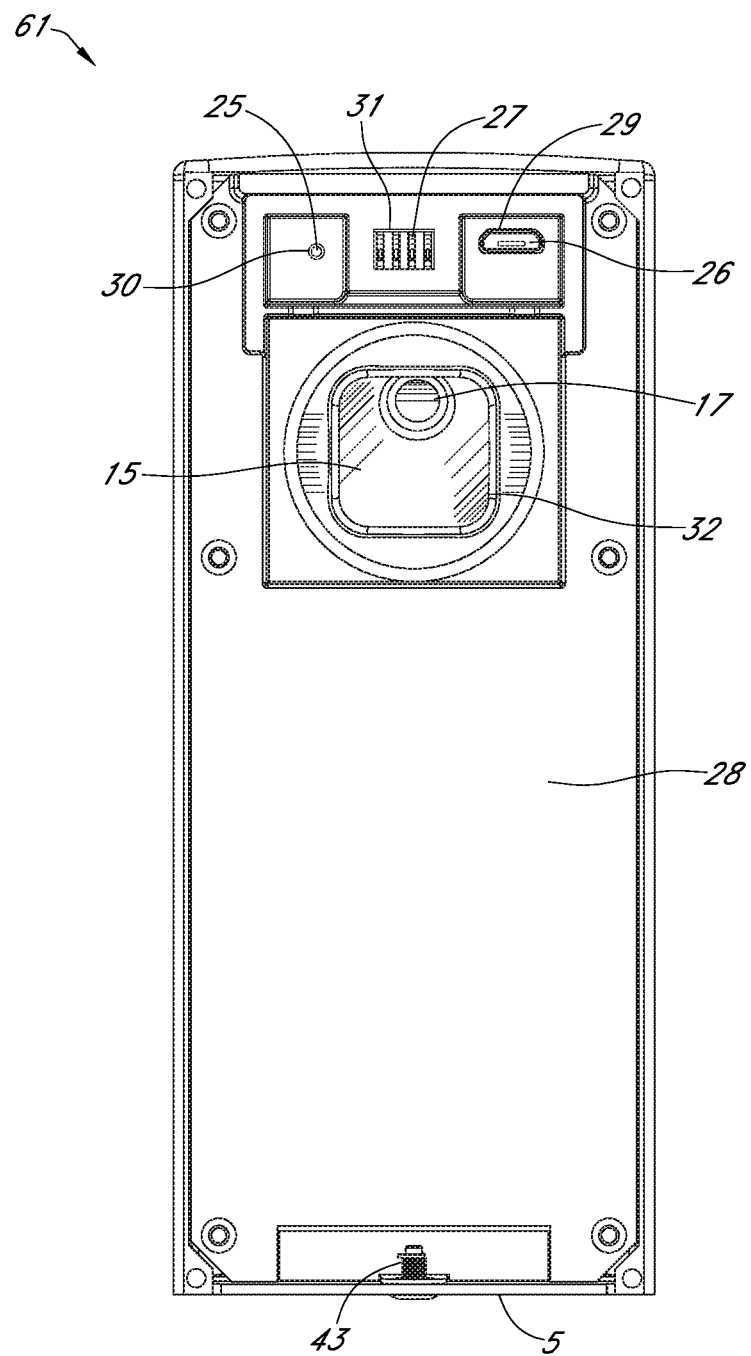
FIG. 4 is a back view of Wireless Communication Doorbell without the Mounting Plate according to an aspect of the present disclosure.

FIG. 4 shows a back view of Wireless Communication Doorbell 61 without Mounting Plate 35, according to an aspect of the present disclosure. In this view Housing Enclosure 28 is set into Housing 5, which protects Wireless Communication Doorbell 61 from weather elements. Housing Enclosure 28 may be coupled to Housing 5 using screws, fasteners, or adhesives.

Housing Enclosure 28 contains USB Input Port 29 that provides access to Micro USB Input 26. Micro USB Input 26 is mounted within Housing 5 and charges Battery 24 (not shown in FIG. 3) when a Micro USB connector (not shown) providing power, is plugged into Micro USB Input 26.

Figure 12:
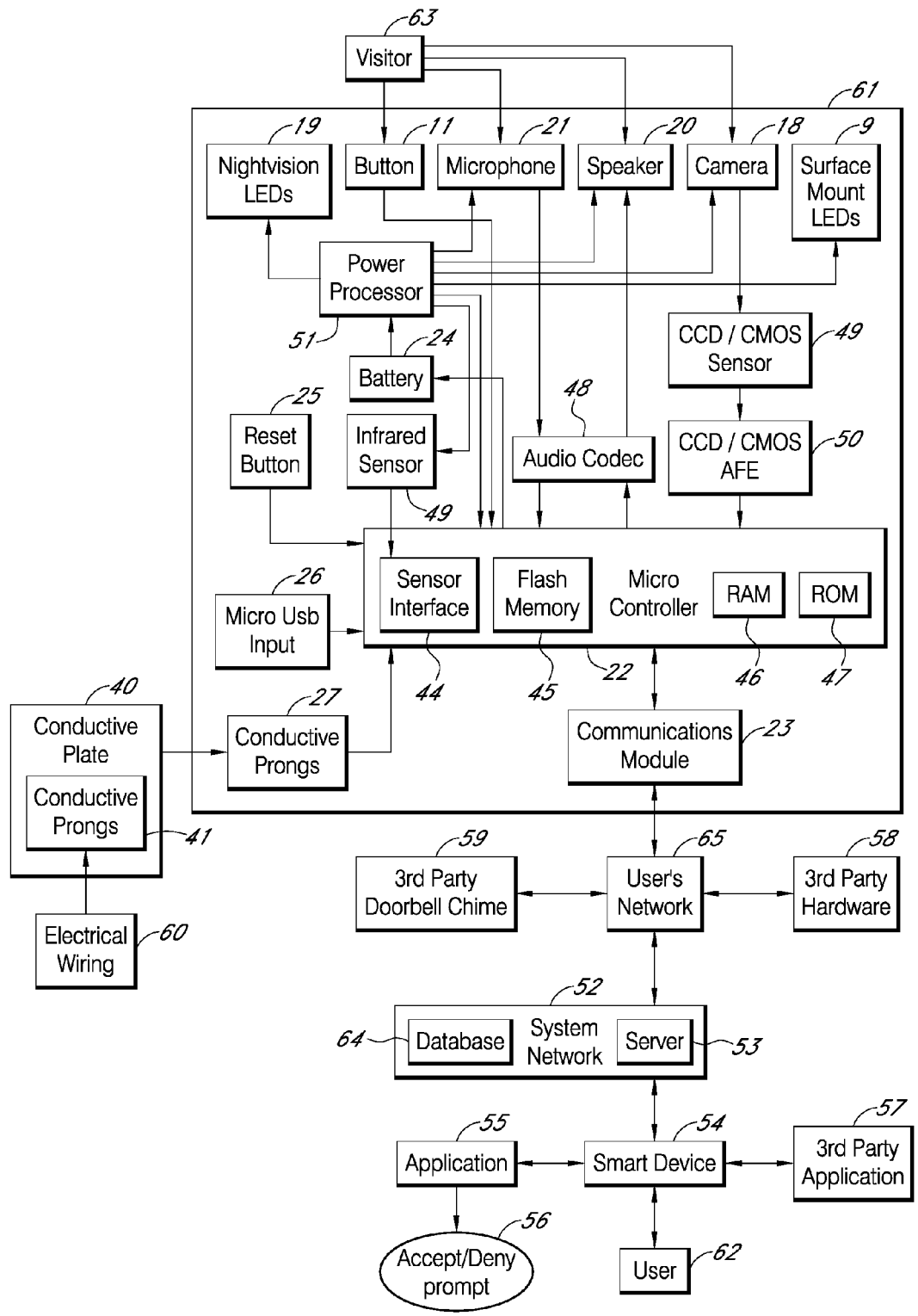
FIG. 12 is an entity relationship diagram displaying components and multiple devices in communication according to the system and method of present disclosure.

Micro USB Input 26 may be used to install software onto Flash Memory 45, RAM 46 and ROM 47 (shown in FIG. 12). In one aspect of the present disclosure, Micro USB Input 26 may be but not limited to a USB port, audio jack, ac adapter or any other input capable of transferring power and or data to Wireless Communication Doorbell 61.

Housing Enclosure 28 may provide access to Reset Button 25, located within Housing 5. Reset Button 25 may protrude through Reset Button Port 30, positioned on an exterior face of Housing Enclosure 28. Reset Button 25 may allow User 62 to remove settings associated to User 62, such as User's Network 65 credentials, account settings and unique identifying information such as User 62's ip address. In reference to FIG. 12, Reset Button 25 is connected to Microcontroller 22, located within Housing 5. When Reset Button 25 is pressed by User 62, Microcontroller 22 may be triggered to erase any data stored by User 62 in Flash Memory 45, RAM 46 and ROM 47, such as doorbell audio chimes, audio messages and any other audio data. In this aspect, Microcontroller 22 may disconnect Communications Module 23 from User's Network 65, disabling any wireless communication to and from Wireless Communication Doorbell 61 to Smart Device 54.

Still referencing FIG. 4, User 62 may be able to manually rotate Camera 18 in the direction of their choice prior to mounting Wireless Communication Doorbell 61 to Mounting Plate 35. Camera 18 is mounted within Camera Ball Assembly 15, which is located within Housing 5. As explained in further detail in FIG. 9 and FIG. 11, when fastened to Housing 5, Housing Enclosure 28 may be arranged against the backside of Camera Assembly 15, mimicking the spherical profile of Camera Assembly 15 to allow for concentric mating. Housing Enclosure 28 may feature Rotation Dimple Access Port 32, which allows User 62 to access Camera Ball Assembly Rotation Dimple 17. Camera Ball Assembly Rotation Dimple 17 is embodied on the back of Camera Ball Assembly 15 and protrudes through Rotation Dimple Access Port 32 to allow access to User 62. Camera Ball Assembly Rotation Dimple 17 is a protruding body that acts like a handle to allow User 62 to rotate Camera Ball Assembly 15 about within Housing 5.

As shown in FIG. 4 through FIG. 7, Wireless Communication Doorbell 61 may be locked in place by Hex Screw 43, which may protrude through Hex Key Port 8 (shown in FIG. 7) positioned on the bottom surface of Housing 5. Hex Screw 43 may protrude through Hex Key Port 8, and wedge Mounting Plate Lip 33 of Mounting Plate 35 (shown in FIG. 7) up against the bottom of Housing Enclosure 28, locking the entire assembly in place. Hex Screw 43 may be any type of fastener capable of securing Mounting Plate 35 to Housing 5 such as but not limited to allen key bolts, carriage bolts, phillips head screws, flat head screws, socket screws and torx screws amongst other screw sets.

Figure 5:
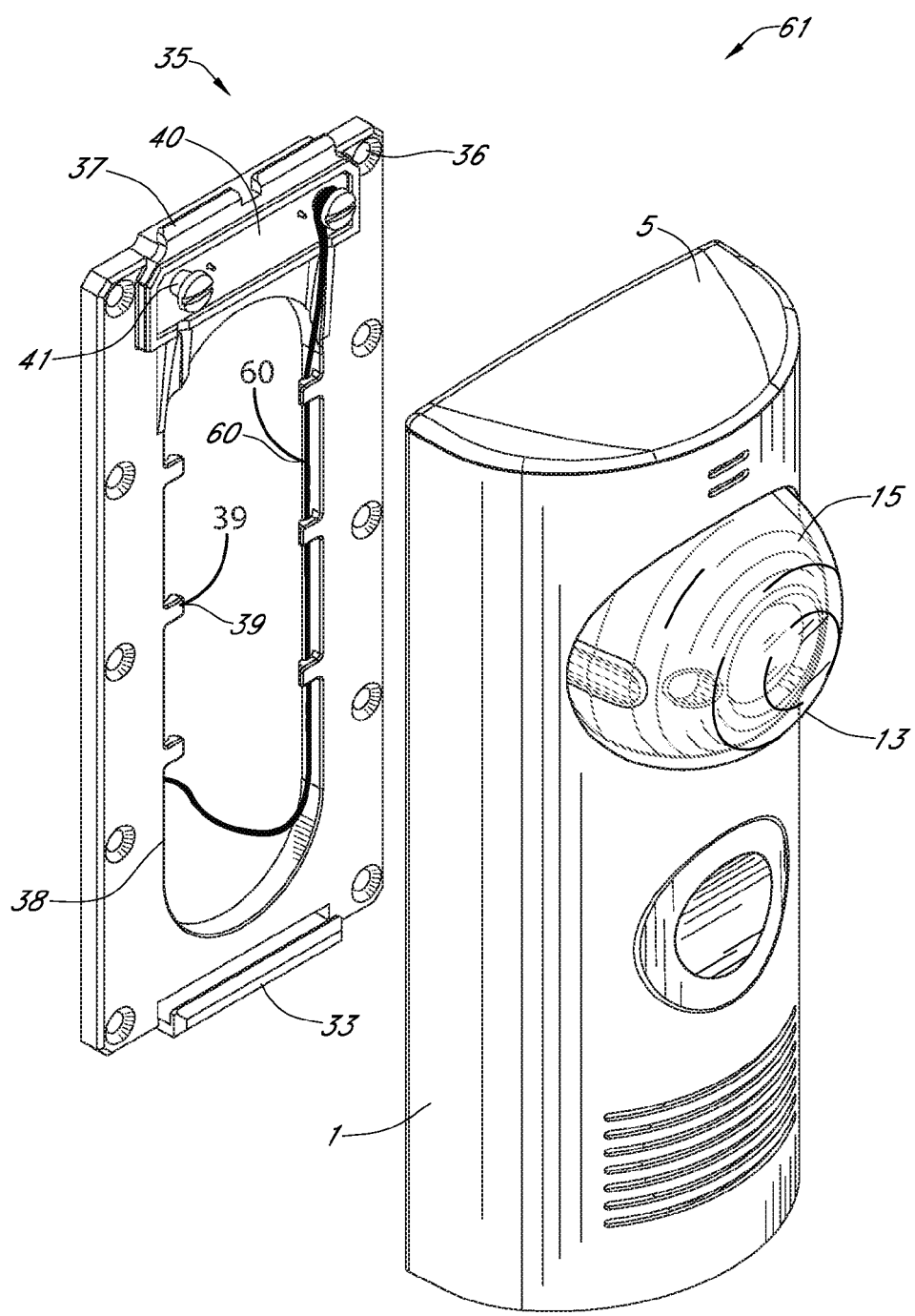
FIG. 5 is a front perspective view of Wireless Communication Doorbell and Mounting Plate according to an aspect of the present disclosure.

In reference to FIG. 4 and FIG. 5, Wireless Communication Doorbell 61 may be continually powered or charged by hard-wiring Wireless Communication Doorbell 61 directly to Electrical Wiring 60, such as to an AC or DC electrical circuit. In this aspect, Electrical Wiring 60, drawing power from the building that Wireless Communication Doorbell 61 may be mounted to, must be present. This connection is made by sending an electric current from Electrical Wiring 60 to Conductive Prongs 27, located within Housing 5. Conductive Prongs 27 protrude through Conductive Prong Port 31 on Housing Enclosure 28. Conductive Prongs 27 are flexible contacts that may be any material capable of transferring an electric current to Battery 24, when in contact with another conductive surface holding an electric charge.

FIG. 5 shows a front perspective view of Wireless Communication Doorbell 61 and Mounting Plate 35 according to an aspect of the present disclosure. Mounting Plate 35 may be any material capable of supporting Wireless Communication Doorbell 61 such as plastic, metal or wood. Mounting Plate 35 may have multiple Mounting Plate Screw Ports 36, to allow user 62 to securely mount Mounting Plate 35 to an exterior surface using fasteners such as screws, bolts or nails. In a preferred embodiment, the exterior surface that Mounting Plate 35 is mounted to may be adjacent to an exterior door of a building. When Mounting Plate 35 is secured to a surface, Wireless Communication Doorbell 61 may couple to Mounting Plate 61 by inserting Mounting Plate Extrusions 37, positioned atop of Mounting Plate 35, into apertures positioned atop of Housing 5. Mounting Plate Lip 33, positioned on the bottom of Mounting Plate 35 may then be wedged up against the bottom of Housing 5 by pressure applied by the insertion of Hex Screw 43 into Hex Key Port 8.

In reference to FIGS. 4 and 5, if User 62 powers and or charges Wireless Communication Doorbell 61 using Electrical Wiring 60, Wire Access Port 38 may provide an aperture to run Electrical Wiring 60 from mounting surface to connect to Conductive Screws 41. Wire Guides 39, designed as a component of Mounting Plate 35, may protrude on adjacent sides of Wire Access Port 38 and provide a track to guide Electrical Wires 60 up to Conductive Screws 41, which may be secured near the top of Mounting Plate 35. User 62 may wrap Electrical Wires 60 around Conductive Screws 41, transferring electric current to Conductive Fittings 41. Conductive Fittings 41 are fastened to Mounting Plate 35 using screws, fasteners or adhesives. Conductive Fittings 41 may make direct contact with Conductive Plate 40, transferring electric current to Conductive Plate 40. When Wireless Communication Doorbell 61 is mounted to Mounting Plate 35, Conductive Plate 40 makes direct contact with Conductive Prongs 27, which protrudes through Conductive Prong Port located on the back face of Housing Enclosure 28. Direct contact between Conductive Plate 40 and Conductive Prongs 27 may result in the electric current derived from Electrical Wiring 60 being delivered to Conductive Prongs 27, which may provide electricity to charge or power Wireless Communication Doorbell 61.

Figure 6A:
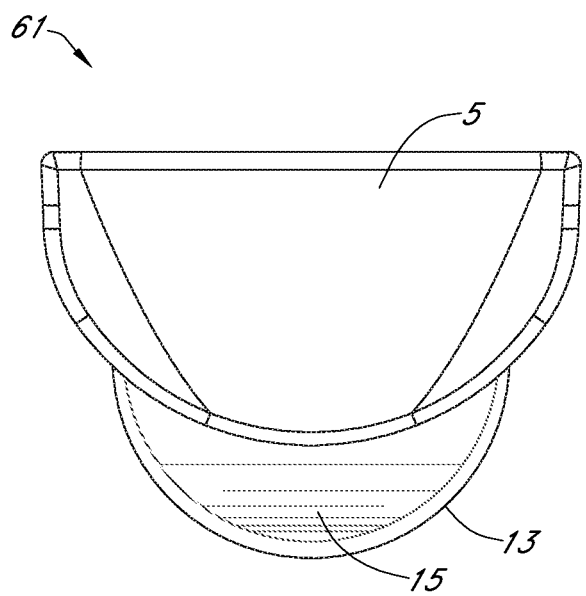
FIG. 6a is a top view of Wireless Communication Doorbell according to an aspect of the present disclosure.

FIG. 6a shows a top view of Wireless Communication Doorbell 61 according to an aspect of present disclosure. As described above in reference to FIG. 1, Housing 5 and Faceplate 1 may have a convex shape. Housing 5 is not limited to this profile, as all components described herein may be arranged within housings with other profiles, such as concave or flat. Housing 5 may have a protruding lip on the top surface so that Faceplate 1 sits below said protruding lip. In one aspect of the present disclosure, Faceplate 1 may be positioned to rest above Housing 5, as so the transition from housing 5 to Faceplate is not flush. The lip created may prevent water or other weather elements from flowing over Faceplate 1. In this aspect, Housing 5 may contain an inset trough, positioned atop Housing 5, to channel water flow around the sides of Wireless Communication Doorbell 61.

Figure 6B:
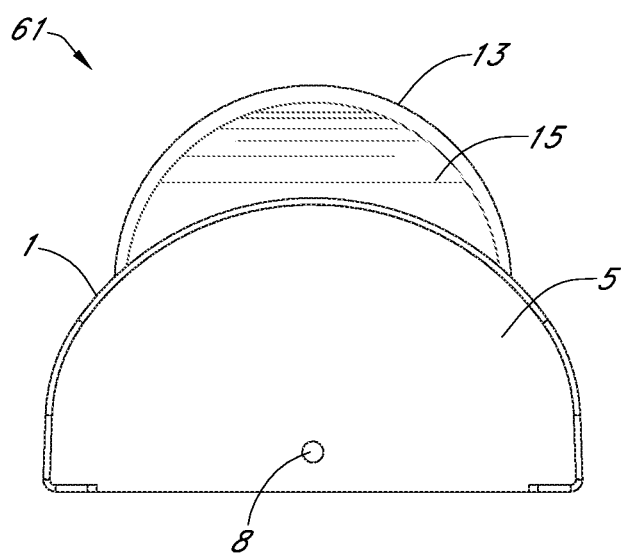
FIG. 6b is a bottom view of Wireless Communication Doorbell according to an aspect of the present disclosure.

FIG. 6b shows a bottom view of Wireless Communication Doorbell 61 according to an aspect of present disclosure. In this view, the bottom of the Wireless Communication Doorbell 50 features Hex Key Port 8. Hex Key Port 8 may couple Housing 5 to Mounting Plate 35, when Hex Screw 43 is securely fastened through Hex Key Port 8. Faceplate 1 may wrap around the front and sides of Housing 5, and may be secured to the back of Housing 5 using screws, fasteners or adhesive. In one non limiting aspect of the present disclosure, Faceplate 1 may be removed, and faceplates of different colors or materials may replace Faceplate 1 on Housing 5.

Figure 7:
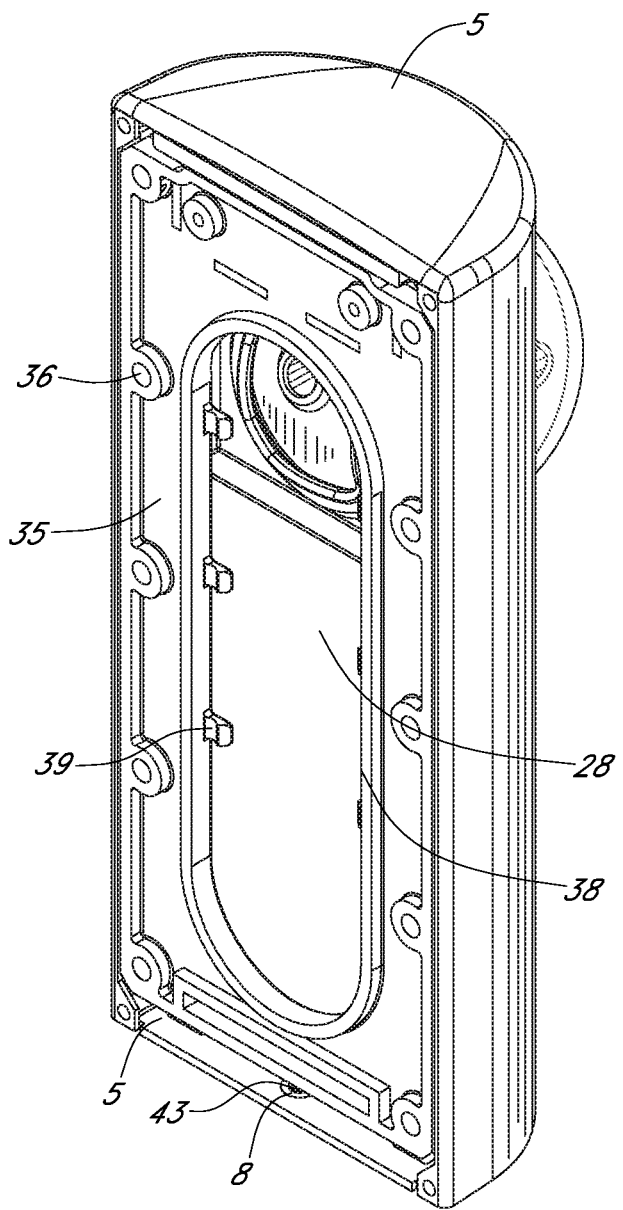
FIG. 7 is a back perspective view of Wireless Communication Doorbell according to an aspect of the present disclosure.

FIG. 7 shows a back perspective view of Wireless Communication Doorbell 61 coupled to Mounting Plate 35, according to an aspect of present disclosure. As described above in FIG. 6b, Faceplate 1 wraps around the back of Housing 5 and is secured using screws or fasteners. In one aspect of the present disclosure, Faceplate 1 may be adhered to Housing 5 without using fasteners. Faceplate 1 may be magnetically adhered, glued, or snapped onto Housing 5 without the need to wrap Faceplate 1 around the back of Housing 5.

Mounting Plate 35 may have multiple Mounting Plate Screw Ports 36, to allow user 62 to securely install Mounting Plate 35 to an exterior surface using fasteners, screws or adhesives. In one aspect, Mounting Plate 35 sits inside Housing 5 when Wireless Communication Doorbell 61 is mounted to Mounting Plate 35, so Wireless Communication Doorbell 61 sits flush against the User 62's preferred mounting surface such as a doorway, wall or an exterior or a structure. Hex Screw 43 may be fastened through Hex Key Port on the bottom of Housing 5 and tightened up against the bottom of Mounting Plate 35 to secure Wireless Communication Doorbell 61. Wire Access Port 38 may have Wire Guides 39 protruding from adjacent side walls of Wire Access Port 38 to assist in guiding Electrical Wires 60 up to Conductive Fittings 41 (shown in FIG. 5).

Figure 8:
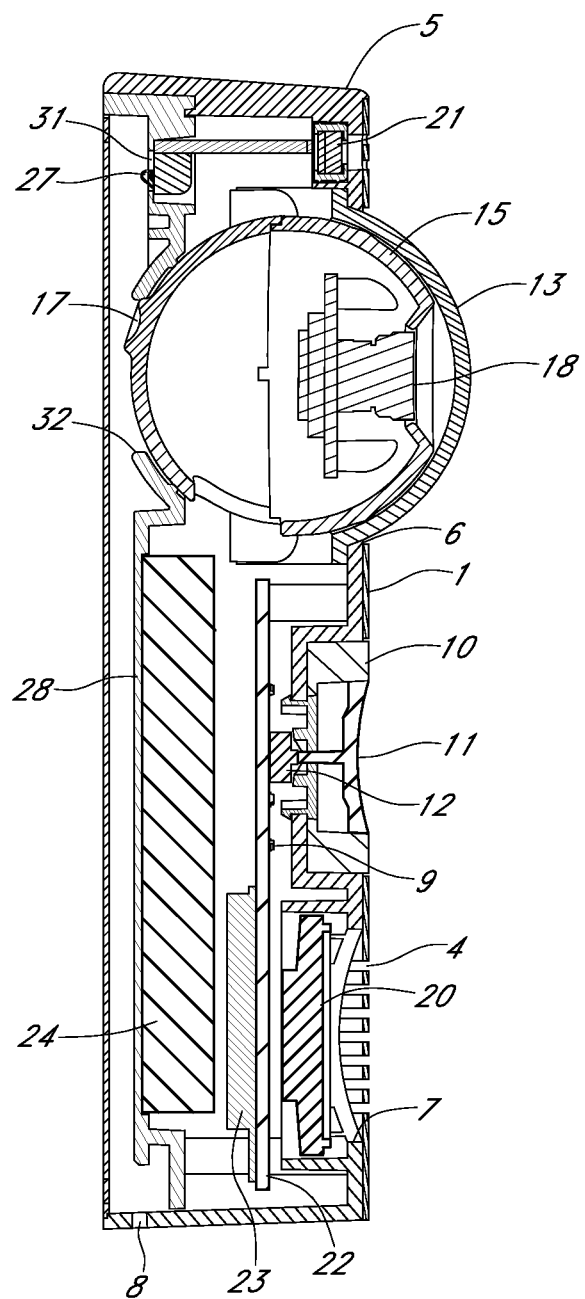
FIG. 8 is a cross sectional view from the side of the Camera Ball Assembly and Wireless Communication Doorbell according to an aspect of the present disclosure.

FIG. 8 displays a section view of Wireless Communication Doorbell according to an aspect of present disclosure. Housing 5 may be made of any non porous material, such as injection molded plastic, milled aluminum, metal or wood. Housing 5 may be capable of protecting all components within Wireless Communication Doorbell 61 from weather elements, without limiting the functionality of the components. Housing 5 may have Audio Aperture 7 to allow for audio emitted from Visitor 63 to be received by Microphone 21, as well as Audio Aperture 7 for emitting audio through Speaker 20 to Visitor 63. If Faceplate 1 is mounted to Housing 5, Faceplate 1 may have Perforated Pattern 4 that channels sound to and from the Wireless Communication Doorbell 61. Microphone 21 and Speaker 20 are mounted within Housing 5 and are connected to Microcontroller 22. Audio data is received wirelessly by Wireless Communication Doorbell 61 and processed by Communications Module 23 and Microcontroller 22. Microcontroller may then send the audio signal to Speaker 20 where it is then delivered to Visitor 63. When Visitor 63 responds, the audio is received by Microphone 21 and Microcontroller 22, processed and transmitted wirelessly by Communications Module 23.

Housing 5 may contain an inset portion on the exterior front face, positioned to align with Button Aperture 3 on Faceplate 1. Button 11 and Led Light Pipe 10 may be mounted within the inset portion and protrude through Button Aperture 3. Button 11 may have an extruded stem on the back face, which may protrude through Housing 5, and make contact with Button Actuator 12 when pressed by Visitor 63. Button Actuator 12 may be mounted to Microcontroller 22 within Housing 5, and when activated may trigger multiple components within Wireless Communication Doorbell 61 to activate. Such components include the activation of Camera 18, Night Vision LEDs 19, Communications Module 23, Speaker 20, Microphone 21, and Surface Mount LEDs 9. Surface Mount LEDs 9 are mounted to Microcontroller 22, upon activation, they illuminate Light Pipe 10 which protrudes through Button Aperture 3 along with Button 11. Light Pipe 10 is an extruded transparent ring that encases Button 11. Light Pipe 10 may be any material capable of projecting light, such as glass or transparent plastic, from Surface Mount LEDs 9 out to exterior front face of Wireless Communication Doorbell 61. Surface Mount LEDs 9 may indicate several things to Visitor 63 and User 62. Surface Mount LEDs 9 may light up upon activation or stay illuminated continuously. In one aspect, Surface Mount LEDs 9 may change color to indicate that Button 11 has been pressed. Surface Mount LEDs 9 may also indicate that Battery 24 is being charged, charging has been completed, or that Battery 24 is low. Surface Mount LEDs 9 may indicate that connection to User's Network 65 is good, limited, poor, or not connected amongst other conditions. Surface Mount LEDs 9 may be used to guide User 62 through setup or installation steps using visual cues, potentially coupled with audio cues emitted from Speaker 20.

Microcontroller 22 is mounted within Housing 5 using fasteners, screws or adhesive. Microcontroller 22 is a small computer on a single integrated circuit containing a processor core, memory, and programmable input/output peripherals. In one non limiting example, Microcontroller 22 may be an off the shelf component such as the GS1101MIPS by Gainspan. Microcontroller 22 may have processors on board, or coupled thereto assist in the compression and conversion of audio and video. Microcontroller 22 may also have or be coupled to Flash Memory 45 and RAM 46 (shown in FIG. 11) to install and execute software which may be delivered or updated through Micro USB Input 26. Communications Module 23 may be embedded or coupled to Microcontroller 22, allowing for data derived from Microcontroller 22 to be sent out wirelessly.

Battery 24 may be mounted within Housing 5 and provide power to any components needing power within Wireless Communication Doorbell 61. Battery 24 may be a single or multi-celled battery, which may be rechargeable such as rechargeable lithium ion batteries or rechargeable nickel-metal hydride batteries. In this aspect, Battery 24 may be recharged via Micro USB Input 26 (shown in FIG. 4). Micro USB Input 26 is mounted within Housing 5 and protrudes out of USB Input Port 29, located on an exterior surface of Housing Enclosure 28. Battery 24 may also be charged from drawing power from Electrical Wiring 60, derived from the building that Wireless Communication Doorbell 61 may be mounted to. In this aspect and explained in further detail in FIG. 5, when Wireless Communication Doorbell 61 is mounted to Mounting Plate 35, Conductive Plate 40 may make direct contact with Conductive Prongs 27, thus transferring electric current to Conductive Prongs 27. Conductive Prongs 27 may be located within Housing 5, and protrude through Conductive Prong Port 31, located on an exterior face of Housing Enclosure 28. When charged with an electric current, Conductive Prongs 27 may charge Battery 24 or directly power components within Wireless Communication Doorbell 61.

Still referencing FIG. 8, Housing 5 may contain Housing Dome Aperture 6, which allows Camera Ball Assembly 15 and Clear Dome 13 to protrude out from within Housing 5. Clear Dome 13 may be secured to Housing 5 using fasteners, screws or adhesive. Clear Dome 13 may be any material that has transparent characteristics such as clear plastic or glass. Camera Ball Assembly 15 may reside within Clear Dome 13 and may be a hollow plastic housing containing Camera 18 and Night Vision LEDs 19. Camera 18 may record still or moving video, (e.g. anyone who activates Wireless Communication Doorbell 61 by pressing Button 8, or triggering Infrared Sensor 42). Camera 18 may send the recorded video or images to Microcontroller 22, to be sent to Smart Device 54 and Database 64 via Communications Module 23. Night Vision LEDs 19 (shown in FIG. 9a) may be activated by Microcontroller 22, depending on the time of day, to help illuminate the area in front of Wireless Communication Doorbell 61 when necessary. Microcontroller 22 may illuminate Night Vision LEDs 19 using a timer, which may trigger Night Vision LEDs 19 to turn on or off at a certain time each day. In one aspect of the present disclosure, Night Vision LEDs 19 may be triggered by a light sensor (not shown) mounted within Housing 5. In this aspect, when the absence of light is detected by said light sensor, the sensor may notify Microcontroller 22, which would trigger the activation of Night Vision LEDs 19.

Camera Ball Assembly 15 may contain Camera Ball Rotation Dimple 17. Camera Ball Assembly Rotation Dimple 17 is a physical input located on the back exterior face of Camera Ball Assembly 15. Camera Ball Assembly Rotation Dimple 17 may be used to accumulate leverage to rotate Camera Ball Assembly 15 within Housing 5. As explained in further detail in FIGS. 10a and 10b, pushing down on Camera Ball Assembly Rotation Dimple 17 allows Camera Ball Assembly 15 to be rotated vertically, pointing Camera 18 up, and vice versa. Camera Ball Assembly Rotation Dimple 17 may be accessed via Rotation Dimple Access Port 32 located on the back of Housing Enclosure 28. Housing Enclosure 28 is coupled to Housing 5 using screws, fasteners or adhesive.

Figure 9A:
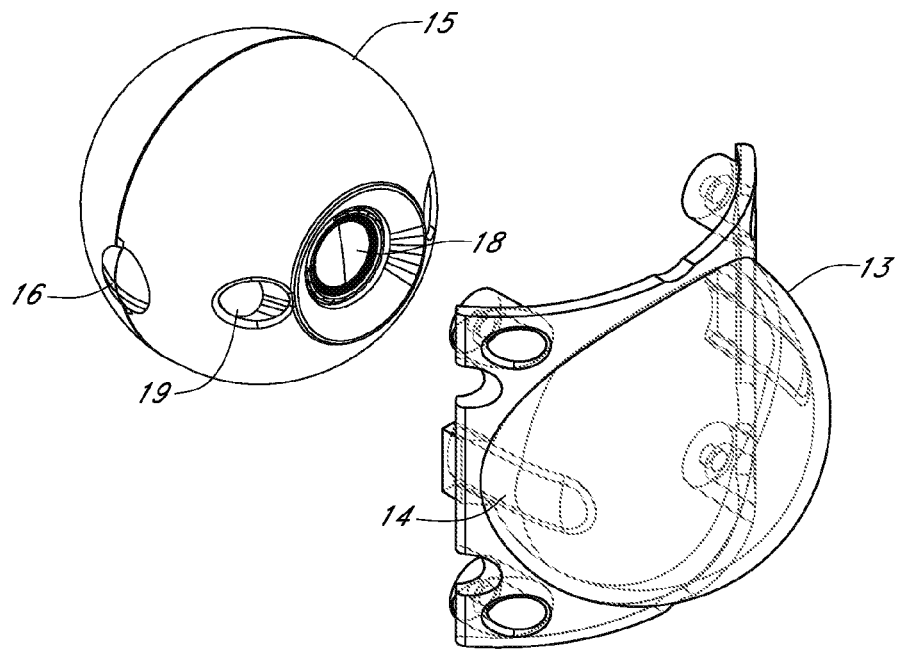
FIG. 9a is front perspective view of the Camera Ball Assembly and Clear Dome according to an aspect of the present disclosure.
Figure 9B:
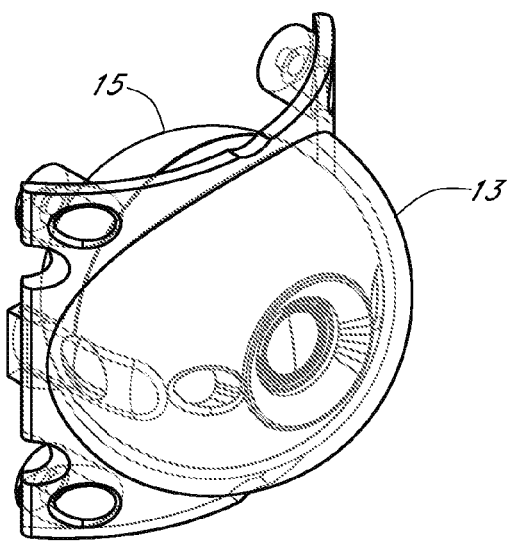
FIG. 9b is a front perspective view of the Camera Ball Assembly coupled to Clear Dome according to an aspect of the present disclosure.

FIGS. 9a and 9b displays Camera Assembly 15 and Clear Dome 13 according to aspect of the present disclosure. Camera Assembly 15 may be a hollow, spherical assembly that houses Camera 18 and Night Vision LED's 19. Night Vision LED's may be coupled to Camera 18 and Microcontroller 22, and illuminate the area surrounding the Wireless Communication Doorbell 61. The said illumination may provide User 62 the visibility necessary to see Visitor 63 through Camera 18 at night or when visibility is poor.

Camera Ball Assembly 15 may contain Camera Ball Assembly Track Pins 16 protruding from adjacent exterior surfaces of Camera Ball Assembly 15. Camera Ball Assembly Track Pins 16 share the same profile associated with Clear Dome Tracks 14. Clear Dome Tracks 14 may be grooves inset into adjacent interior walls of Clear Dome 13. Clear Dome 13 is a transparent dome shaped component, made of injection molded plastic, glass, or any other material with transparent characteristics. Clear Dome 13 mounts to the interior of Housing 5 and protrudes through Housing Dome Aperture 6.

As shown in FIG. 9b, Camera Ball Assembly 15 may be set within Clear Dome 13. Camera Ball Assembly 15 may have a smaller diameter in comparison to Clear Dome 13, thus facilitating movement of Camera Ball Assembly 15 within Clear Dome 13. When Camera Ball Assembly Track Pins 16 are set into Clear Dome Tracks 14, Camera Ball Assembly 15 may be coupled to Clear Dome 13. As a result of coupling, an Camera Ball Assembly 15 may pivot in multiple directions throughout Clear Dome 13.

Figure 10A:
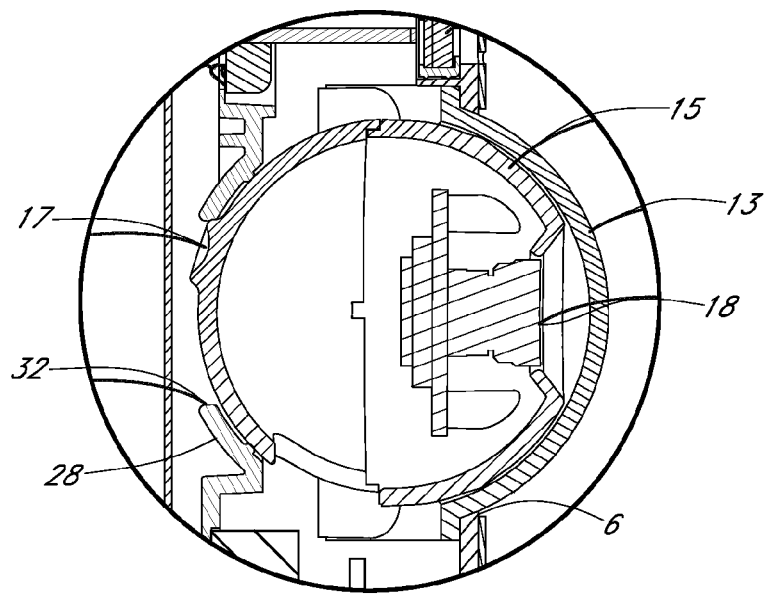
FIG. 10a is a cross sectional view from the side of Camera Assembly within Wireless Communication Doorbell according to an aspect of the present disclosure.
Figure 10B:
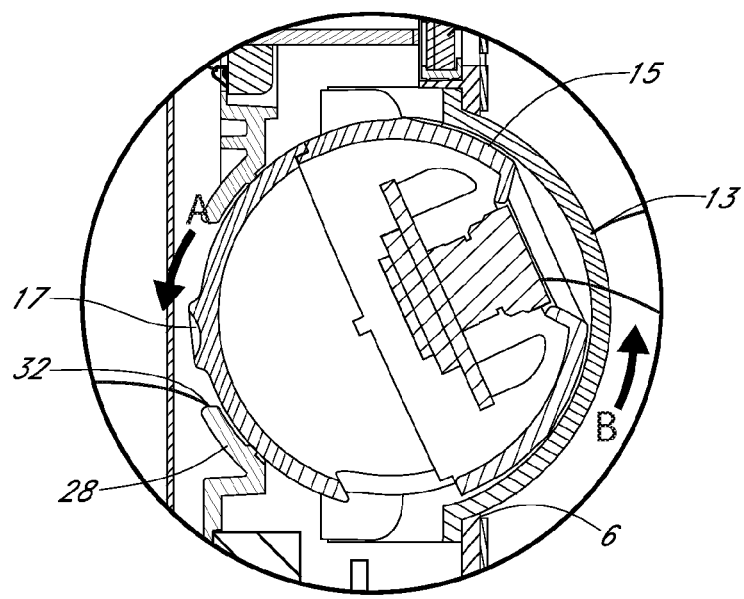
FIG. 10b is a cross sectional view from the side of Camera Assembly within Wireless Communication Doorbell according to an aspect of the present disclosure.

FIG. 10a and FIG. 10b display section views from the side of Camera Assembly 15, coupled to Clear Dome 13 within Housing 5, according to an aspect of the present disclosure. When Camera Assembly 15 is coupled to Clear Dome 13, User 62 may pivot Camera Assembly 15 via Camera Ball Assembly Rotation Dimple 17. Camera Ball Assembly Rotation Dimple 17 may be located on the back facing exterior surface of Camera Ball Assembly 15. Camera Ball Assembly Rotation Dimple 17 protrudes through Rotation Dimple Access Port 31, located on Housing Enclosure 28. Camera Ball Assembly Rotation Dimple 17 may act as a handle to be moved about within Rotation Dimple Access Port 31 by User 62. As shown in FIG. 10a, prior to applying pressure to Camera Ball Assembly Rotation Dimple 17, Camera 18 may be directed straight ahead. As displayed in FIG. 10b, when a downward force (Arrow A) is applied to Camera Ball Assembly Rotation Dimple 17 by User 62, Camera 18 is directed upwards (Arrow B). The action displayed herein may be applied to Camera Ball Assembly Rotation Dimple 17 to rotate Camera 18 and Camera Ball Assembly 15 in various directions, so User 62 may be have the best possible view of Visitor 63.

Figure 11A:
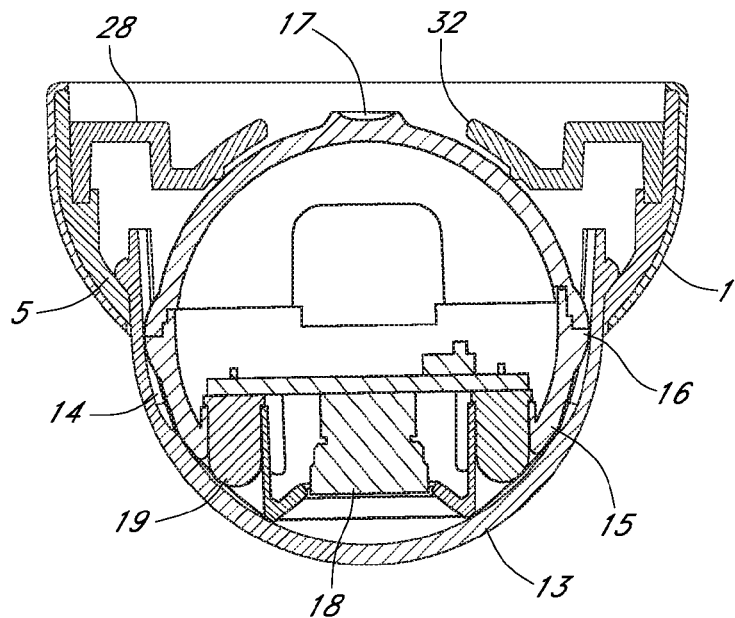
FIG. 11a is a cross sectional view from above of Camera Assembly within Wireless Communication Doorbell according to an aspect of the present disclosure.
Figure 11B:
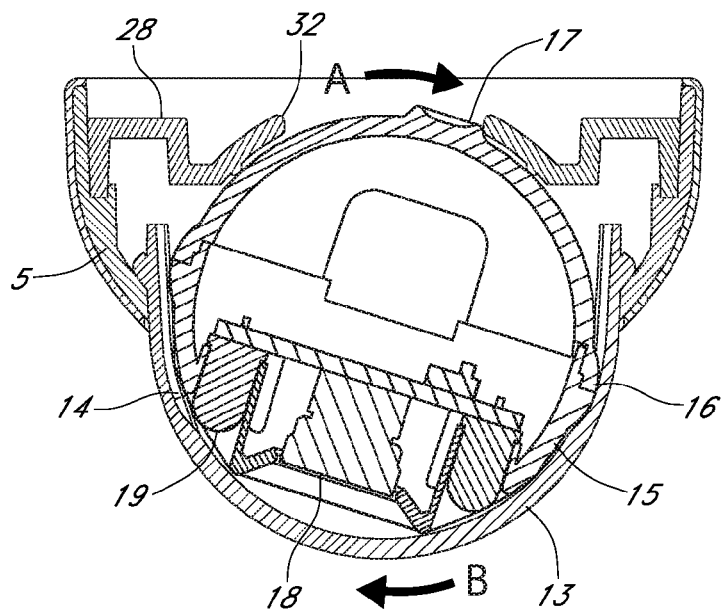
FIG. 11b is a cross sectional view from above of Camera Assembly within Wireless Communication Doorbell according to an aspect of the present disclosure.

FIGS. 11a and 11b display section views from above of Camera Assembly 15, coupled to Clear Dome 13 within Housing 5, according to an aspect of the present disclosure. These views display the curvature of Clear Dome Tracks 14, which follow the curvature of Clear Dome 13. When Camera Assembly Track Pins 16 are set within Clear Dome Tracks 14, Camera Assembly 15 may rotate about Clear Dome Tracks 14, following the curvature of Clear Dome 13. Using Camera Ball Assembly Rotation Dimple 17, User 62 may rotate Camera Assembly 15 in the direction of Visitor 63. As shown in FIG. 11a, prior to applying pressure to Camera Ball Assembly Rotation Dimple 17, Camera 18 is directed straight ahead. As displayed in FIG. 11b, when a directional force (Arrow A) is applied to Camera Ball Assembly Rotation Dimple 17 by User 62, Camera 18 is directed in the opposite direction (Arrow B). In one aspect, Clear Dome Tracks 14 may partially follow the curvature displayed in Clear Dome 13. In this aspect, Camera Assembly 15 may only rotate about Clear Dome Tracks 14 until Clear Dome Tracks stop.

In one aspect of the present disclosure, Camera Ball Assembly Rotation Dimple 17 may contain a port that accepts a tool such as a screw driver (e.g phillips or flat head), hex key or allen key. The tool (not shown) allows for easier rotation of Camera Ball Assembly 15 using the leverage acquired by inserting the tool into the port. In another aspect of the present disclosure, the mechanism described in FIG. 10 and FIG. 11 may be achieved electronically, using a series of motors and gears. In this aspect, User 62 may be capable of rotating Camera Ball Assembly 15 via Application 55 installed on Smart Device 54. Increased functionality may be capable in this aspect, such as panning, zooming and tracking the movements of Visitor 63, resulting in more visibility at User 62's doorstep.

FIG. 12 is an entity relationship diagram of the application and components within Wireless Communication Doorbell according to an aspect of the present disclosure. As shown in FIG. 12, Visitor 63 may initiate communication with User 62 by pressing Button 11 on the front face of Wireless Communication Doorbell 61. Pressing Button 11 may trigger Microcontroller 22 to signal Power Processor 51 to increase the power distribution levels to the rest of the device. Power Processor 51 is a processor that may manage the distribution of energy from Battery 24 to the components within Wireless Communication Device 61 such as Speaker 20, Microphone 21, Night Vision LEDs 19, Camera 18, Infrared Sensor 49, Microcontroller 22 and Communications Module 23. Battery 24 holds the power that Power Processor 51 used to distribute to all components within Wireless Communication Device 61. Battery 24 may be recharged via Micro USB Input 26. Micro USB Input 26 is mounted within Housing 5 and protrudes out of USB Input Port 29, located on an exterior surface of Housing Enclosure 28. Micro USB Input 26 is connected to Microcontroller 21, which may relay power to Battery 24 for charging. Battery 24 may also be charged from drawing power from Electrical Wiring 60, derived from the building that Wireless Communication Doorbell 61 may be mounted to. To draw power from Electrical Wiring 60, the electric current may be passed through Conductive Fittings 41, along to Conductive Plate 40, mounted on Mounting Plate 35 (not shown in FIG. 9). Conductive Plate 40 makes contact with Conductive Prongs 27 when Wireless Communication Doorbell 61 is mounted to Mounting Plate 35, transferring the electric current to Conductive Prongs 27. Conductive Prongs 27 are mounted with Housing 5, and protrude through Conductive Prong Port 31, located on an exterior face of Housing Enclosure 28. Conductive Prongs 27 transfer electric current derived from Electrical Wiring 60 to Microcontroller 21. Microcontroller 21 then relays the power directly to Battery 24.

As shown in FIG. 12, after the initial trigger created by pressing Button 11, Power Processor 51 may distribute power to Surface Mount LEDs 9. Surface Mount LEDs 9 illuminate Light Pipe 10 surrounding Button 11, providing a visual cue to Visitor 63 that their request has been processed. Surface Mount LEDs 9 may continue to stay illuminated, or shut off after Visitor 63 releases Button 11. Surface Mount LEDs 9 may provide other visual cues indicating that Battery 24 is being charged, charging has been completed, or that Battery 24 is running low. Surface Mount LEDs 9 may also indicate that connection to User's Network 65 is good, limited, poor, or not connected, amongst other potential indicators. Surface Mount LEDs 9 may be used to guide User 62 through setup or installation steps using visual cues, potentially coupled with audio cues emitted from Speaker 20.

In reference to FIG. 12, after Button 11 is pressed, Power Processor 51 may provide the power to activate Camera 18 and Night Vision LEDs 19. Camera 18 records any visuals of Visitor 63 and processes the visuals using CCD/CMOS Sensor 49. The visuals recorded may be a still image or video, based on one or more factors including user settings, signal strength, and power available. In one non-limiting example, CCD/CMOS Sensor 49 may be the OmniVision OV7740/OV780, which is a low power, high sensitivity image sensor capable of managing all image processing procedures. Other image sensors may be used having similar characteristics. The processed visuals are then converted to digital data by CCD/CMOS AFE 50, to be distributed to System Network 52 via Communications Module 23. CCD/CMOS AFE 50 stands for analog front end sensor and may convert video or still images into a format capable of being transmitted. In one aspect of the present disclosure, the video and/or still images recorded by Camera 18 may be collected and stored in Database 64 within System Network 52, in conjunction with the routing of said video and/or still images. User 62 may be able to access Database 64, via Application 55, installed on Smart Device 54, to view still images or video taken by Wireless Communication Doorbell 61.

As displayed in FIG. 12, Communications Module 23 may be an off the shelf component such as the GS2011M module by Gainspan, or it may be any other module that adds low power, high speed Wi-Fi and Internet connectivity to any device with a microcontroller and serial host interface. Other data transmission protocols such as Bluetooth or zigbee may be incorporated into the Communications Module 23 to transmit data to mobile devices or any other device capable of receiving wireless data transmissions. Communications Module 23 sends outbound data to System Network 52, containing data such as video, audio, and identifying information related to Wireless Communication Doorbell 61. System Network 52 may be a telecommunications network that allows computers to exchange data either physically or virtually. In one aspect, System Network 52 may be a virtual network that identifies Smart Device 54 associated with Wireless Communication Doorbell 61 using the identifying information sent. Once the identifying information matches Smart Device 54, System Network 52 routes the data through Server 53 to Smart Device 54. Server 53 is a system that responds to requests across a computer network to provide, or help to provide, a network service, such as the routing of data according to instructions and user preferences. Wireless Communication Doorbell 61 may be connected to User's Network 65 for Communications Module 23 to communicate with Smart Device 54 via System Network 52.

Once connected to User's Network 65, data sent from Wireless Communication Doorbell 61 may be routed by Server 53 to devices associated with Wireless Communication Doorbell 61. Thus, Wireless Communication Doorbell 61 may send data to Smart Device 54 or web based applications such as Skype via System Network 52, so long as they are associated with Wireless Communication Doorbell 61 and have an associated data source name. Wireless Communication Doorbell 61 may also connect to other devices such as a television, landline phone, or send simple SMS messages to non smart devices by converting the audio, video and data transmissions to the applicable formats. In this aspect, a Smart Device 54, web based application or any other device associated with Wireless Communication Doorbell 61 may be identified by Server 53. Server 53 may then process audio, video and any other data to the appropriate format needed to transmit said data to the appropriate Smart Device 54, web based application or any other device capable of receiving and transmitting audio, video and or other data.

Smart Device 54 may be any electronic device capable of receiving and transmitting data via the internet, capable of transmitting and receiving audio and video communications, and can operate to some extent autonomously. Examples of Smart Device 54's are but not limited to smartphones, tablets, laptops, computers and VOIP telephone systems. The infrastructure described above allows User 62 to connect multiple Smart Devices 54, within the parameters just mentioned, to Wireless Communication Doorbell 61. In this aspect, multiple authorized User's 62 may see who is within view of Wireless Communication Doorbell 61 at any given time. In one aspect of the present disclosure, the authorized User 62 who first responds to Accept/Deny Prompt 56 will be placed in communication with Visitor 63. In another aspect System Network 52 may be able to connect multiple Users 62, associated with the same Wireless Communication Doorbell 61, with Visitor 63 on the same call, in a similar fashion to a conference call.

Application 55 may be installed on Smart Device 54 and provide an interface for User 62 to communicate and interact with Wireless Communication Doorbell 61. Other than communicating with Visitor 63, User 62 may be able to perform functions via Application 55 such as adjust the volume emitted from Speaker 20, rotate Camera Ball Assembly 15, focus or zoom Camera 18 and turn Night Vision LEDs 19 on or off, amongst other functions. Application 55 may also display data such as the battery life left in Battery 24, videos and still images recorded by Camera 18, voicemails left by Visitor 63 and information regarding recent Visitors 63 such as date, time, location and Wireless Communication Doorbell 61 identifying information. Smart Device 54 may provide an interface for User 62 to receive weekly, monthly or annual diagnostic and activity reports, which may display information such as the number of visitors per day, per month, and per year for example. Diagnostic data may include wireless connectivity data, and battery life data amongst other data.

Figure 14:
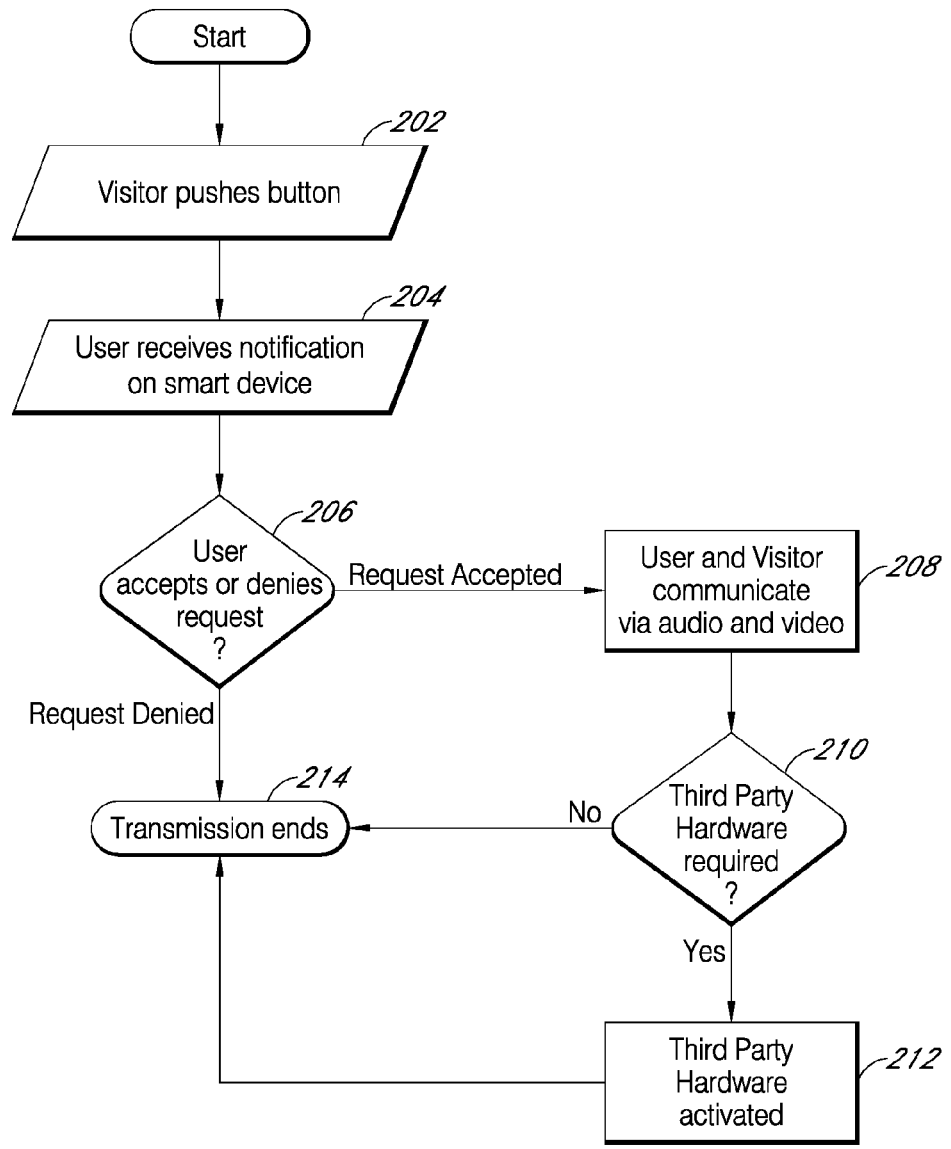
FIG. 14 is a process flow describing the transmission of data to and from Wireless Communication Device to a Smart Device according to the system and method of present disclosure.

As shown in FIG. 12, and described in further detail in FIG. 14, upon receiving a request from System Network 52, Application 55 generates Accept/Deny Prompt 56. If the request is denied by User 62, the streaming of video and audio may be terminated by System Network 52. If no action is taken and User 62 does not accept or deny the request, Camera 18 gathers streaming video and/or still images of Visitor 63 and stores said video and/or still images in Application 55 and Database 64. If the request is accepted, System Network 52 may stream live video or still images to Smart Device 54. Visitor 63 may communicate with User 62 via Microphone 21 within Wireless Communication Doorbell 61 and User 62 may communicate through Smart Device 54. The transfer of digital audio from User 62 and Visitor 63 is compressed and decompressed using Audio Codec 48, coupled to Microcontroller 22. Once compressed by Audio Codec 48, digital audio data is sent through Communications Module to System Network 52, routed by Server 53 and delivered to Smart Device 54. When User 62 speaks, after being transferred through System Network 52, digital audio data is decompressed by Audio Codec 48 and emitted to Visitor 63 via Speaker 20. In one aspect of the present disclosure, if User 62 denies the request or is unable to connect, an automated message, stored within Flash Memory 45, may be emitted to Visitor 63 via Speaker 20. In this aspect, Visitor 63 may be prompted to leave a voice message, if they choose to do so, Visitor 63 may record a message by speaking into Microphone 21. The voice message may be sent to Application 55, installed on Smart Device 54, or may be delivered by other methods such as email, mms, or as an attachment or link to the voice message.

As shown in FIG. 12, Application 55 may communicate with Third Party Application 57 via the use of APIs and software developer kits. Third Party Application may be installed on Smart Device 54 and associated with Third Party Hardware 58. Third Party Hardware may be a device utilizing wireless communication protocols to initiate physical tasks through Third Party Application 57. For example, Wireless Communication Doorbell 61 may be compatible with a smart lock, such as Lockitron™, which allows User 62 to lock and unlock a door through the use of a smart device application, such as Third Party Application 57. Using this example, after User 62 communicates with Visitor 63 via Application 55, User 62 may trigger Application 55 to send out an API call through System Network 52 to Third Party Application 57 (Lockitron™ application) to unlock the door using Third Party Hardware 58 (Lockitron™ hardware).

Figure 16:
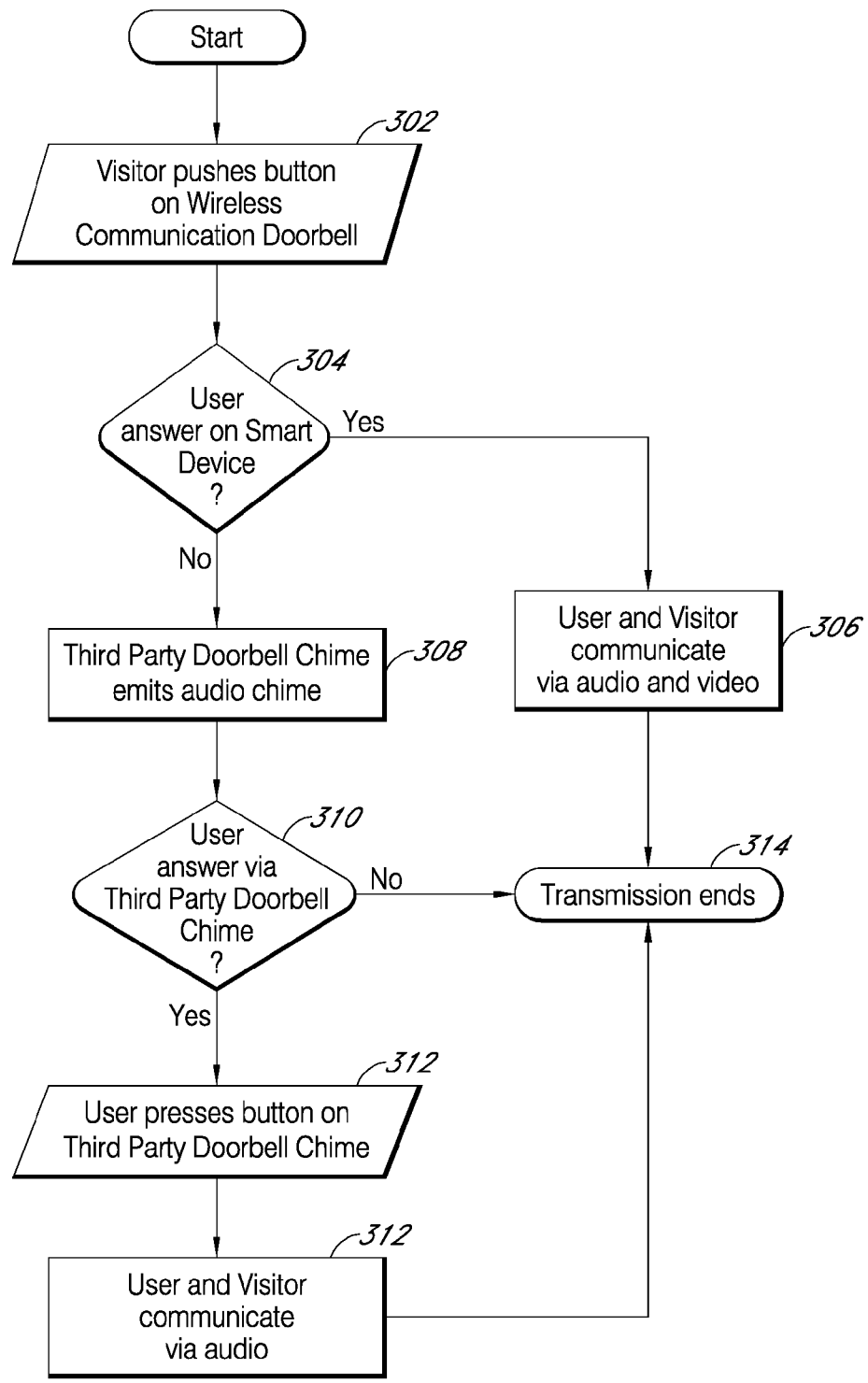
FIG. 16 is a process flow diagram regarding the use and functions associated with Third Party Doorbell Chime 59 according to an aspect of the present disclosure.

As shown in FIG. 12 and described in further detail in FIG. 16, Wireless Communication Doorbell 61 may communicate with Third Party Doorbell Chime 59. Third Party Doorbell Chime 59 may be a stand-alone product or component that may emit an audio chime or message, amongst other functions to User 62 when Button 11 is pressed on Wireless Communication Doorbell 61. Wireless Communication Doorbell 61 may communicate with Third Party Doorbell Chime 59 directly or indirectly, depending on the transmission capabilities associated with Third Party Doorbell Chime 59. In one aspect, if embedded with a communications module, Third Party Doorbell Chime 59 may communicate with Wireless Communication Doorbell 61 via System Network 52. In this aspect, Third Party Doorbell Chime 59 may be connected to User's Network 65, along with Wireless Communication Doorbell 61. In one aspect of the present disclosure, Third Party Doorbell Chime 59 may take the form of a USB dongle, containing a communications module (e.g. Wi-Fi or Bluetooth), speaker and microphone. In this aspect, said USB dongle may derive power by being plugged into a computer or into a USB adapter. If connected over Wi-Fi, data sent from Wireless Communication Doorbell 61 such as digital audio and identifying information may be routed through System Network 52 to the USB dongle. If connected using Bluetooth protocols, Wireless Communication Doorbell may deliver data such as digital audio directly to USB dongle. USB dongle, may alert User 62 of someone at the door using visual and audio cues derived from LED lights and speakers installed within the USB dongle. User 62 may then be able to communicate with Visitor 63 through the microphone installed on the USB dongle. In one aspect of the present disclosure, USB dongle may act as a Wi-Fi extender, repeater or booster to provide more or better access to User's Network 65. In this aspect, USB dongle may contain components, (e.g. found in a Wi-Fi router) capable of receiving wireless signals transmitted from User's Network 65, amplifying the wireless signal, and then transmitting the boosted signal throughout User 62's location or facility.

Figure 13:
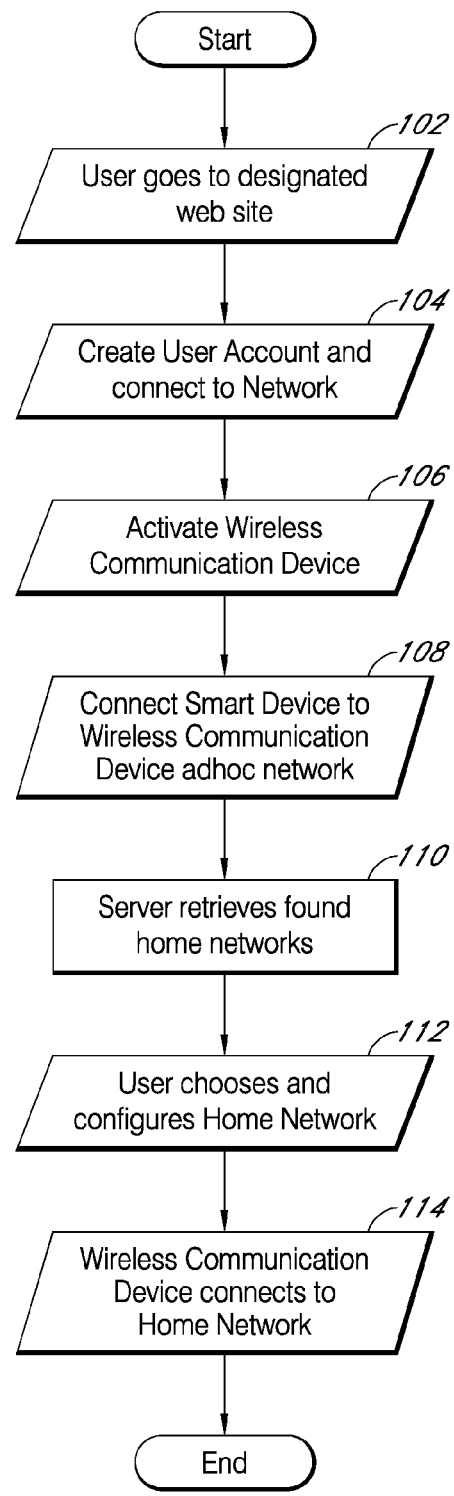
FIG. 13 is a process flow diagram describing the steps involved in connecting Wireless Communication Doorbell 61 to a wireless network according to the system and method of present disclosure.

FIG. 13 is a process flow diagram describing the steps involved in connecting Wireless Communication Doorbell 61 to a wireless network according to the system and method of present disclosure. To connect the Wireless Communication Doorbell 61 to User's Network 65, User 62 may start by going to a designated website or web domain at Step 102. User 62 may access this website via Smart Device 54 or any device equipped with a web browser and also streams data via User's Network 65. Once on the designated website, User 62 may be prompted to either login or create an account at Step 104, which will be then connected to System Network 52. At Step 106 User 62 may activate Wireless Communication Doorbell 61 by pressing Button 11 on the front face of Wireless Communication Doorbell 61. Pressing Button 11 activates Communication Module 23, located within Wireless Communication Doorbell 61 to begin broadcasting a wireless ad hoc network. A wireless ad hoc network is a decentralized wireless network that does not rely on pre existing infrastructure such as routers or access points in managed wireless networks.

User 62 may then disconnect their Smart Device 54 or any device equipped with a web browser from User's Network 65 and connect to Wireless Communication Doorbell 61's ad hoc network at Step 108. Server 53 then identifies and displays potential networks on User's Smart Device 54 or any device equipped with a web browser for User 62 to select at Step 110. At Step 112 User 62 selects their network of choice, in this case, User's Network 65 and provides any necessary credentials to gain access. Once approval is granted to access User's Network 65, Wireless Communication Doorbell 61 is connected to User's Network 65 and Server 53 associates User 62's account with Wireless Communication Doorbell 61.

FIG. 14 is a process flow describing the transmission of data to and from Wireless Communication Device to a Smart Device according to the system and method of present disclosure. The process may be initiated when the Visitor 63 presses Button 11 of Wireless Communication Doorbell 61 during Step 202. Once the Button 11 is pressed, User 62 receives a notification on their Smart Device 54 at Step 204. At Step 206, User 62 is presented with an Accept/Deny Prompt 56 on Application 55 installed on Smart Device 54.

User 62 then has the ability to accept or deny the request from Visitor 62 on Smart Device 54. In one aspect, upon depressing Button 11 or another trigger may cause Camera 18 of Wireless Communication Doorbell 61 to record a static or continuous video image, which is sent to User 62 along with notification at Smart Device 54.

If the request is denied, (No, Step 206), then the transmission may be terminated at Step 214, and Wireless Communication Doorbell 61 returns to a low power consumption mode. If the request is accepted by User 62, (Yes, Step 206), Visitor 63 and User 62 communicate via video and audio transmitted sent to and from Wireless Communication Doorbell 61 and Smart Device 54 at Step 208. If Third Party Hardware 58 is required, (Yes, Step 210), User 62 may activate Third Party Hardware 58 by sending out an API call via Application 55 to Third Party Application 57 at Step 212. If Third Party Hardware 58 is not required, available or connected to User's Network 65, (No, Step 210), the transmission between Wireless Communication Doorbell 61 and Smart Device 54 may be terminated once User 62 disconnects or hangs up at Step 214.

Figure 15:
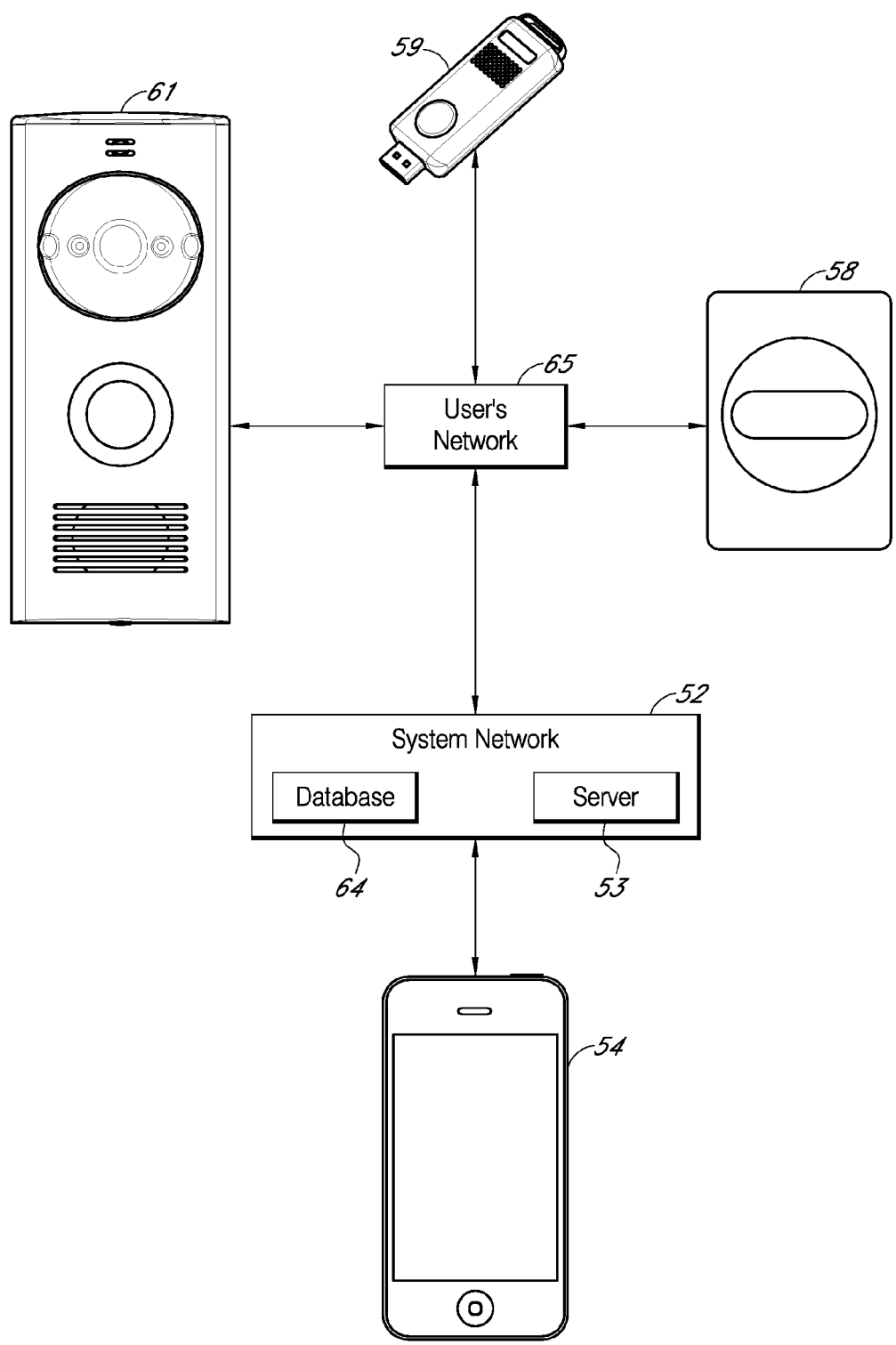
FIG. 15 is a diagram displaying multiple devices in communication according to the system and method of present disclosure.

FIG. 15 is a diagram displaying multiple devices in communication according to the system and method of present disclosure. The communication protocol displayed in FIG. 11 is Wi-Fi, and is one method of wireless data exchange according to an aspect of the present disclosure. The devices within the system may connect to User's Network 65 using methods such as the process flow described in FIG. 13. User's Network 65 may be a local area network (LAN), internet area network (IAN) or a wide area network (WAN) that connects voice and data end points within a wireless network. Once devices within the system are connected to User's Network 65 (unless equipped with 3G, 4G, LTE, etc), then the devices may communicate by sending data to System Network 52. System Network 52 is wireless telecommunications network that allows for the transfer of data to and from Wi-Fi enabled devices. Server 53 may be embedded in or coupled to System Network 52. Server 53 is a system that responds to requests across a computer network to provide, or help to provide, a network service, such as the routing of data according to instructions and user preferences. Devices within the system send data to System Network 52 where Server 53 processes and routes the data to the appropriate device. For example, data from Wireless Communication Doorbell 61 may be sent to System Network 52, such as identifying information, digital audio, processed visuals and device diagnostics. Server 53 processes the data sent from Wireless Communication Doorbell 61 and routes it accordingly to the other devices within the system. For instance, Server 53 may process diagnostic data sent from Wireless Communication Doorbell 61, and Server 53 routes the diagnostic data to inform User 62 via Smart Device 54 if Battery 24 is about to die (e.g. 10% battery remaining).

In one aspect of the present disclosure, all devices that communicate within the system described in FIG. 15 may use other wireless communication protocols, such as bluetooth. Bluetooth is a wireless technology standard for exchanging data over short distances, in this aspect, all devices must be within close proximity to communicate. Bluetooth wireless transmission does not require the use of a System Network 52 or Server 53 because of the close proximity, while maintaining the capability to transfer data such as identifying information, digital audio, processed visuals and device diagnostics.

In one method and system of the present disclosure, all hardware components within Wireless Communication Doorbell 61 may live in a state of hibernation until Button 11 is pressed by Visitor 63. In this aspect, all components that draw power from Battery 24, such as Communications Module 23 and Camera 18 do not waste battery power when not in use. When Button 11 is pressed, it may activate all components, and when streaming data to Smart Device 54 ceases, all components may return to hibernation mode.

In one aspect of the present disclosure, diagnostic data associated with Wireless Communication Doorbell 61, such as battery life and internet connectivity, may be relayed to System Network 52 when Communication Module 23 is woken up out of hibernation mode. With the diagnostic data provided by Wireless Communication Doorbell 61, Server 53 may send notifications to Smart Device 54, informing User 62 to charge Battery 24 or reset the internet connectivity to Wireless Communication Doorbell 61.

FIG. 16 displays a process flow regarding the use and functions associated with Third Party Doorbell Chime 59 according to an aspect of the present disclosure. In this aspect, Third Party Doorbell Chime 59 may contain a communication module, input button, speaker and microphone. Visitor 63 may push Button 11 located on the front face of Wireless Communication Doorbell 61 at Step 302, triggering Wireless Communication Doorbell 61 to transmit data wirelessly to System Network 52.

At Step 304, Wireless Communication Doorbell 61 transmits data to System Network 52 such as audio, video, and identifying information associated to Wireless Communication Doorbell 61. Server 53 identifies what Smart Devices 54, web based applications, Third Party Doorbell Chimes 59 and other devices may be associated with Wireless Communication Doorbell 61. Server 53 may route the appropriate data, such as audio or video data, to the applicable device based on the functions of each device. User 62 may receive Accept/Deny Prompt 56 on Smart Device 54 or another device associated with Wireless Communication Doorbell 61. If the request is accepted, (Yes, Step 304), User 62 and Visitor may communicate via audio and video transmissions sent to and from Wireless Communication Doorbell 61 at Step 306. The transmission may then be terminated at Step 314 once User 62 disconnects or hangs up.

If a connection cannot be made with Smart Device 54, (No, Step 304), Server 53 routes data to Third Party Doorbell Chime 59 at Step 308 to emit an audio chime. Reasons such as but not limited to poor wireless network connection, Smart Device 54 not connected to User's Network, Smart Device 54 being powered off or Accept/Deny Prompt 56 may trigger Third Party Doorbell Chime 59 to emit an audio chime to User 62.

If User 62 is in the presence of Third Party Doorbell Chime 59 and is capable of answering the request, (Yes, Step 310), User 62 may press the input button located on Third Party Doorbell Chime 59 at Step 312. Pressing the input button located on Third Party Doorbell Chime 59 creates a connection between Wireless Communication Doorbell 61 and Third Party Doorbell Chime 59 via System Network 52. User 62 and Visitor 63 may communicate via audio transmissions sent to and from Wireless Communication Doorbell 61 and Third Party Doorbell Chime 59 at Step 312. The transmission may then be terminated at Step 314 when User 62 disconnects by pressing the input button.

If User 62 is not in the presence of Third Party Doorbell Chime 59, or Third Party Doorbell Chime 59 is either disconnected from User's Network 65 or powered off (No, Step 310) the transmission may then be terminated at Step 314. It is to be understood by those skilled in the art that the steps described within FIG. 16 may take place in a different order than described above. For example, Server 53 may route data to Third Party Doorbell Chime 59 prior to routing data to Smart Device 54.

Visitor Recognition Processing

Figure 17:
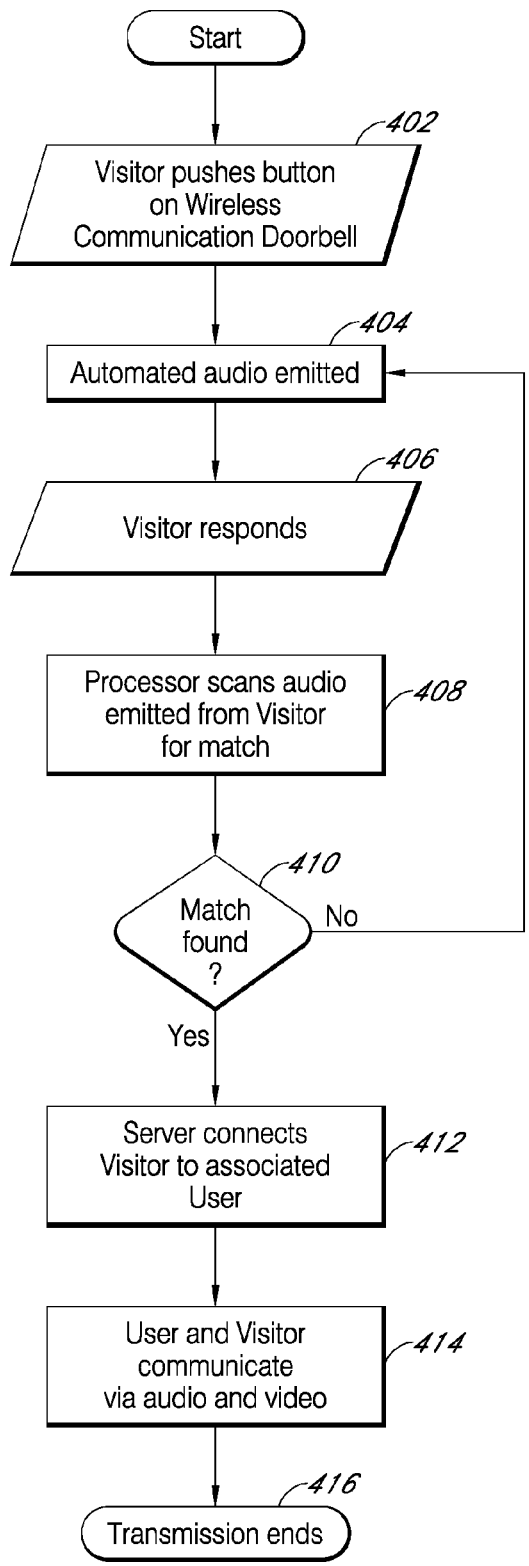
FIG. 17 is a process flow describing the steps involved in performing speech recognition to acknowledge Visitors and route them to the appropriate User.

FIG. 17 is a process flow describing the steps involved in performing speech recognition to acknowledge Visitors 63 and route them to the appropriate User 62. In one aspect of the present disclosure, Wireless Communication Doorbell 61 may come equipped with software either embedded or coupled to Microcontroller 22 or another component of Wireless Communication Doorbell 61 capable of performing speech recognition. In one non-limiting example, Wireless Communication Doorbell 61 may act as a front desk assistant and would be capable of acknowledging new Visitors 63 upon arrival to a location, such as an office.

In this aspect, Visitor 63 may push Button 11 located on the front face of Wireless Communication Doorbell 61 at Step 402. Pressing Button 11 triggers automated or pre recorded audio to be emitted from Speaker 20 within Wireless Communication Doorbell 61 at Step 404. In one aspect, the automated or pre-recorded audio may be triggered to be emitted when Visitor 63 crosses Infrared Sensor 49. The automated or pre-recorded message at Step 404 may request Visitor 63 to say what User 62 they intend to meet or talk to.

At Step 406, Visitor 63 may speak into Microphone 21, saying what User 62 they intend to meet or talk to. The spoken words emitted from Visitor 63 may be processed by the speech recognition software within Wireless Communication Doorbell 61 at Step 408. Using standard speech recognition processing, the spoken words emitted from Visitor 63 are interpreted into an audio file format capable of being compared with audio files stored within Database 64 at Step 410. If a biometric match is found (Yes, Step 410), Server 53 routes data to the Smart Device 54 associated with the User 62 associated with the biometric match.

If a biometric match is not found, (No, Step 410) an automated or pre-recorded message at Step 404 may request Visitor 63 to say what User 62 they intend to meet or talk to. Steps 406 through 410 may then be repeated until a biometric match is found. In one aspect, after a predetermined number of failed attempts, Visitor 63 may be directed via Server 53 to User 62 capable of manually routing Visitor 63 to the correct User 62. Once a Visitor 63 is connected to the correct User 62, Visitor 63 and User 62 communicate via video and audio transmitted sent to and from Wireless Communication Doorbell 61 and Smart Device 54 at Step 414. Wireless data transmission may be terminated at Step 416.

Figure 18:
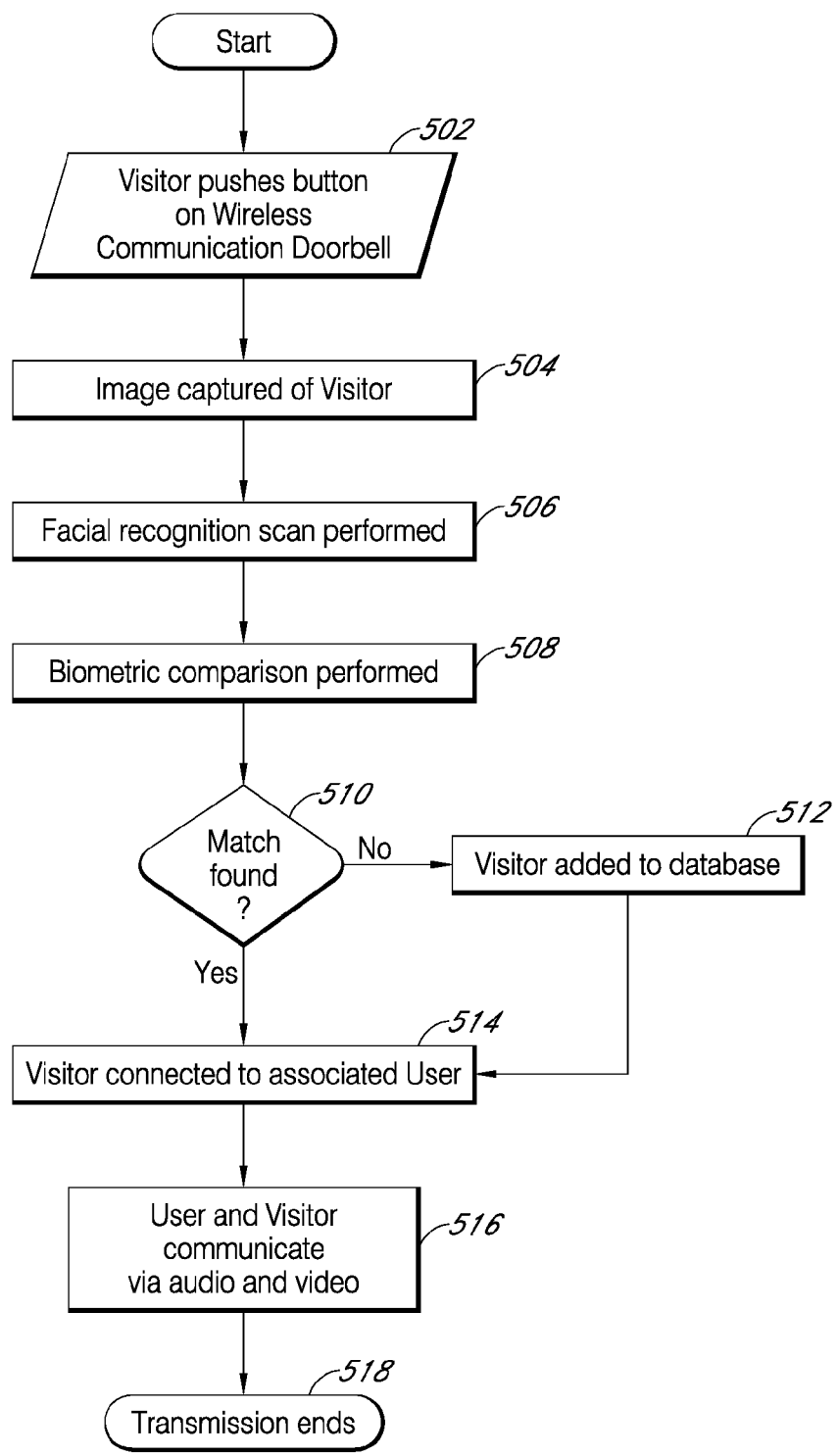
FIG. 18 is a process flow describing the steps involved in performing facial recognition to acknowledge Visitors and route them to the appropriate User.

FIG. 18 is a process flow describing the steps involved in performing facial recognition to acknowledge Visitors 63 and route them to the appropriate User 62. In one aspect of the present disclosure, Wireless Communication Doorbell 61 may come equipped with software either embedded or coupled to Microcontroller 22, Camera 18 or another component of Wireless Communication Doorbell 61 capable of performing facial recognition, or another form of physical recognition such as iris scanning, fingerprint scanning, etc. In one non-limiting example, Wireless Communication Doorbell 61 may act as a front desk assistant and would be capable of acknowledging Visitors 63 upon arrival to a location, such as an office, and route them to the correct User 62.

In this aspect, Visitor 63 may push Button 11 located on the front face of Wireless Communication Doorbell 61 at Step 502. Pressing Button 11 triggers Camera 18 to take one or more photos of Visitor 63 at Step 504. In one aspect, Camera 18 be triggered to take photos when Visitor 63 crosses Infrared Sensor 49. At Step 506, the image captured of Visitor 63 may be processed by facial recognition software within Wireless Communication Doorbell 61. In one aspect, the facial recognition software may identify facial features by extracting landmarks, or features, from an image of the subject's face. For example, an algorithm may analyze the relative position, size, and/or shape of the eyes, nose, cheekbones, and jaw. These features are then used create a biometric comparison against other images within Database 64 with matching features at Step 508.

If a biometric match is found in Database 64 (Yes, Step 510), Server 53 routes Visitor 63 to the appropriate User 62 at Step 514. Server 53 may have data associated to Visitor 63, such as a calendar event, which may help direct Visitor 63 to the correct User 62. In the event that no biometric match is found in Database 64 (No, Step 510), Image data acquired from the facial recognition software is distributed to Database 64, for future reference. Server 53 may then route the image captured by Camera 18 of Visitor 63, accompanied with a Request/Deny Prompt 56 to all Smart Devices 54 associated with Wireless Communication Doorbell 61. The User 62 that accepts the Request/Deny prompt 56 may then be connected to User 62 at Step 514.

In one non-limiting aspect, Server 53 may utilize APIs and software developer kits to acquire images of people associated with Users 62 from social media websites and applications. For example, Server 53 may acquire images of User 62's friends on Facebook, Google Plus, Twitter, Instagram, etc. These images may then be processed using the facial recognition software and compared against the images captured of Visitor 63 by Camera 18 in search for a biometric match.

Once a Visitor 63 has been correctly associated with a User 62, Server 53 may route all data transmissions coming from Wireless Communication Doorbell 61 to Smart Device 54 associated with User 62. Visitor 63 and User 62 communicate via video and audio transmitted sent to and from Wireless Communication Doorbell 61 and Smart Device 54 at Step 516. Wireless data transmission may be terminated at Step 518.

Figure 19:
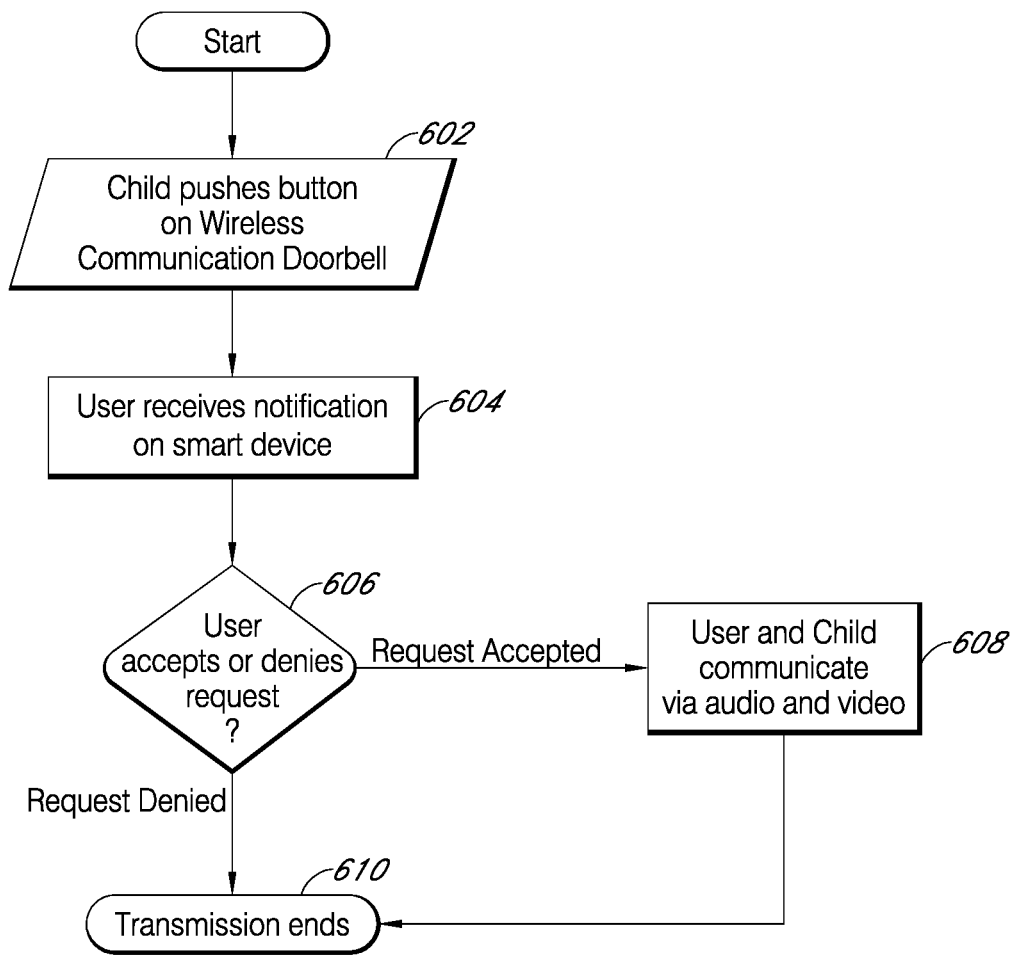
FIG. 19 displays a process flow for utilizing the components of Wireless Communication Doorbell 61 to connect User 62 to a child.

FIG. 19 displays a process flow for utilizing the components of Wireless Communication Doorbell 61 to connect User 62 to a child. In this aspect of the present disclosure, the functionality and embodiments of Wireless Communication Doorbell 61 may be utilized within a children's play toy. Wireless Communication Doorbell 61 may only contain the components necessary to create a connection between Visitor 63, in this case a child, and phone numbers applied by User 62. For example, this aspect provides a unique and fun way for children to contact their parents, siblings, grandparents, friends, etc. In this aspect, all embodiments may be modified to be made suitable for a children's environment. Embodiments may be removed depending on the functionality needed for the device.

The process may be initiated when the child presses Button 11 of Wireless Communication Doorbell 61 during Step 602. Once the Button 11 is pressed, User 62 receives a notification on their Smart Device 54 at Step 604. At Step 606, User 62 is presented with an Accept/Deny Prompt 56 on Application 55 installed on Smart Device 54. User 62 then has the ability to accept or deny the request from the child on Smart Device 54. In one aspect, upon depressing Button 11, or another trigger, may cause Camera 18 of Wireless Communication Doorbell 61 to record a static or continuous video image, which is sent to User 62 along with notification at Smart Device 54.

If the request is denied, (No, Step 606), then the transmission may be terminated at Step 610, and Wireless Communication Doorbell 61 returns to a low power consumption mode. If the request is accepted by User 62, (Yes, Step 606), the child and User 62 communicate via video and audio transmitted sent to and from Wireless Communication Doorbell 61 and Smart Device 54 at Step 608. The wireless data transmission may be terminated at Step 610, and Wireless Communication Doorbell 61 returns to a low power consumption mode.

Figure 20:
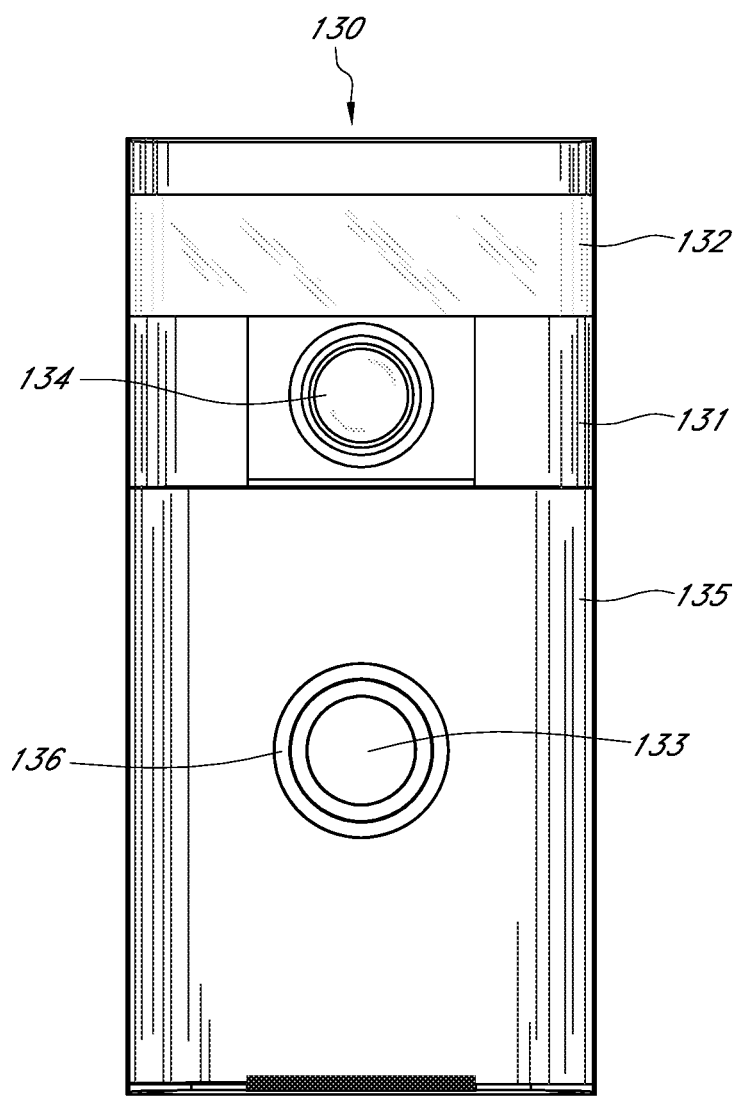
FIG. 20 is a front view of Wireless Communication Doorbell according to an aspect of the present disclosure.

FIG. 20 shows a front view of a Wireless Communication Doorbell 130 according to another aspect of present disclosure. The Wireless Communication Doorbell 130 may have Faceplate 135 mounted to a back plate. Faceplate 135 may be but not limited to brushed aluminum, stainless steel, wood or plastic. Faceplate 135 may protect the contents of Wireless Communication Doorbell 130 and serve as an exterior surface of Wireless Communication Doorbell 130. Faceplate 135 may have a substantially flat profile and include a Button 133 and Light Pipe 136. Button 133 and Light Pipe 136 may have various profiles that may or may not match the profile of Faceplate 135. Light Pipe 136 may be any material, such as transparent plastic, that is capable of allowing light produced from one or more LEDs contained within Wireless Communication Doorbell 130 to be passed out to environment. Button 133 may make contact with a button actuator located within the device when Button 133 is pressed by a visitor. When Button 133 is pressed by the visitor, Button 133 may trigger various functions as further described below. Wireless Communication Doorbell 130 may also have an Enclosure 131 that sits above Faceplate 135. Enclosure 131 may rest flush against the top surface of Faceplate 135, but may also include spaces or gaps between its lower edge and the upper edge of Faceplate 135 thereby allowing sound and or light to traverse through. Enclosure 131 may be a material that permits infrared light to pass through from inside the device to the general environment and vice versa. Wireless Communication Doorbell 130 may also include a Lens 132, in one example, the lens may be a Fresnel lens, which may be patterned to deflect incoming light into one or more infrared sensors located within the device. Wireless Communication Doorbell 130 may also include a Camera 134 that may be capable of capturing video data when activated.

Figure 21:
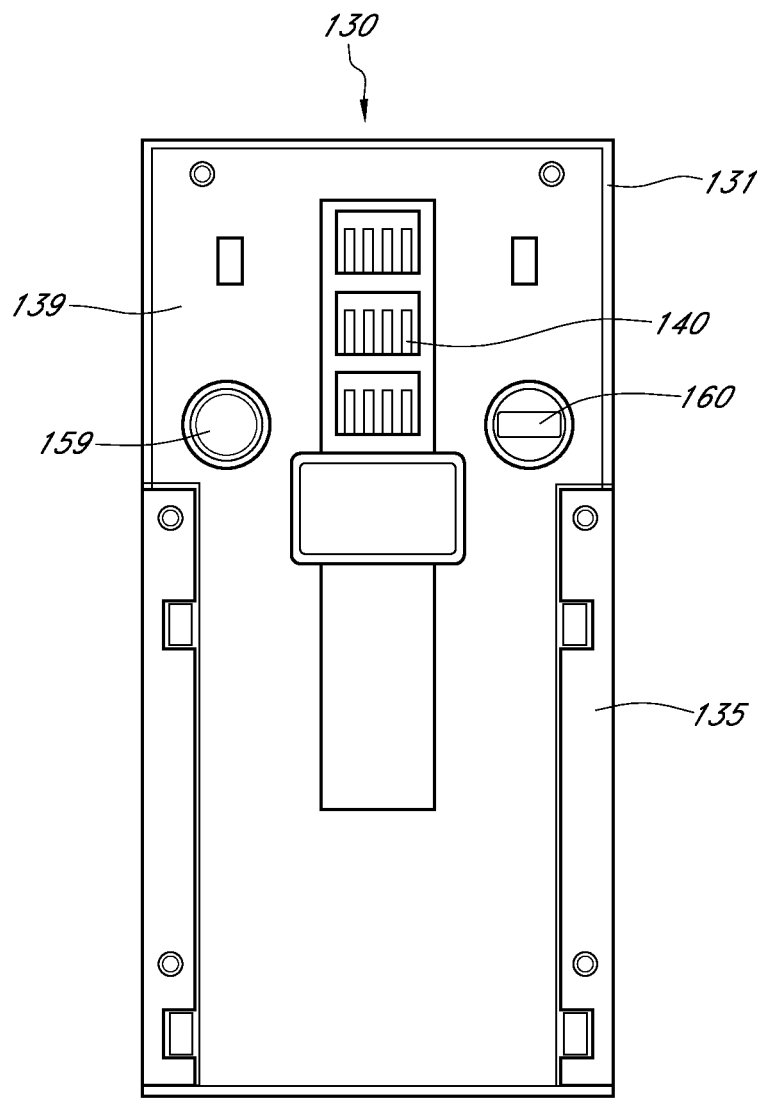
FIG. 21 is a back view of Wireless Communication Doorbell according to an aspect of the present disclosure.

FIG. 21 is a back view of the Wireless Communication Doorbell 130, according to an aspect of the present disclosure. In this view, Enclosure 131 may extend from the front of the device to the back and may fit snugly around the lip of Backplate 139. Backplate 139 may be but not limited to brushed aluminum, stainless steel, wood or plastic. Backplate 139 may protect the contents of Wireless Communication Doorbell 130 and serve as the rear exterior surface of Wireless Communication Doorbell 130. Faceplate 135 may extend from the front and partially wrap around Backplate 139, thereby allowing a coupled connection between itself and Backplate 139. Backplate 139 may have indentations in its structure to facilitate the coupling. Spring Contacts 140 may provide power to the Wireless Communication Doorbell 130 when mated with other conductive contacts connected to a power source. Spring Contacts 140 may be made out of a conducting material such as copper, and may be capable of deflecting when contacted by an inward force, for example the insertion of a mating element. Connector 160 may be a micro-USB or other connecter whereby power and/or data may be supplied to and from the components within Wireless Communication Doorbell 130. Reset Button 159 may be located on Backplate 139 and may make contact with a button actuator located within the device when Reset Button 159 is pressed by Visitor 63. When Reset Button 159 is pressed by User 62, it may trigger various functions as described below.

Figure 22:
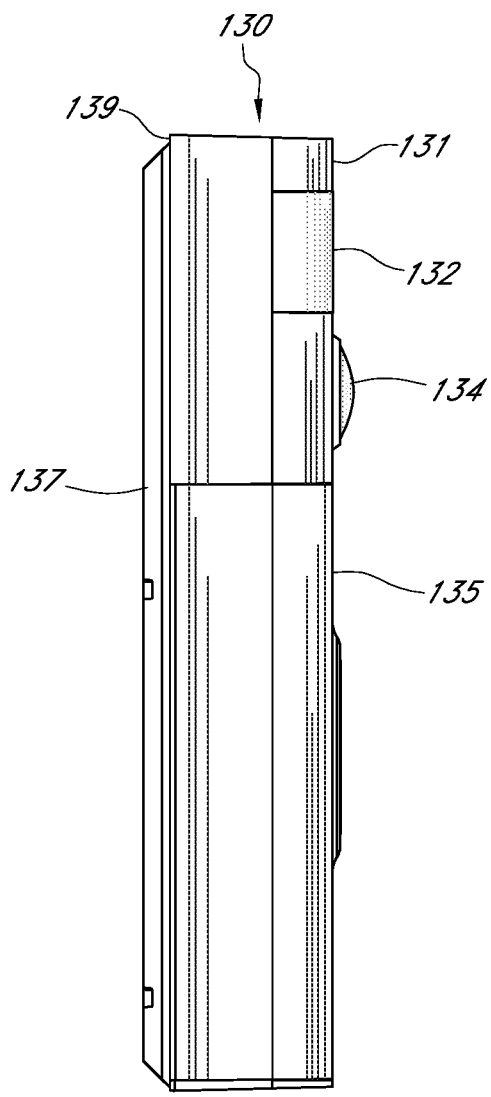
FIG. 22 is a side view of Wireless Communication Doorbell attached to the Mounting Bracket according to an aspect of the present disclosure.

FIG. 22 is a side profile view of Wireless Communication Doorbell 130 coupled to Mounting Bracket 137 according to an aspect of the present disclosure. Mounting Bracket 137 may serve the purpose of mounting the Wireless Communication Doorbell 130 to an exterior surface, such as the exterior of a building. Faceplate 135 may extend from the bottom of the device up to just below the Camera 134, and connect to Backplate 139 as described above. Lens 132 may extend and curl partially around the side of the device. Enclosure 131 may extend and curl around the side and top of Wireless Communication Doorbell 130 and may be coupled to Backplate 139 as described above. Camera 134 may protrude slightly through Enclosure 131, thereby giving it a wider field of view. Mounting Bracket 137 may couple with Backplate 139 such that they may contact each other at various points in a common plane of contact, thereby creating an assembly including Wireless Communication Doorbell 130 and Mounting Bracket 137. The couplings described in this paragraph may be done by, but not limited to, screws, interference fittings, adhesives, or fasteners. Interference fittings may refer to a type of connection where a material relies on pressure and/or gravity coupled with the material's physical strength to support a connection to a different element.

Figure 23:
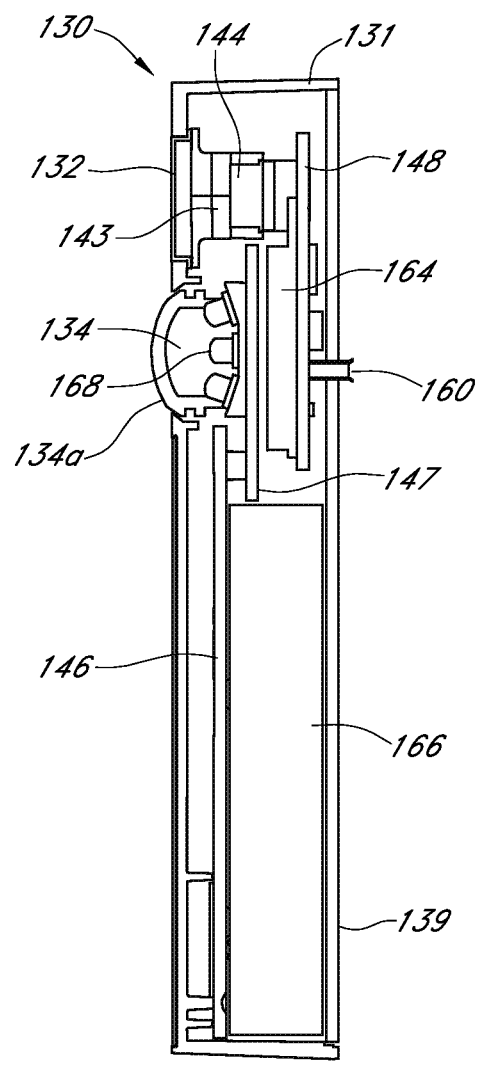
FIG. 23 is cross sectional side view of Wireless Communication Doorbell according to an aspect of the present disclosure.

FIG. 23 is a cross sectional side view of Wireless Communication Doorbell 130 unattached from Mounting Bracket 137. Lens 132 may be assembled co-planarly with Enclosure 131 as shown, but may be situated inward of Wireless Communication Doorbell 130 or may protrude outward through Enclosure 131. Camera 134 may rest on Camera Printed Circuit Board 147 and Camera Lens 134a protrude through an opening in Enclosure 131. Camera Lens 134a may be a lens capable of focusing light into the Camera 134 so that clear images may be taken. Camera Printed Circuit Board may be secured within the Wireless Communication Doorbell using fasteners, interference connections, screws, or adhesives. Camera Printed Circuit Board 147 may contain elements that govern the functionality of the Camera 134 of Wireless Communication Doorbell 130 memory as further described below. Infrared LED's 168 may similarly be situated on Camera Printed Circuit Board 147 and may be triggered to activate when a light sensor detects a lack of light. When activated, the Infrared LEDs 168 may emit infrared light through Enclosure 131 or Camera 134 out into the environment. The Camera 134 which may be configured to detect infrared light, may then capture the light emitted by the Infrared LED's 168 reflecting off objects within the Camera's 134 field of view, thereby granting the Wireless Communication Doorbell 130 the ability to see clearly at night, i.e. night vision.

Referring still to FIG. 23, Front Printed Circuit Board 146 may sit in the lower portion of Wireless Communication Doorbell 130 adjacent to Battery 166. Front Printed Circuit Board 146 may be secured within Wireless Communication Doorbell 130 using fasteners, interference connections, screws, or adhesives. Front Printed Circuit Board 146 may contain elements that control the function of audio and light components as further described below. Battery 166 may provide power to Wireless Communication Doorbell 130 components while receiving power from Spring Contacts 140, thereby engaging in a trickle-charge method of power consumption and supply. Alternatively, Wireless Communication Doorbell 130 may draw power directly from Spring Contacts 140 while relying on Battery 166 only when Spring Contacts 140 are not providing the power necessary for all functions. Power Printed Circuit Board 148 may sit behind Camera Printed Circuit Board 147. Power Printed Circuit Board 148 may be secured within Wireless Communication Doorbell 130 using fasteners, interference connections, screws, or adhesives. Power Printed Circuit Board 148 may contain elements that govern the function of power and device-control components as further described below. Communication Module 164 may be located on Power Printed Circuit Board 148. Communication Module 164 may utilize wireless networks to contact mobile devices and or servers in use by third parties in a separate location, as further described below. Connector 160 may protrude outward from Power Printed Circuit Board 148 and extend through a hole in Backplate 139. Passive Infrared Sensors 144 may be secured on or within Passive Infrared Sensor Holder 143, and the assembly may sit behind Lens 132. Passive Infrared Sensor Holder 143 may be secured to Wireless Communication Doorbell 130 with fasteners, interference connections, screws, or adhesives. Passive Infrared Sensors 144 may be any sensor capable of detecting and communicating the presence of a heat source within its field of view.

Figure 24:
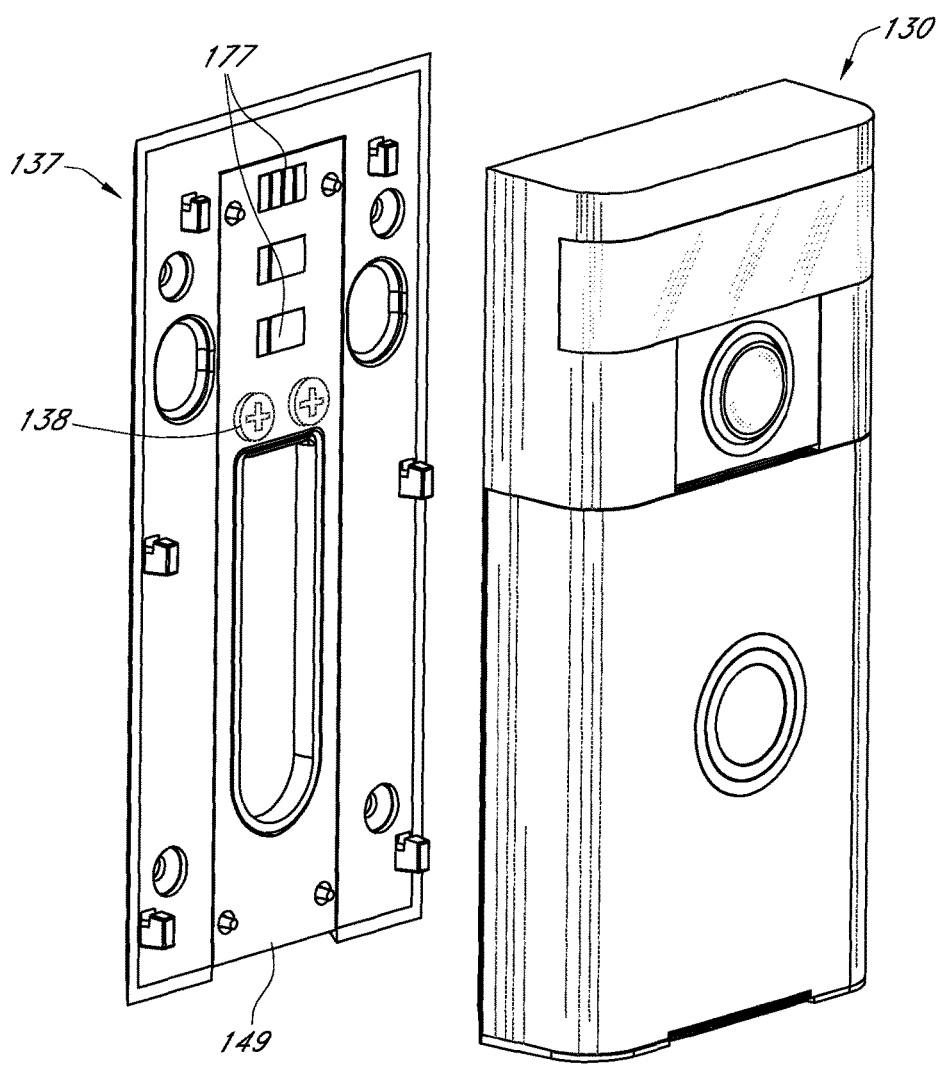
FIG. 24 is an exploded view of the Wireless Communication Doorbell and the Mounting Bracket according to an aspect of the present disclosure.

FIG. 24 is an exploded view of Wireless Communication Doorbell 130 along with unattached Mounting Bracket 137 according to an aspect of the present disclosure. Mounting Bracket 137 may be mounted to a mountable surface such as wood, concrete, stucco, brick and vinyl siding using fasteners, screws, or adhesives. FIG. 24 shows the front side of Mounting Bracket 137. The back side of Mounting Bracket 137 (not shown) may be mounted to one of the aforementioned mountable surfaces. Wireless Communication Doorbell 130 may be coupled to Mounting Bracket 137 using fasteners, screws, adhesives, or through the use of interference connections.

Figure 25:
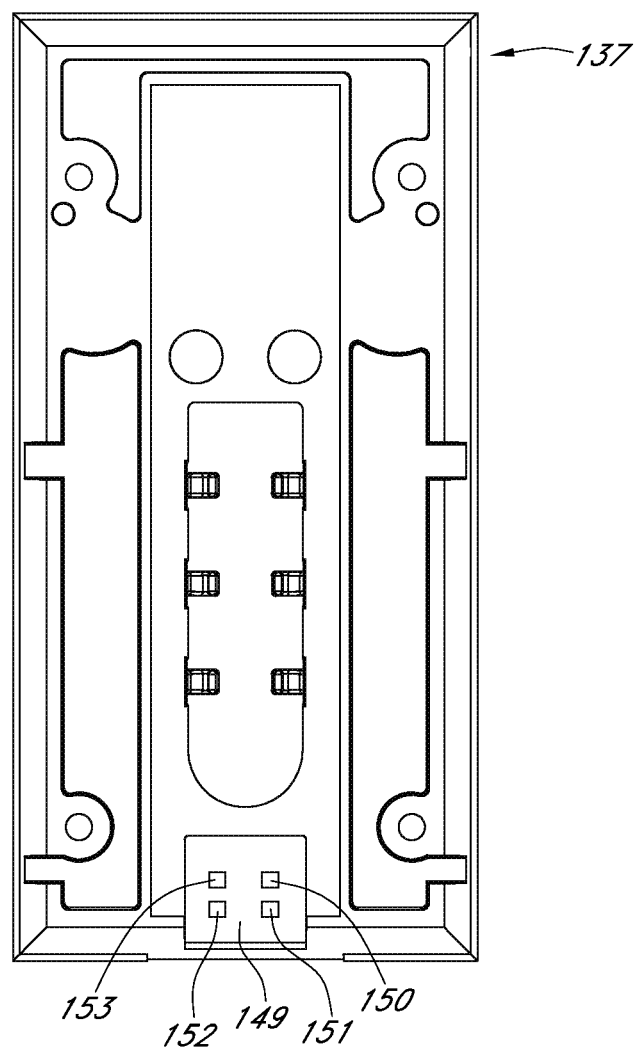
FIG. 25 is a back view of the Mounting Bracket according to an aspect of the present disclosure.

Now referencing FIGS. 21 and 24, Mounting Bracket 137 may include Terminal Screws 138. Terminal Screws 138 may contact electrical wires originating from the mountable surface upon which Mounting Bracket 137 is mounted. Terminal Screws 138 and Electrical Contacts 177 may be electrically connected. If power is supplied to Terminal Screws 138, then Electrical Contacts 177 may also be supplied with power. Electrical Contacts 177 may be made of a conducting material such as but not limited to copper, and may protrude slightly from the face of Mounting Bracket 137 so that they may mate with Spring Contacts 140 located on Backplate 139. Bracket Printed Circuit Board 149 may be secured to Mounting Bracket 137 and may include various sensors, such as weather and geological data sensing elements as further described below, in the space towards the bottom of the back face of Mounting Bracket 137 (as shown in FIG. 25). Bracket Printed Circuit Board 149 may thus be situated outside of Wireless Communication Doorbell 130. Bracket Printed Circuit Board 149 may be secured to Mounting Bracket 137 using fasteners, screws, adhesives, or interference fittings.

FIG. 25 is a back view of Mounting Bracket 137. Towards the bottom of Mounting Bracket 137 may be Bracket Printed Control Board 149, which may contain an Accelerometer 150, Barometer 151, Humidity Sensor 152, and Temperature Sensor 153 whose functions are discussed below.

Figure 26A:
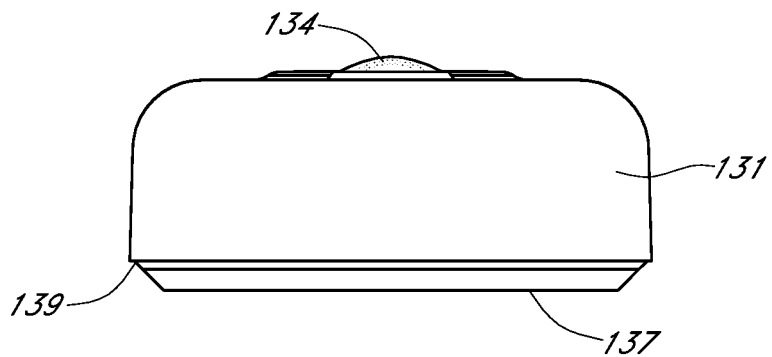
FIG. 26a is a top view of the Wireless Communication Doorbell according to an aspect of the present disclosure.

FIG. 26a is a top view of the Wireless Communication Doorbell 130. As described above, Enclosure 131 may extend from the front face of the device to the back, where it contacts Backplate 139. Camera 134 may protrude slightly beyond the surface of Enclosure 131 thereby giving a larger field of view. The Wireless Communication Doorbell 130 and Mounting Bracket 137 assembly may sit flush against the surface to which the device is mounted.

Figure 26B:
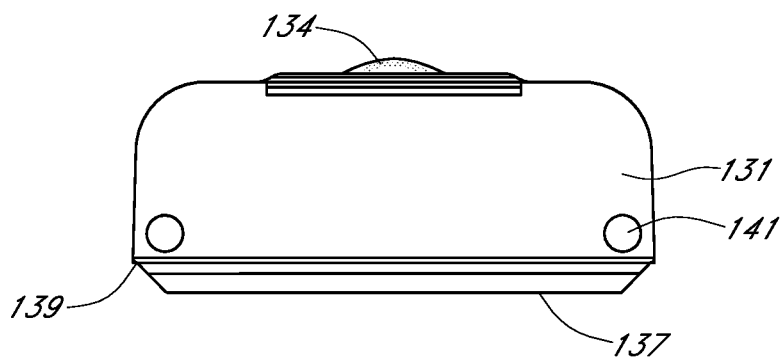
FIG. 26b is a bottom view of the Wireless Communication Doorbell according to an aspect of the present disclosure.

FIG. 26b is a bottom view of the Wireless Communication Doorbell 130. As described above, Faceplate 135 may extend from the front face of the device to the back, where it snugly surrounds Backplate 139. Security Screw Inserts 141 may be holes configured to receive screws.

Figure 27A:
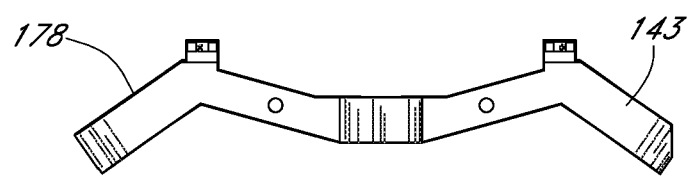
FIG. 27a is top view of the Passive Infrared Sensor Holder according to an aspect of the present disclosure.

FIG. 27a is a top view of the Passive Infrared Sensor Holder 143. Passive Infrared Sensor Holder 143 may be but is not limited to brushed aluminum, stainless steel, wood or plastic, and may be configured to mount Passive Infrared Sensors 144 facing out through Lens 132 at varying angles, thereby allowing the Passive Infrared Sensor 144 field of view to be expanded to 180 degrees or more, and consequently broken up into various zones as further described below. There may be one or more Faces 178 of Passive Infrared Sensor Holder 143 within or on which the Passive Infrared Sensors 144 may be mounted. In this particular aspect, the faces of Passive Infrared Sensor Holder 143 are angled at 55 degrees facing outward from the center face. However, this angle may be increased or decreased as necessary to change or influence the Passive Infrared Sensor 144 field of view.

Figure 27B:
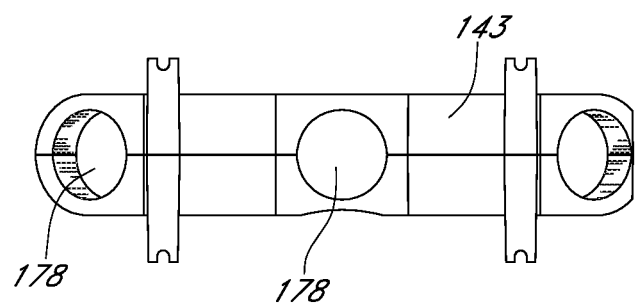
FIG. 27b is a front view of the Passive Infrared Sensor Holder according to an aspect of the present disclosure.

FIG. 27b is a front view of the Passive Infrared Sensor Holder 143 that features the holes in which the Passive Infrared Sensors 144 may be mounted. The two vertical sections may have notches which may be used to secure Passive Infrared Sensor Holder 143 within Wireless Communication Doorbell 130. In the aspect shown in FIG. 27b, Faces 178 are shown as holes but they may also be solid flat faces upon which Passive Infrared Sensors 144 may be mounted. Generally, they may be any physical structure whose purpose is to house and secure Passive Infrared Sensors 144 in place.

Figure 28A:
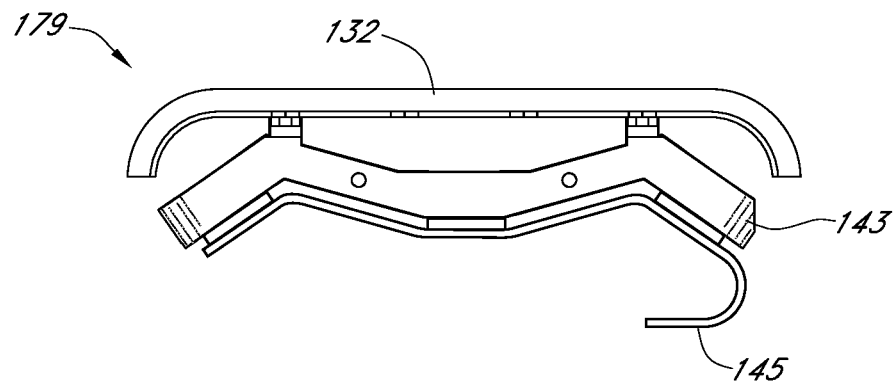
FIG. 28a is a top view of the Passive Infrared Sensor Assembly according to an aspect of the present disclosure.

FIG. 28a is a top view of the Passive Infrared Sensor Assembly 179. The Passive Infrared Sensor Holder 143 may be secured to the rear face of the Lens 132 as described above. Flexible Power Circuit 145 may be any material or component capable of delivering power or data to and from Passive Infrared Sensors 144 and may be contoured along the non-linear route as required by the shape of the Passive Infrared Sensor Holder 143. The Flexible Power Circuit 145 may connect to, draw power from, and transmit data to and from, the Power Printed Circuit Board 148.

Figure 28B:
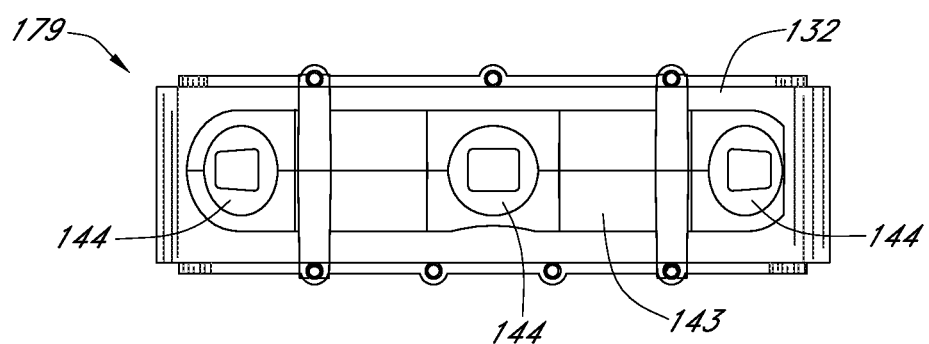
FIG. 28b is a front view of the Passive Infrared Sensor Assembly according to an aspect of the present disclosure.

FIG. 28b is a front view of the Passive Infrared Sensor Assembly 179. The Passive Infrared Sensors 144 may be mounted within the holes located in the Passive Infrared Sensor Holder 143 and the assembly may be secured to the rear face of the Lens 132 via the notches at the ends of the vertical towers located on the Passive Infrared Sensor Holder 143.

Figure 29:
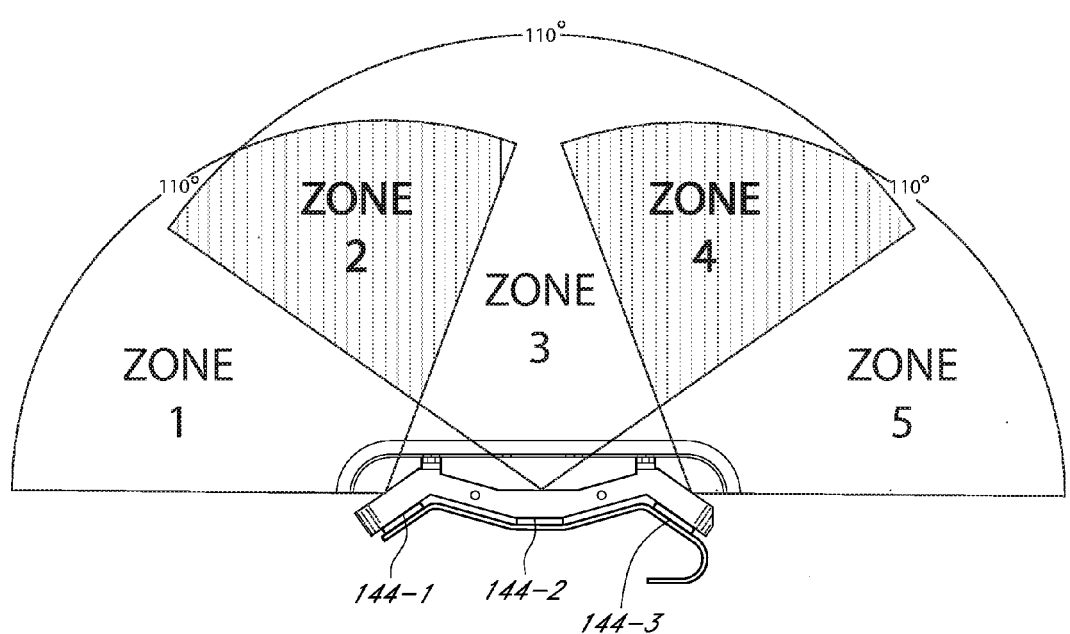
FIG. 29 is a top view of the Passive Infrared Sensor Assembly and Passive Infrared Sensor field of view according to an aspect of the present disclosure.

FIG. 29 is a top down view of the Passive Infrared Sensor Assembly 179 describing the Passive Infrared Sensor 144 fields of view. Zone 1 is the area that is visible only to Passive Infrared Sensor 144-1. Zone 2 is the area that is visible only to Passive Infrared Sensors 144-1 and 144-2. Zone 3 is the area that is visible only to Passive Infrared Sensor 144-2. Zone 4 is the area that is visible only to Passive Infrared Sensors 144-2 and 144-3. Zone 5 is the area that is visible only to Passive Infrared Sensor 144-3. The Wireless Communication Doorbell 130 may be capable of determining the direction that an object is moving based upon which zones are triggered in a time sequence.

Figure 30:
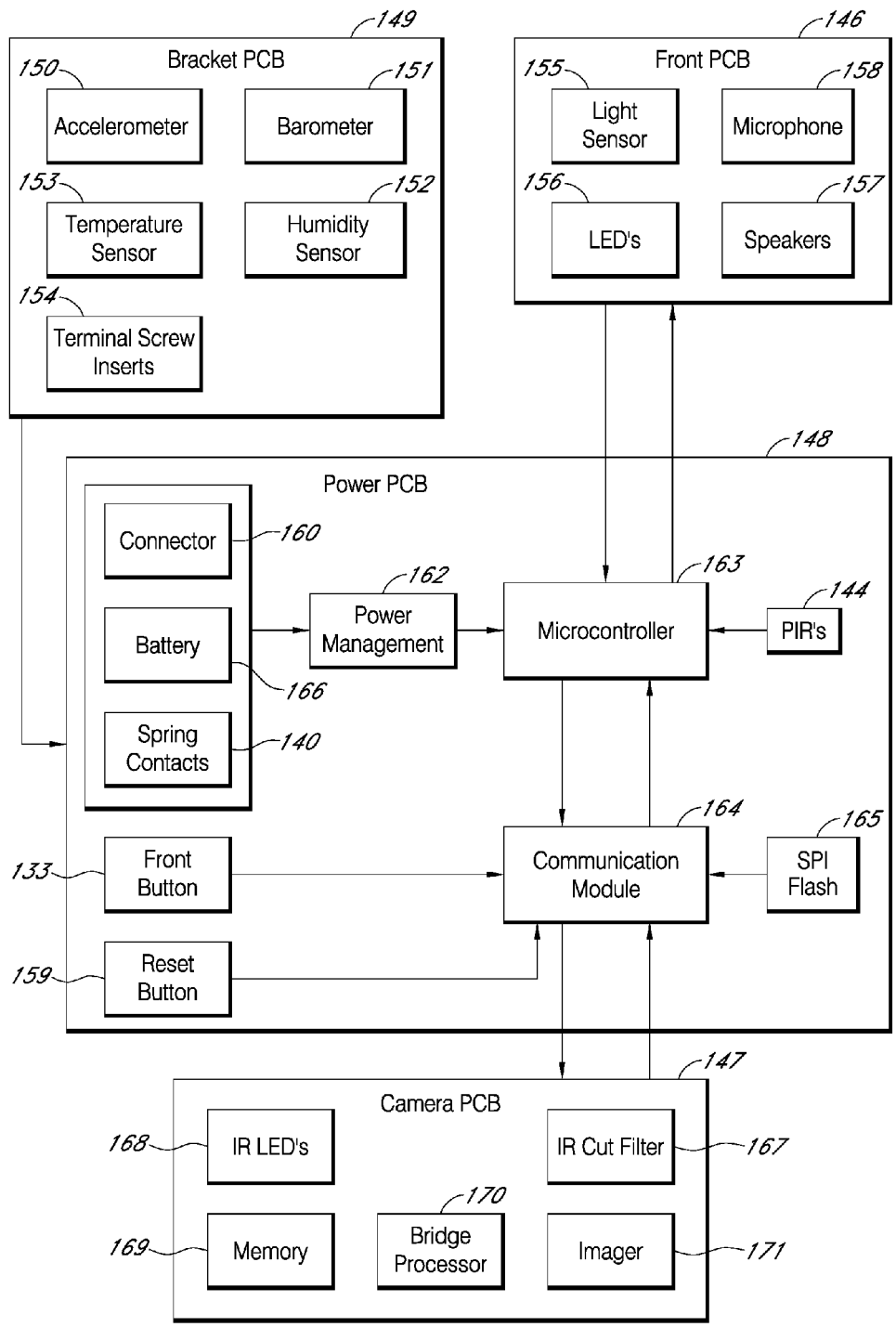
FIG. 30 an entity relationship diagram displaying components and multiple devices in communication according to the system and method of present disclosure.

FIG. 30 is an entity relationship diagram of the application and components within or in communication with Wireless Communication Doorbell 130 according to an aspect of the present disclosure. Bracket Printed Circuit Board 149 may contain an Accelerometer 150, a Barometer 151, a Humidity Sensor 152, a Temperature Sensor 153, and Terminal Screw Inserts 154. Accelerometer 150 may be one or more sensors capable of sensing motion or acceleration. Barometer 151 may be one or more sensors capable of determining the atmospheric pressure of the surrounding environment in which Bracket Printed Circuit Board 149 may be located. Humidity Sensor 152 may be one or more sensors capable of determining the amount of water present in the atmospheric environment in which Bracket Printed Circuit Board 149 may be located. Temperature Sensor 153 may be one or more sensors capable of determining the temperature of the general environment in which Bracket Printed Circuit Board 149 may be located. Bracket Printed Circuit Board 149 may be located outside of Wireless Communication Doorbell 130 so as to minimize interference from heat, pressure, moisture or other stimuli generated from Wireless Communication Doorbell's 130 components. Terminal Screw Inserts 154 may be configured to receive Terminal Screws 138 and transmit power to Electrical Contacts 177 (shown in FIG. 24). Bracket Printed Circuit Board 149 may be electrically and/or mechanically coupled to Power Printed Circuit board 148 through the operation of Terminal Screws 138, Terminal Screw Inserts 154, Spring Contacts 140, and Electrical Contacts 177. Terminal Screws 138 may contact electrical wires coming from the exterior mountable surface, such as the wall of a building, thereby becoming electrically charged. Upon Terminal Screws 138 being secured within Terminal Screw Inserts 154, power may be transferred to Bracket Printed Circuit Board 149, and all elements associated therewith, including Electrical Contacts 177. Electrical Contacts 177 may transfer electrical power to Power Printed Circuit Board 148 by mating with Spring Contacts 140.

Front Printed Circuit Board 146 may contain a Light Sensor 155, one or more LED's 156, Speakers 157, and a Microphone 158. Light Sensor 155 may be one or more sensors capable of detecting the level of ambient light of the surrounding environment in which Wireless Communication Doorbell 130 may be located. LED's 156 may be one or more light emitting diodes capable of producing visible light when supplied with power. Speakers 157 may be an electromechanical device capable of producing sound in response to an electrical signal input. Microphone 158 may be an acoustic-to-electric transducer or sensor capable of converting sound waves into an electrical signal. When activated, LED's 156 may illuminate Light Pipe 136 (shown in FIG. 20). Front Printed Circuit Board 146 and all elements contained therein may be electrically coupled to Power Printed Circuit Board 148, thereby allowing data and/or power to be transferred to and from Power Printed Circuit Board 148 and Front Printed Circuit Board 146.

Power Printed Circuit Board 148 may contain Power Management 162, Microcontroller 163, Communication Module 164, and SPI Flash 165. Power Management 162 may be an integrated circuit capable of arbitrating between multiple voltage rails thereby selecting the source of power for Wireless Communication Doorbell 130. Battery 166, Spring Contacts 140, and Connector 160 may each provide power to Power Management 162. Power Management 162 may have separate power rails dedicated to Battery 166, Spring Contacts 140, and Connector 160. In one aspect of the present disclosure, Power Management 162 may continuously draw power from Battery 166 to power Wireless Communication Doorbell 130 while at the same time routing power from Spring Contacts 140 or Connector 160 to Battery 166 thereby allowing Battery 166 to maintain a constant level of charge. Alternatively, Power Management 162 may continuously draw power from Spring Contacts 140 or Connector 160 to power Wireless Communication Doorbell 130 while only drawing from Battery 166 when the power from Spring Contacts 140 or Connector 160 is low or insufficient. Power Management 162 may also serve as a conduit for data between Connector 160 and Microcontroller 163.

Microcontroller 163 may be an integrated circuit containing a processor core, memory, and programmable input/output peripherals. Microcontroller 163 may receive input signals such as data or power from Passive Infrared Sensors 144, Power Management 162, Light Sensor 155, Microphone 158, and Communication Module 164 and perform various functions as further described below. When Microcontroller 163 is triggered by Passive Infrared Sensors 144, Microcontroller 163 may perform various functions such as those substantially described in FIG. 31. When Light Sensor 155 detects a lack of ambient light, Light Sensor 155 may trigger Microcontroller 163 to enable "night vision" as further described below. Microcontroller 163 may also act as a conduit for data communicated between various elements and Communication Module 164.

Still referencing FIG. 30, Communication Module 164 may be an integrated circuit containing a processor core, memory, and programmable input/output peripherals. Communication Module 164 may also be configured to transmit data wirelessly to a third party server at a separate location. The wireless communication may be done by through various wireless networks such as but not limited to available Wi-Fi, cellular, Bluetooth, or satellite networks. Communication Module 164 may receive inputs, such as power or data, from Camera Printed Circuit Board 147, Microcontroller 163, Button 133, Reset Button 159 and SPI Flash 165. When Button 133 is pressed by a user, Communication Module 164 may be triggered to perform various functions, such as those substantially described in FIG. 30. When Reset Button 159 is pressed by a user, Communication Module 164 may be triggered to erase any data stored on SPI Flash 165 and/or on SD RAM 169. Communication Module 164 may also act as a conduit for data communicated between various elements and Microcontroller 163. SPI Flash 165 may be flash memory configured to store and/or transmit data.

Still referencing FIG. 30, Camera Printed Circuit Board 147 may contain elements integral to the operation of Camera 134. Imager 171 may be a video recording sensor or camera chip. In one aspect of the present disclosure, Imager 171 may, in one aspect of the present disclosure, contain a CMOS Array and may be capable of recording high definition 720p video files. Bridge Processor 170 may be an encoding and compression chip. Bridge Processor 170 may process video recorded by Imager 171 and audio recorded by Microphone 158 and may transform this data into a form suitable for wireless transfer by the Communication Module to the third party server. SD RAM 169 may be volatile memory that may be used when data is being buffered or encoded by Bridge Processor 170. IR LED's 168 may be light emitting diodes capable of radiating infrared light. IR Cut Filter 167 may be a system that when triggered, configures Imager 171 to see primarily infrared light as opposed to visible light. When Light Sensor 155 detects a lack of ambient light (this may be a level that impedes Imager 171 performance in the visible spectrum), IR LED's 168 may shine infrared light through the Wireless Communication Doorbell 130 enclosure out to the environment, and IR Cut Filter 167 may enable Imager 171 to see this light as it is reflected or refracted off objects within its field of view. This process may provide Wireless Communication Doorbell 130 with the "night vision" function mentioned above.

Figure 31:
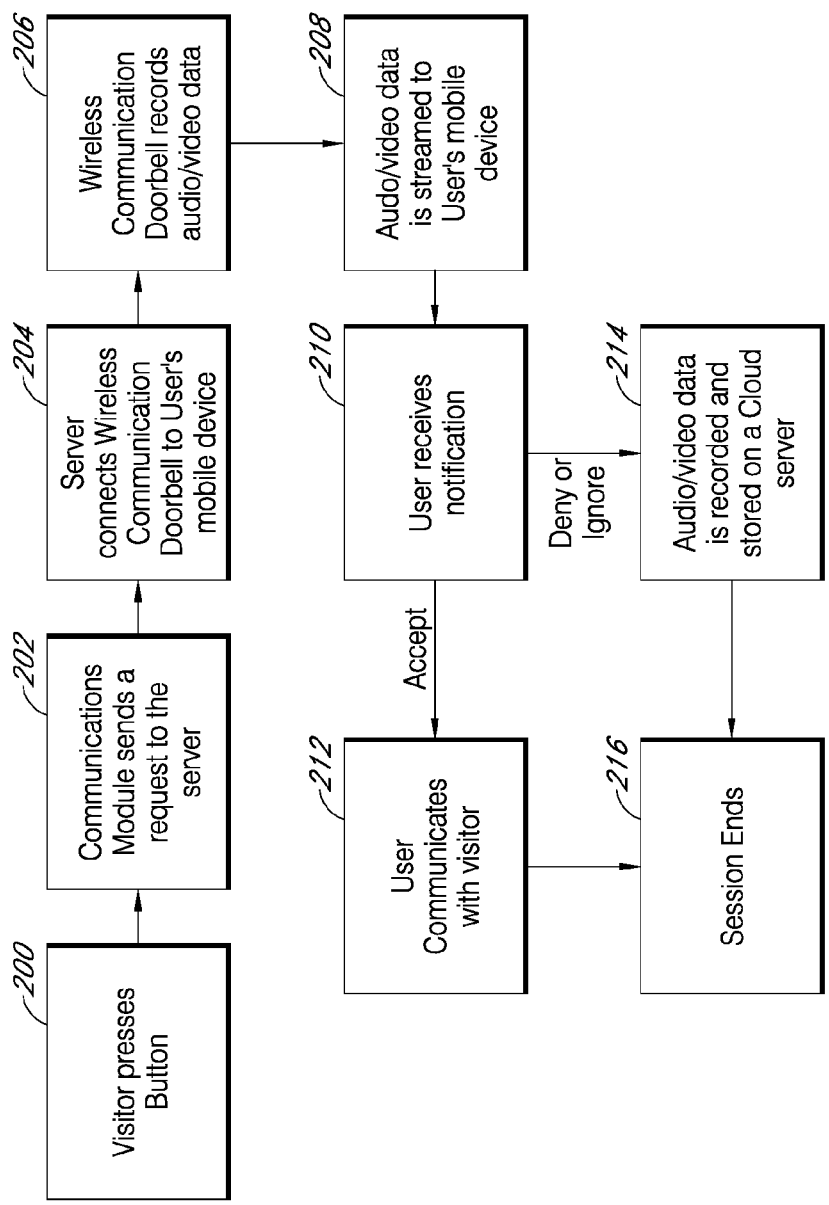
FIG. 31 is a flowchart showing operation of one aspect of the present disclosure.

FIG. 31 is a flowchart showing an operation of one aspect of the present disclosure. At step 200, a visitor may press Button 133 on the Wireless Communication Doorbell. At step 202, the Communications Module 164 sends a request to a server. Once the server receives the request, at step 204 the server may connect the Wireless Communication Doorbell 130 to the User's mobile device. This may be done through various wireless communication networks such as but not limited to available Wi-Fi, cellular, Bluetooth, or satellite networks. In step 206, the Wireless Communication Doorbell 130 may record available audio and/or video data using Camera 134, Microphone 158, or any other sensor available. At step 208, the recorded data or a notification may be sent to the User's mobile device. At step 210, the User may receive a notification on their mobile device prompting them to either accept or deny. If the user elects to deny the notification, then at step 214 the session ends and the connection between the Wireless Communication Doorbell 130 and the User's mobile device may be severed. If the user elects to accept the notification, then at step 212 the User speaks to the visitor through the mobile device while being provided audio and/or video data captured by the Camera 134, Microphone 158, and other sensors. At the end of the call, the User may terminate the connection between the User's mobile device and the Wireless Communication Doorbell and the session ends at Step 214.

Figure 32:
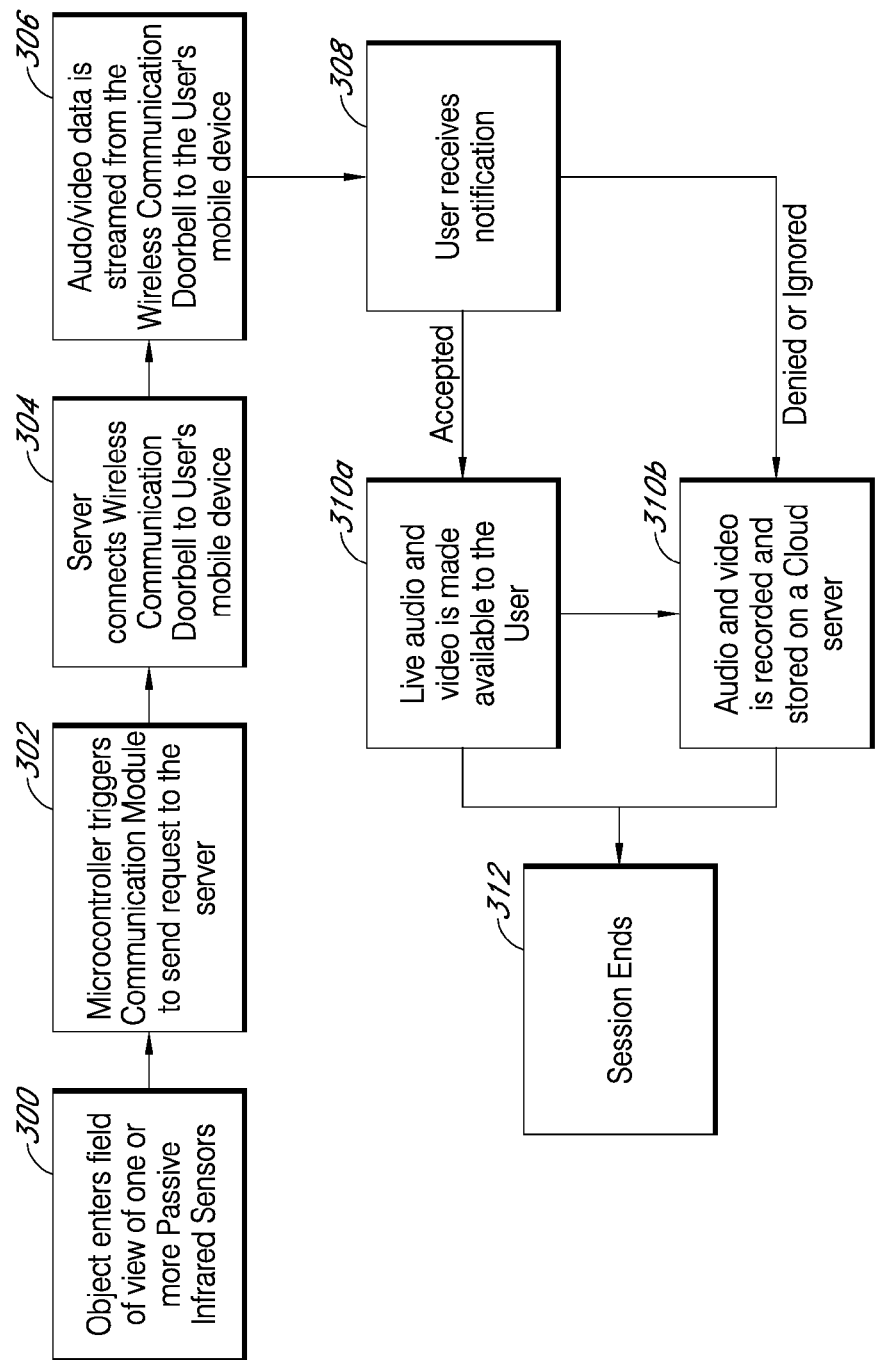
FIG. 32 is a flowchart showing operation of one aspect of the present disclosure.

FIG. 32 is a flowchart showing an operation of one aspect of the present disclosure. At step 300, an object may move into the field of view of one or more Passive Infrared Sensors 144. At step 302, Passive Infrared Sensors 144 may trigger Microcontroller 163 then, Microcontroller 163 may trigger the Communication Module 164 to send a request to the server. At step 304, the server may connect Wireless Communication Doorbell to the User's mobile device. This may be done through various wireless communication networks such as but not limited to available Wi-Fi, cellular, Bluetooth, or satellite networks. In step 306, the Wireless Communication Doorbell 130 may record available audio and or video data using Camera 134, Microphone 158, or any other sensor available and stream the data to the User's mobile device. In step 308, the user may receive a notification prompting the user to either accept or deny/ignore the notification. If the notification is accepted, the live audio/video data may be displayed on the User's mobile device thereby allowing the User surveillance from the perspective of the Wireless Communication Doorbell 130. When the User is satisfied with this function, the User may sever the connection at Step 312 whereby the session ends. If the User elects to deny the notification in step 308 or ignore it past a specified time, the connection to the User device is severed and the audio/video data may be stored on a cloud server, whereby the User may be able to view it later at their convenience. The Wireless Communication Doorbell 130 may be configured to record for a specified period of time in the event the notification in step 308 is denied or ignored. If such a time period is set, the Wireless Communication Doorbell 130 may record data for that period of time before ceasing operation in step 312 thereby ending the session.

Figure 33:
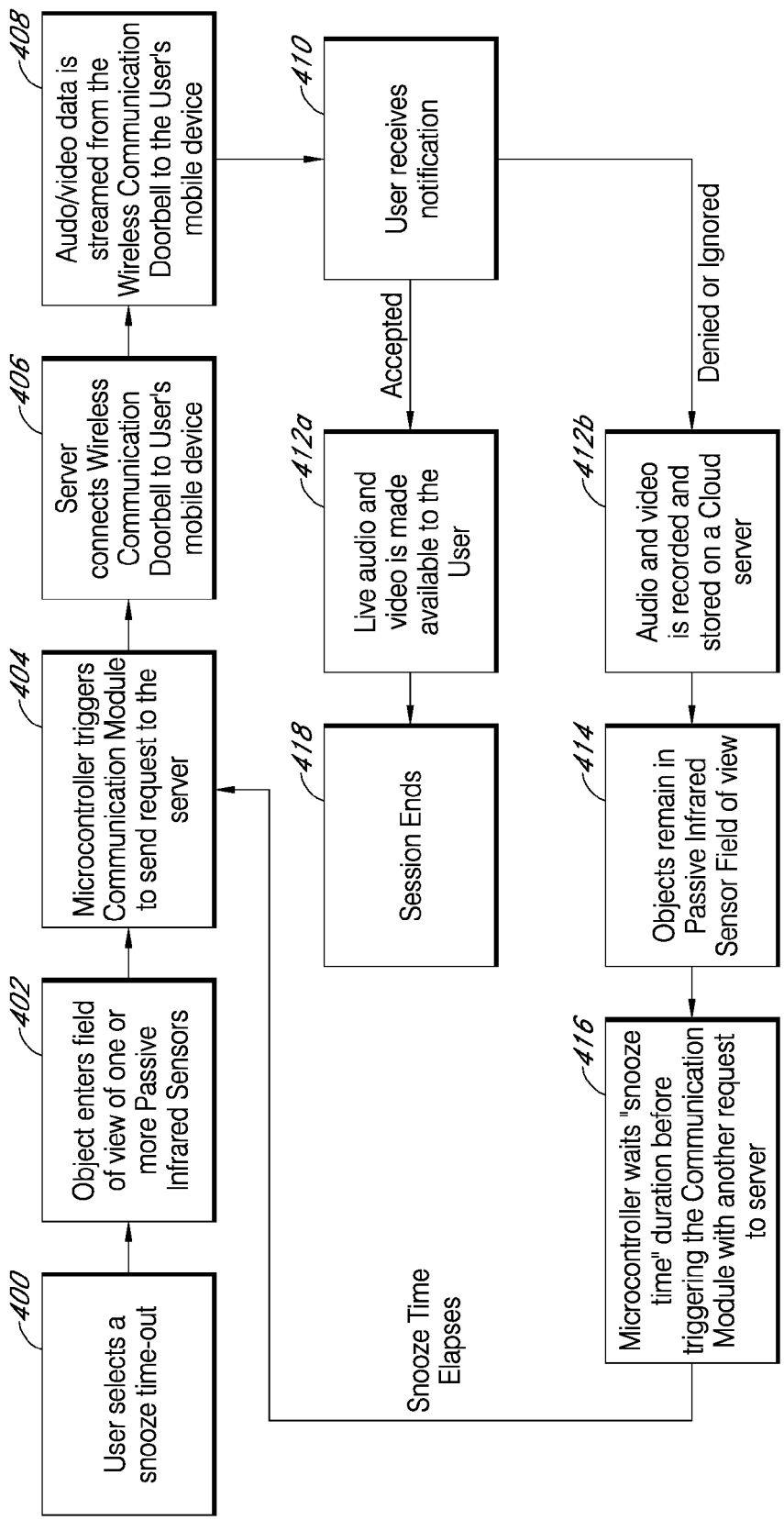
FIG. 33 is a flowchart showing operation of one aspect of the present disclosure.

FIG. 33 is a flowchart showing an operation of one aspect of the present disclosure. At step 400, the User may select a "snooze time-out," which is a time period that whereby the system may deactivate or otherwise not respond to stimuli (such as light, sound, or heat signatures) after an operation is performed, e.g. a notification is either accepted or denied/ignored. Assume for the below, a snooze-time out of 15 minutes has been set by the User. At step 402, an object may move into the field of view of one or more Passive Infrared Sensors 144. At step 404, the Microcontroller 163 may trigger the Communication module 164 to send a request to the server. In step 406, the server may connect Wireless Communication Doorbell 130 to the User's mobile device using any of the wireless communication systems mentioned above. At step 408, audio/video data captured by the Wireless Communication Doorbell 130 may be streamed to the User's mobile device. At step 410, the user may receive a notification prompting the User to either accept or deny/ignore the request. If the request is denied or ignored, then at step 412b audio/video may be recorded and stored on a cloud server. After the Wireless Communication Doorbell 130 finishes recording, the objects remain in the Passive Infrared Sensor 144 field of view in step 414. In step 416, the Microcontroller 163 waits for the "snooze time" to elapse, e.g. 15 minutes, before triggering the Communications Module 164 to submit another request to the server. After the snooze time, e.g. 15 minutes, elapses, the system reverts back to step 404 and progresses normally. The cycle may continue like this until the User accepts the notification request in step 410. At this point, at step 412a, live audio and video data is displayed on the User's mobile device thereby allowing the user surveillance from the perspective of the Wireless Communication Doorbell 130. At the User's request, the connection may be severed and the session ends at step 418. At this point the User may elect for the system to revert back to step 416 whereby there may be no response until the snooze time, e.g. 15 minutes, has elapsed from the end of the previous session, or the User may elect for the system to return to step 402 and receive a notification the next time an object is perceived by one or more of the Passive Infrared Sensors 144.

In certain embodiments according to the present disclosure, the user may remotely modify settings of the Wireless Communication Doorbell 130. For example, the user may toggle one or more zones (areas of the fields of view of the Passive Infrared Sensors 144, FIG. 29) ON and OFF. In another example, the user may increase and decrease the range (or sensitivity) of the Passive Infrared Sensors 144. Changes to the settings of the Wireless Communication Doorbell 130 may affect the notifications that the user receives from the Wireless Communication Doorbell 130. For example, the user may turn off selected zones and/or decrease the range of the Passive Infrared Sensors 144 to reduce "false alarm" alerts, such as those generated by passing cars.

Figure 34:
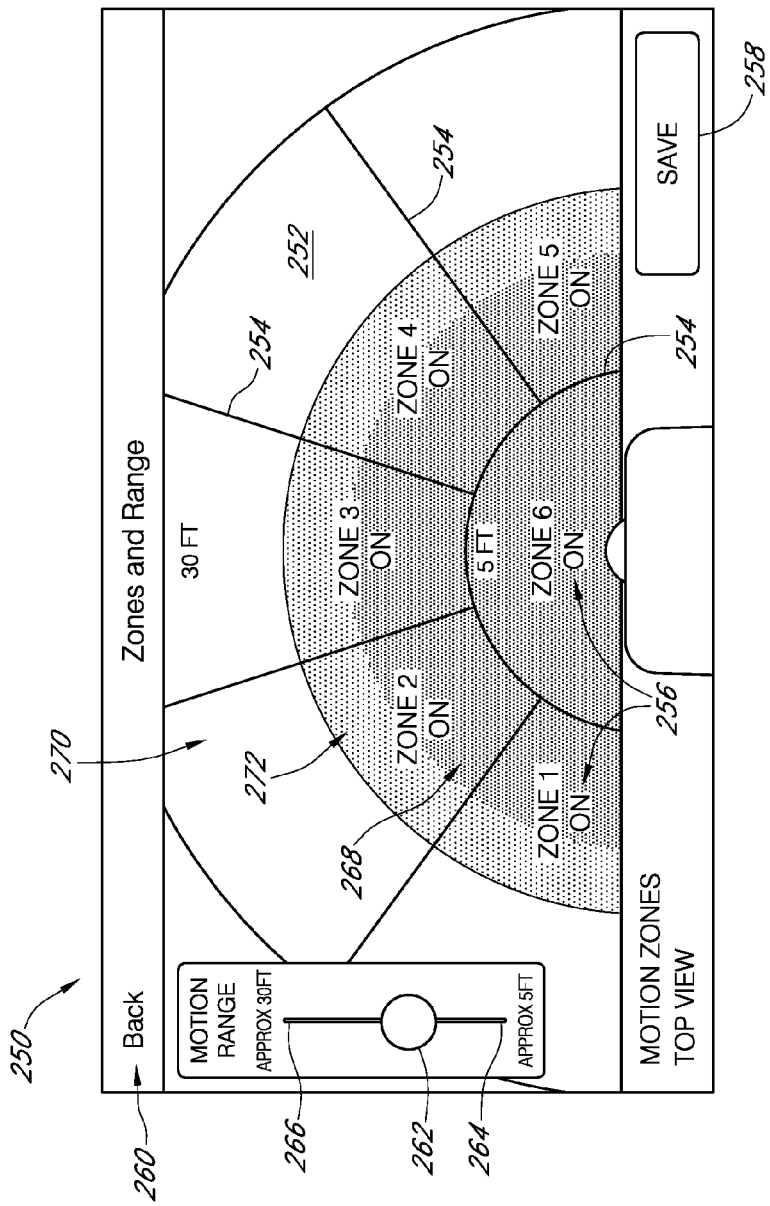
FIGS. 34-40 are screenshots of a graphical user interface for modifying settings of the Wireless Communication Doorbell according to an aspect of the present disclosure.

FIGS. 34-40 are screenshots of one example of a graphical user interface (GUI) 250 for modifying settings of the Wireless Communication Doorbell according to an aspect of the present disclosure. In one example, the user may modify settings by selecting a menu choice from within a software application installed on the user's computer or mobile device. With reference to FIG. 34, upon selecting the menu choice for modifying settings of the Wireless Communication Doorbell, the software application may display, on a display of the user's computer or mobile device, a diagram 252 of the field of view about the Wireless Communication Doorbell. The diagram 252 may indicate the motion zones within the field of view, with each zone delineated by boundary lines 254 and enumerated with a unique zone identifier, such as a number (Zones 1-6). In the embodiment illustrated in FIG. 34, the zone diagram 252 is a top view, but in alternative embodiments the zone diagram 252 may be presented from a different perspective, such as a front view or a side view.

With further reference to FIG. 34, the zone diagram 252 further includes an ON/OFF indicator 256 for each zone. In the configuration of FIG. 34, Zones 1-6 are all ON. The user may toggle selected ones of the zones ON and OFF by individually selecting each zone. For example, if the display of the user's computer or mobile device is a touchscreen, the user may toggle a selected zone by touching that area of the touchscreen. In another example, the user may select zones to toggle ON/OFF by clicking on those zones in the GUI 250 using a pointing device such as a mouse or a trackball. Zones that are ON will trigger motion alerts when movement is detected in those zones, while no motion alerts will be triggered for any zones that are OFF.

Figure 35:
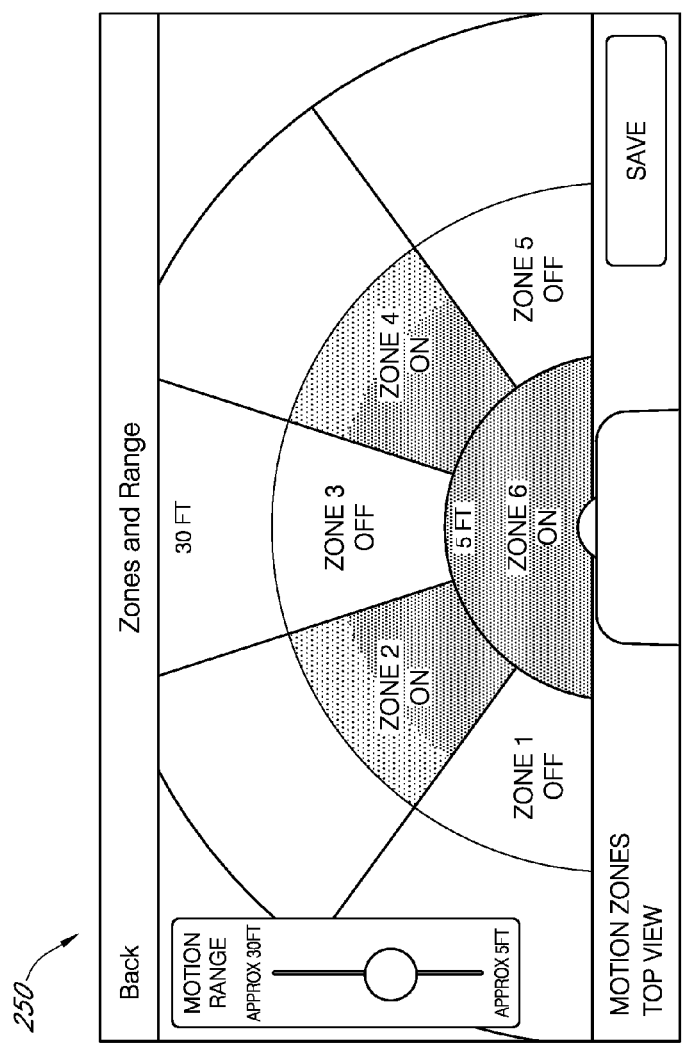
Figure 36:
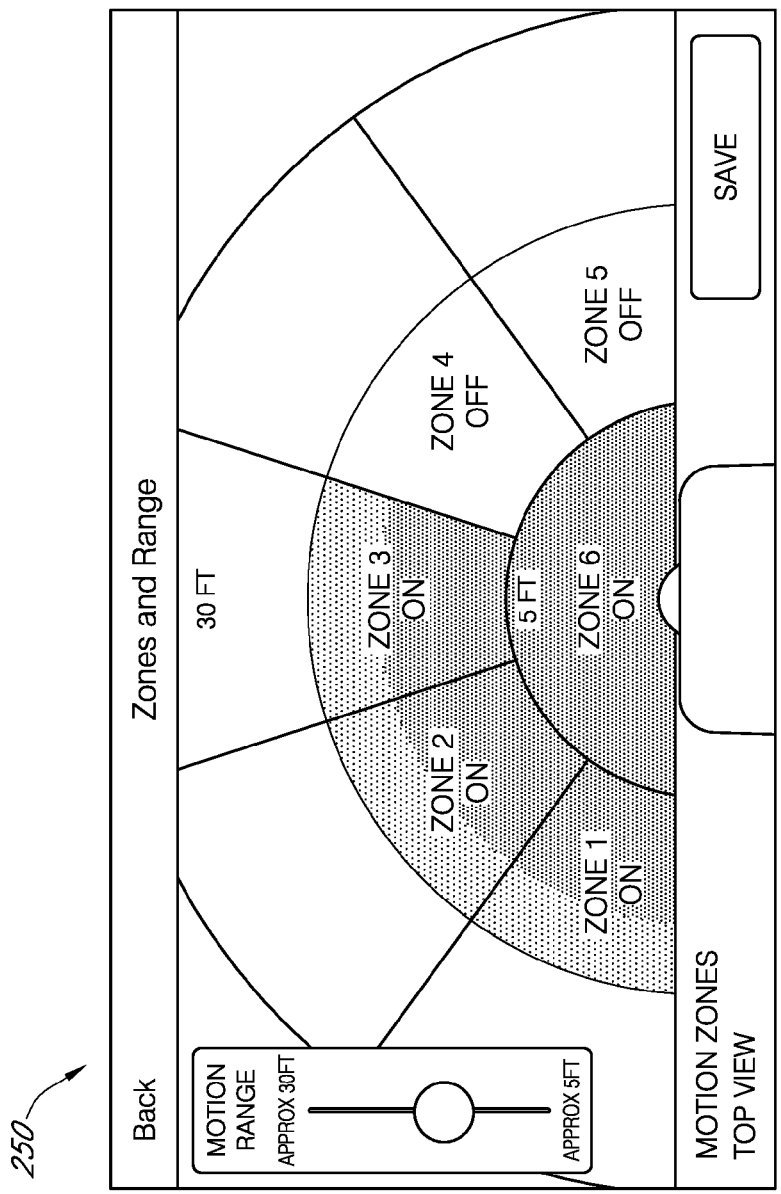
Figure 37:
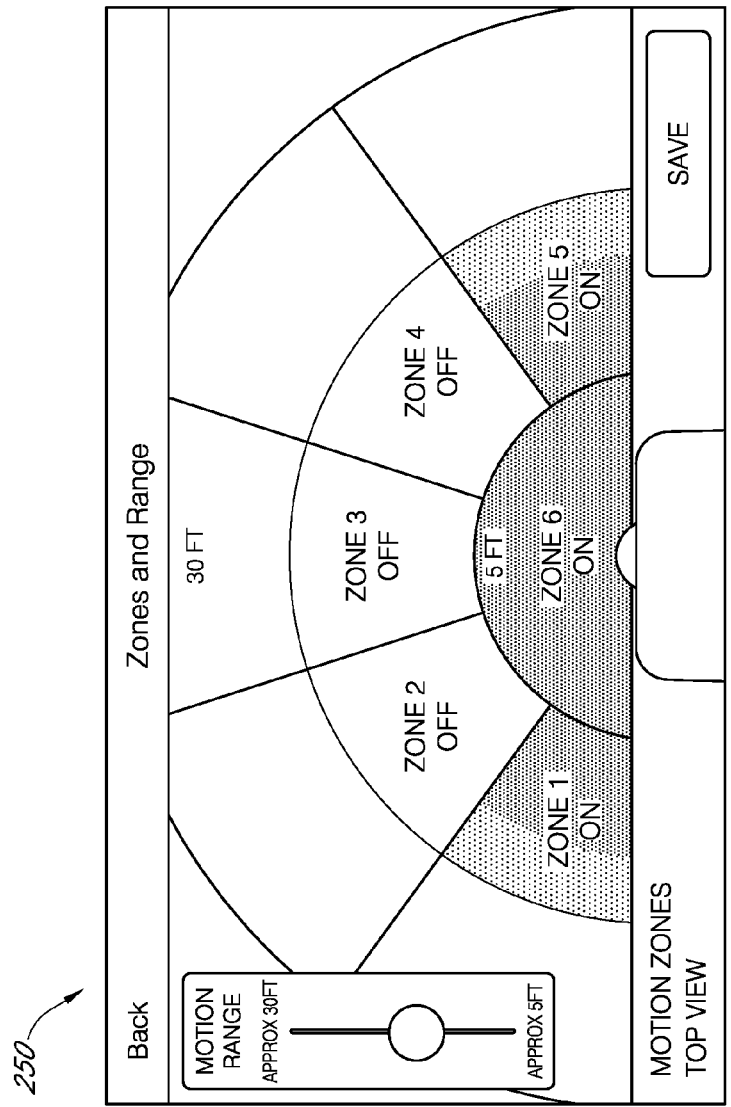
Figure 38:
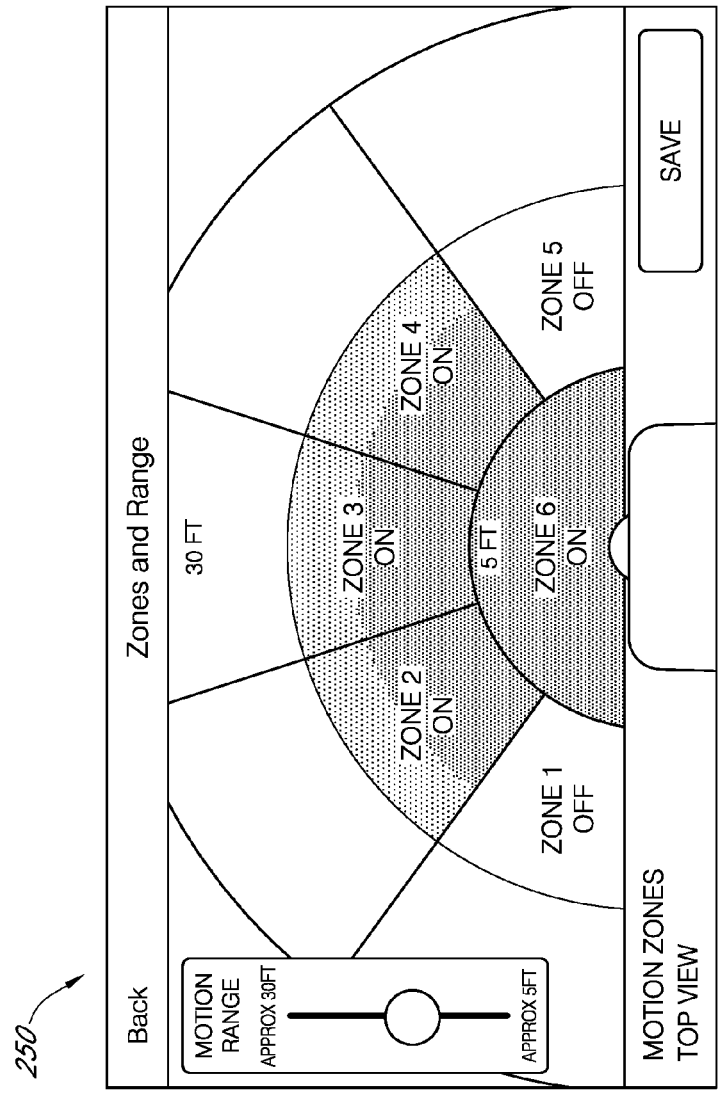
Figure 39:
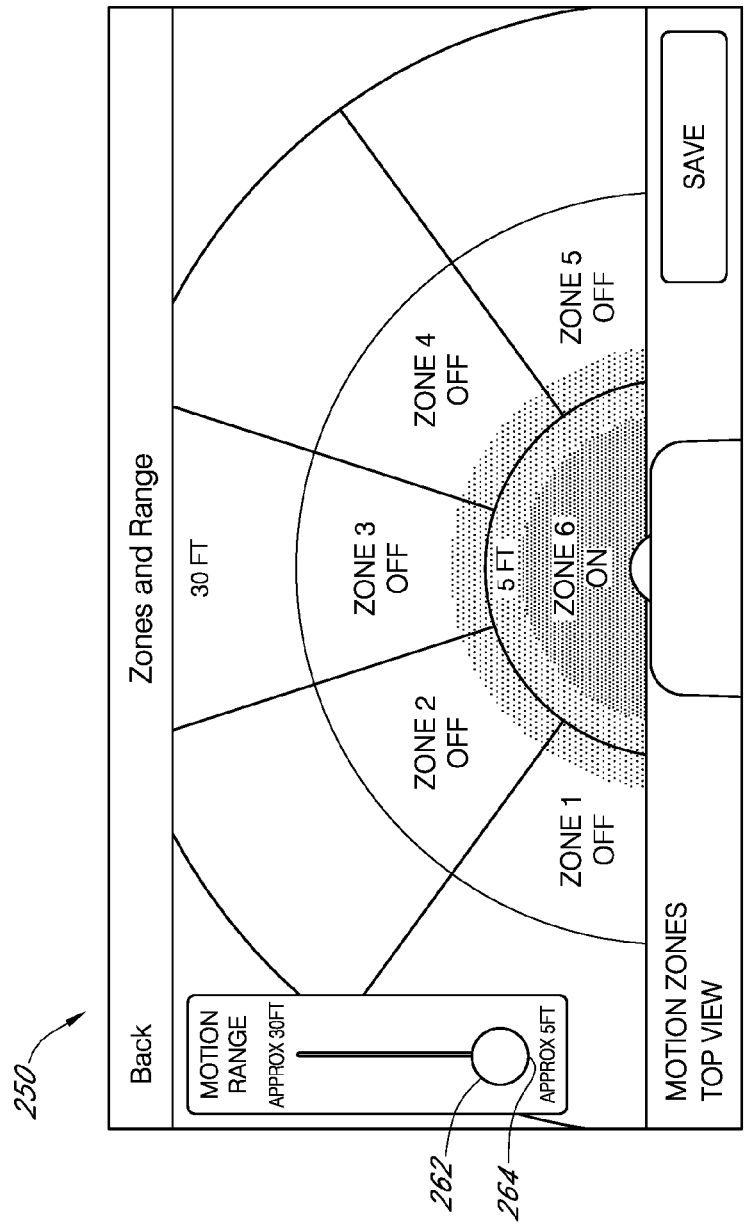
Figure 40:
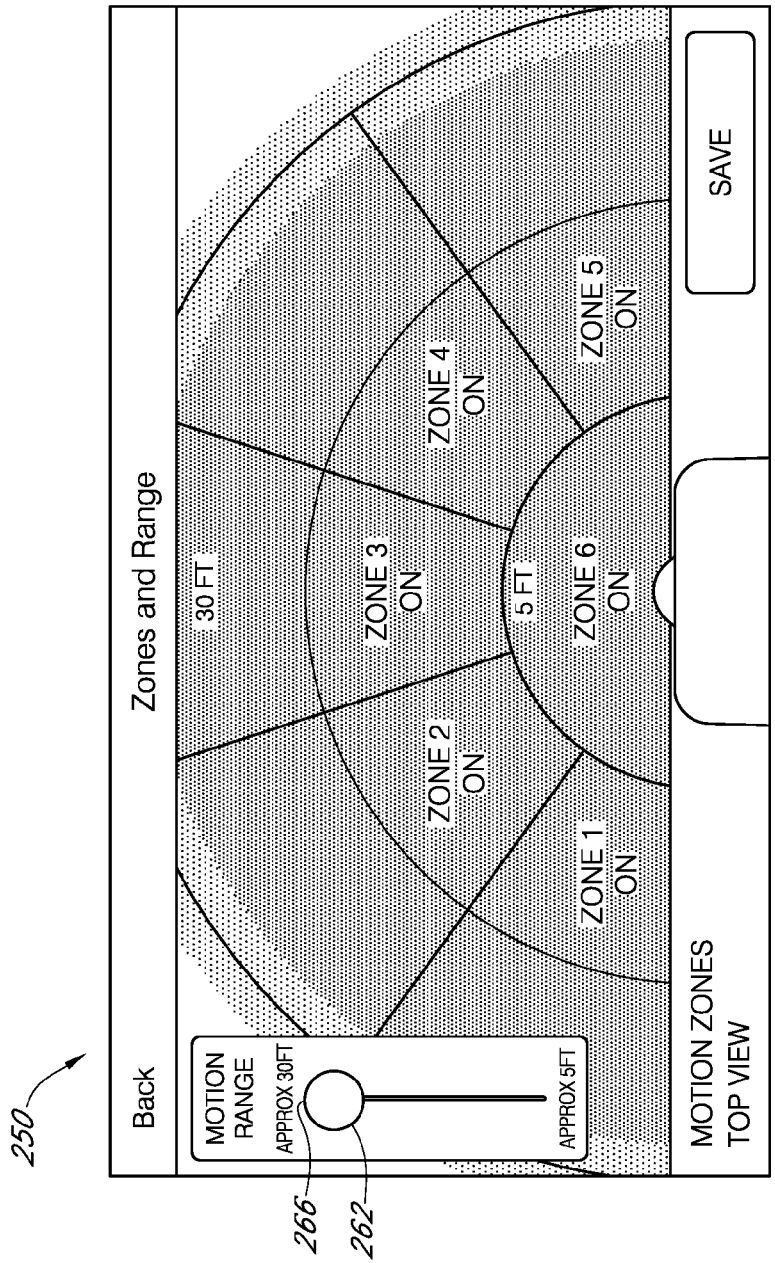

In certain of the present embodiments, the user may toggle individual zones ON and OFF independently of the other zones, such that any combination of zones may be ON at any given time. For example, FIGS. 35-38 illustrate some possible combinations. With reference to FIG. 35, Zones 1, 3, and 5 are OFF, while Zones 2, 4, and 6 are ON. With reference to FIG. 36, Zones 4 and 5 are OFF, while Zones 1-3 and 6 are ON. With reference to FIG. 37, Zones 2-4 are OFF, while Zones 1, 5, and 6 are ON. With reference to FIG. 38, Zones 1 and 5 are OFF, while Zones 2-4 and 6 are ON. With reference to FIG. 34, the GUI 250 further includes a SAVE button 258. When the user has set a desired zone configuration by toggling selected ones of the zones ON and OFF, he or she selects the SAVE button 258 to update the zone configuration setting for the Wireless Communication Doorbell 130. The user may then close the zone diagram 252 by selecting the BACK button 260, which may return the user to a previous screen (not shown) within the software application.

With further reference to FIG. 34, the GUI 250 further includes a range adjustment component 262 that enables the user to remotely modify the range of the Passive Infrared Sensors 144. In the illustrated embodiment, the range adjustment component 262 comprises a slider widget. A first end 264, or lower end, of the range of the slider widget 262 corresponds to a minimum range of the Passive Infrared Sensors 144, and a second end 266, or upper end, of the range of the slider widget 262 corresponds to a maximum range of the Passive Infrared Sensors 144. The first and second ends 264, 266 of the slider widget 262 may include text indicating the distance corresponding to the minimum and maximum ranges of the Passive Infrared Sensors 144. In the illustrated embodiment, the minimum range is indicated as approximately five feet, while the maximum range is indicated as approximately thirty feet. These ranges are merely examples, and are not limiting. In fact, in certain embodiments the textual indicators of the minimum and maximum ranges may not be provided at all.

With further reference to FIG. 34, the current setting of the range of the Passive Infrared Sensors 144 is indicated on the zone diagram 252 by contrasting colors or shades of the same color, with a darker area 268 indicating the area where the Passive Infrared Sensors 144 will trigger motion alerts (the ON area 268), and a lighter area 270 indicating the area where the Passive Infrared Sensors 144 will not trigger motion alerts (the OFF area 270). A transition area 272 between the ON area 268 and the OFF area 270 is indicated by a color/shade between the darker area 268 and the lighter area 270, with the color of the transition area 272 fading gradually toward the OFF area 270. In certain embodiments, the transition area 272 is part of the ON area 268, such that the Passive Infrared Sensors 144 will trigger motion alerts in the transition area 272, but in other embodiments the transition area 272 may be part of the OFF area 270, such that the Passive Infrared Sensors 144 will not trigger motion alerts in the transition area 272.

In the configuration of FIG. 34, the range of the Passive Infrared Sensors 144 is set roughly halfway between the minimum and maximum settings. By contrast, in the configuration of FIG. 39, the range of the Passive Infrared Sensors 144 is set to the minimum (slider widget 262 at first end 264), and in the configuration of FIG. 40, the range of the Passive Infrared Sensors 144 is set to the maximum (slider widget 262 at second end 266). When the user has set a desired range for the Passive Infrared Sensors 144, he or she selects the SAVE button 258 to update the range setting for the Wireless Communication Doorbell 130. The user may then close the zone diagram 252 by selecting the BACK button 260, which may return the user to a previous screen (not shown) within the software application. In the illustrated embodiment, the ranges of the Passive Infrared Sensors 144 may not be adjusted individually. That is, any movement of the slider widget 262 simultaneously adjusts the range of all of the Passive Infrared Sensors 144. However, alternative embodiments may enable the ranges of the Passive Infrared Sensors 144 to be adjusted individually.

In certain of the present embodiments, if the user closes the zone diagram 252 (whether by selecting the BACK button 260, or exiting the application, or by any other action) without selecting the SAVE button 258, then any changes that the user may have made to the settings for the Passive Infrared Sensors 144, such as toggling one or more of the sensors 144 on or off, or adjusting a range of one or more of the sensors 144, will not be saved and will not be sent to the Wireless Communication Doorbell 130.

Figure 41:
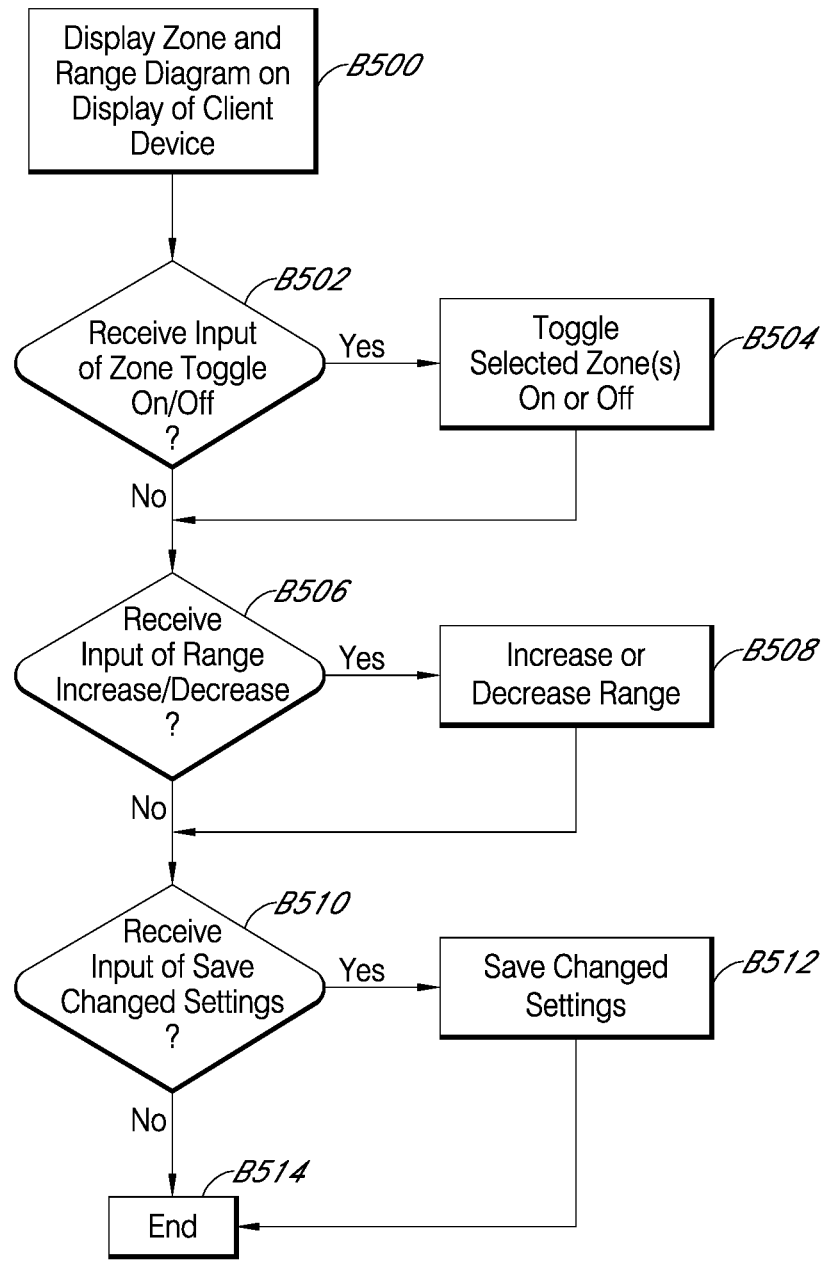
FIG. 41 is a flowchart showing operation of one aspect of the present disclosure.

FIG. 41 is a flowchart showing an embodiment of a process according to the present disclosure. According to the process shown in FIG. 41, a user may remotely modify the settings of the Wireless Communication Doorbell 130. Referring to FIGS. 34 and 41, at block B500 a diagram 252 of the field of view about the Wireless Communication Doorbell 130 is displayed on a display of the user's computer or mobile device. The diagram 252 facilitates modifying the zone and range settings of the Wireless Communication Doorbell 130. For example, the user may toggle selected ones of the zones ON and OFF and/or increase and decrease a range (or sensitivity) of the Passive Infrared Sensors 144, as described above with reference to FIGS. 34-40. The displaying of the diagram 252 on the display of the user's computer or mobile device may be performed by software executing on the user's computer or mobile device, for example.

With further reference to FIG. 41, at block B502 the process determines whether an input has been received to toggle a selected zone ON or OFF. The input may come from the user, for example according to the process described above with reference to FIGS. 34-38. If at least one input is received to toggle a selected zone ON or OFF, then the process moves to block B504, where the selected zone(s) is/are toggled ON or OFF. If, however, no input is received to toggle a selected zone ON or OFF, then the process moves to block B506.

At block B506, the process determines whether an input has been received to adjust the range of the Passive Infrared Sensors 144. The input may come from the user, for example according to the process described above with reference to FIGS. 34, 39, and 40. If an input is received to adjust the range of the Passive Infrared Sensors 144, then the process moves to block B508, where the range of the Passive Infrared Sensors 144 is increased or decreased. If, however, no input is received to adjust the range of the Passive Infrared Sensors 144, then the process moves to block B510.

At block B510, the process determines whether an input has been received to save any settings that may have been changed at either or both of block B502 and block B506. The input may come from the user, for example according to the processes described above with reference to FIGS. 34-40. If an input is received to save any changed settings, then the process moves to block B512, where the changed settings are saved, after which the process ends at block B514. If, however, no input is received to save any changed settings, then the process ends at block B514.

In certain embodiments, saving any changed settings may further comprise sending the changed settings to the system network 52, from which the Wireless Communication Doorbell 130 may subsequently download the changed settings. For example, to implement the new settings in the Wireless Communication Doorbell 130, the system network 52 may communicate with the Wireless Communication Doorbell 130. In the process of the communication, the system network 52 may provide the updated user settings and instruct the Wireless Communication Doorbell 130 to overwrite any previous settings. This process may be performed in various ways. For example, and without limitation, the user may press the button 133 on the Wireless Communication Doorbell 130, thereby causing the communication to occur, or the Wireless Communication Doorbell 130 may detect motion and then initiate the communication with the system network 52, or a regular "check in" communication between the system network 52 and the Wireless Communication Doorbell 130 may be implemented. In one aspect of the present disclosure, the changed settings may be compiled into a single communication to the Wireless Communication Doorbell 130 containing instructions for all zones, instead of sending numerous communications, piecemeal, for each zone.

After the settings of the Wireless Communication Doorbell 130 are changed, as described above, the user may then receive notifications consistent with the changed settings. In one aspect of the present disclosure, the system of the present disclosure may implement the settings by running software capable of analyzing the inputs from the Passive Infrared Sensors 144, and then checking to see if the input is in accordance with the preferred settings. For example, assume the user modifies Zone 5, as shown in FIG. 29, so that no motion alerts are generated for any movement farther than ten feet away from the Wireless Communication Doorbell 130 in Zone 5. Also assume for purposes of this example that Passive Infrared Sensor 144-3, which is responsible for Zone 5, has a maximum range of fifty feet, and thus can detect movement up to fifty feet away. The Wireless Communication Doorbell 130 may analyze movement based on the input from Passive Infrared Sensor 144-3, and may determine the distance of the movement from the Wireless Communication Doorbell 130. If the Wireless Communication Doorbell 130 determines that the distance of the movement from the Wireless Communication Doorbell 130 is greater than ten feet, the Wireless Communication Doorbell 130 may ignore or filter out the movement and not initiate a communication with the system network 52 (and the user will thus not receive a motion alert). The Wireless Communication Doorbell 130 may apply these principles to all zones and settings, and may also provide features that take into account possible false positive triggers, such as certain temperature conditions, light conditions, and/or moisture conditions, and determine whether a given input is a false detection. Whether or not false detections are ignored or filtered out may be governed by the preferred settings saved by the user.

In another aspect of the present disclosure, the user may manipulate physical controls, such as switches, sliders, or dials (not shown), located on the Wireless Communication Doorbell 130, in lieu of doing so with a remote software application.

In some embodiments, an aspect of the present disclosure comprises a graphical user interface (GUI) displayed on a display of a computing device for enabling modification of motion zones for a wireless communication doorbell. The GUI may comprise a diagram of a field of view about the wireless communication doorbell, the diagram including a plurality of motion zones within the field of view, with each motion zone delineated by boundary lines and enumerated with a unique motion zone identifier, wherein the zone diagram further includes an ON/OFF indicator for each motion zone. In some embodiments, each unique zone identifier may comprise a number. In some embodiments, the zone diagram may be a top view. Some embodiments may further comprise a range adjustment component that enables a range of each of the motion zones to be modified. In some embodiments, the range adjustment component may comprise a slider widget. In some embodiments, contrasting colors or shades of the same color may indicate areas where motion alerts will be triggered and areas where motion alerts will not be triggered. In some embodiments, the areas where motion alerts will be triggered may be indicated by a dark color or shade and the areas where motion alerts will not be triggered may be indicated by a light color or shade. Some embodiments may further comprise a transition area between the dark areas and the light areas, the transition area having a gradually changing color or shade.

Figure 42:
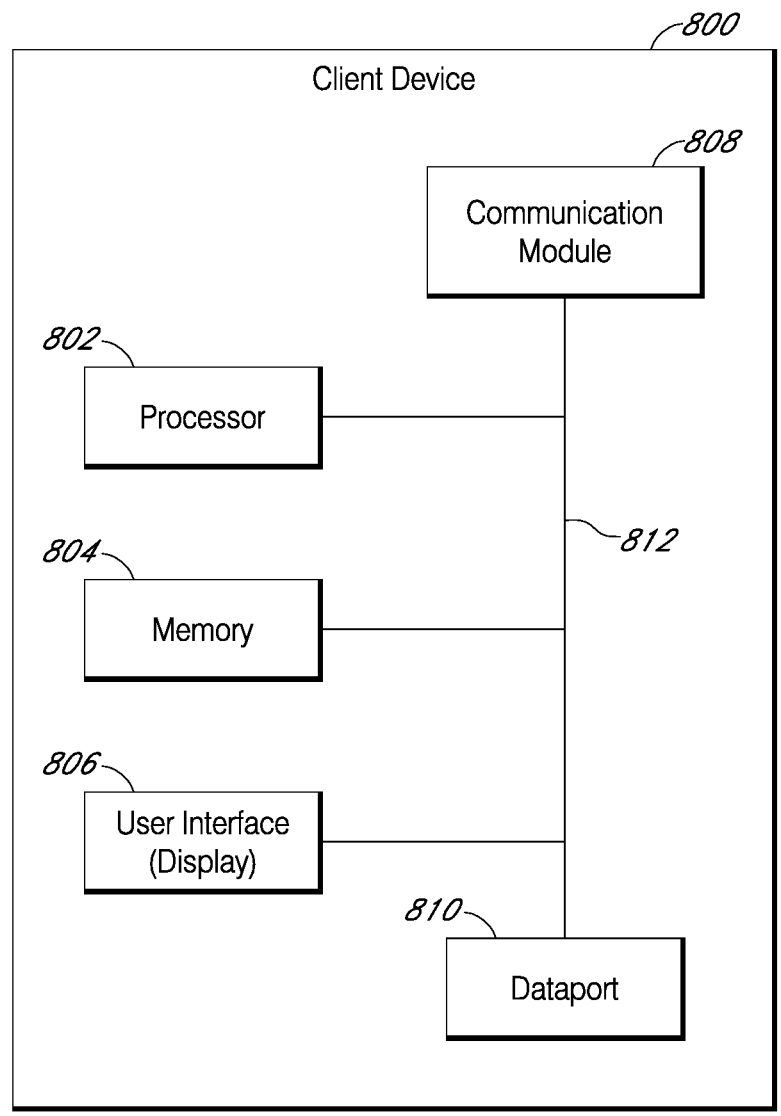
FIG. 42 is a functional block diagram of a client device on which the present embodiments may be implemented according to various aspects of the present disclosure.

FIG. 42 is a functional block diagram of a client device 800 on which the present embodiments may be implemented according to various aspects of the present disclosure. The client device 800 may comprise, for example, a smartphone.

With reference to FIG. 42, the client device 800 includes a processor 802, a memory 804, a user interface 806, a communication module 808, and a dataport 810. These components are communicatively coupled together by an interconnect bus 812. The processor 802 may include any processor used in smartphones and/or portable computing devices, such as an ARM processor (a processor based on the RISC (reduced instruction set computer) architecture developed by Advanced RISC Machines (ARM).). In some embodiments, the processor 802 may include one or more other processors, such as one or more conventional microprocessors, and/or one or more supplementary co-processors, such as math co-processors.

The memory 804 may include both operating memory, such as random access memory (RAM), as well as data storage, such as read-only memory (ROM), hard drives, flash memory, or any other suitable memory/storage element. The memory 804 may include removable memory elements, such as a CompactFlash card, a MultiMediaCard (MMC), and/or a Secure Digital (SD) card. In some embodiments, the memory 804 may comprise a combination of magnetic, optical, and/or semiconductor memory, and may include, for example, RAM, ROM, flash drive, and/or a hard disk or drive. The processor 802 and the memory 804 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 802 may be connected to the memory 804 via the dataport 810.

The user interface 806 may include any user interface or presentation elements suitable for a smartphone and/or a portable computing device, such as a keypad, a display screen, a touchscreen, a microphone, and a speaker. The communication module 808 is configured to handle communication links between the client device 800 and other, external devices or receivers, and to route incoming/outgoing data appropriately. For example, inbound data from the dataport 810 may be routed through the communication module 808 before being directed to the processor 802, and outbound data from the processor 802 may be routed through the communication module 808 before being directed to the dataport 810. The communication module 808 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 810 may be any type of connector used for physically interfacing with a smartphone and/or a portable computing device, such as a mini-USB port or an IPHONE®/IPOD® 30-pin connector or LIGHTNING® connector. In other embodiments, the dataport 810 may include multiple communication channels for simultaneous communication with, for example, other processors, servers, and/or client terminals.

The memory 804 may store instructions for communicating with other systems, such as a computer. The memory 804 may store, for example, a program (e.g., computer program code) adapted to direct the processor 802 in accordance with the present embodiments. The instructions also may include program elements, such as an operating system. While execution of sequences of instructions in the program causes the processor 802 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 43:
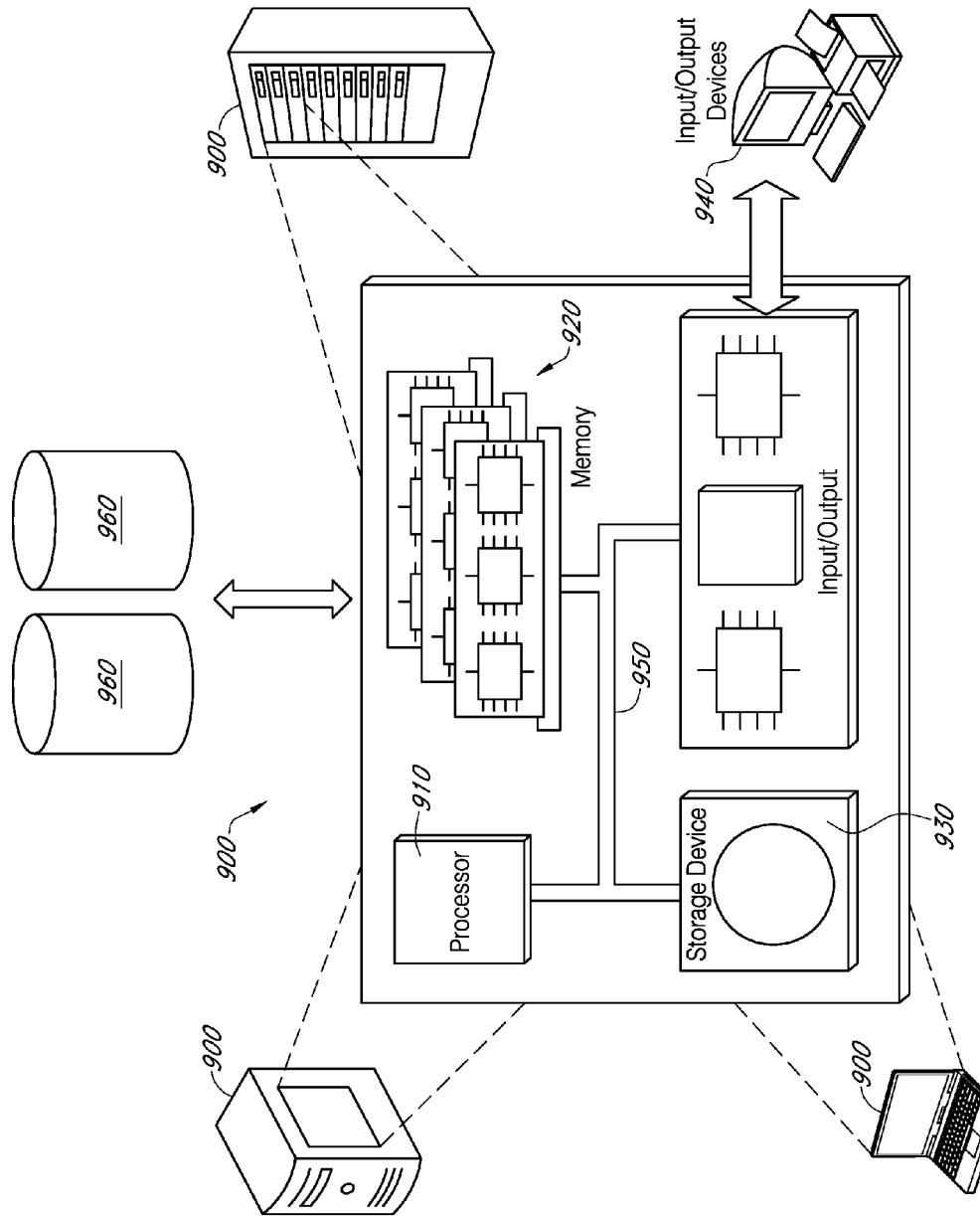
FIG. 43 is a diagram displaying a general purpose computer on which the system and method of the present disclosure may be implemented according to an aspect of present disclosure.

FIG. 43 is a functional block diagram of a general-purpose computing system on which the present embodiments may be implemented according to various aspects of present disclosure. The computer system 900 may execute at least some of the operations described above. The computer system 900 may include at least one processor 910, memory 920, at least one storage device 930, and input/output (I/O) devices 940. Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The memory 920 may store information, and may be a computer-readable medium, such as volatile or non-volatile memory. The storage device(s) 930 may provide storage for the system 900, and may be a computer-readable medium. In various aspects, the storage device(s) 930 may be a flash memory device, a hard disk device, an optical disk device, a tape device, or any other type of storage device.

The I/O devices 940 may provide input/output operations for the system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

The invention claimed is:

1. A method for a client device associated with a doorbell having a plurality of motion sensors, the method comprising:
    displaying, on a graphical user interface (GUI) displayed on a display of the client device, a plurality of motion zones, wherein each of the motion zones represents a range of motion detection for a field of view of at least one of the motion sensors of the doorbell;
    receiving an input to adjust the range of motion detection of the motion sensors;
    determining whether any of the plurality of motion zones is selected for motion detection, wherein the selected motion zone or zones are displayed in a darker color on the GUI and unselected motion zones are displayed in a lighter color on the GUI; and
    adjusting, based on the received input, the range of motion detection for at least a subset of the motion sensors that is associated with the selected motion zone or zones.

2. The method of claim 1 further comprising receiving an input to save the adjusted motion detection range as a current motion detection sensitivity of the doorbell.

3. The method of claim 1, wherein receiving the input to adjust the range comprises receiving an input to increase a distance within which the motion sensors detect motion.

4. The method of claim 1, wherein receiving the input to adjust the range comprises receiving an input to decrease a distance within which the motion sensors detect motion.

5. A method for a client device associated with a doorbell having a plurality of motion sensors, the method comprising:
    displaying, on a graphical user interface (GUI) displayed on a display of the client device, a plurality of motion zones, wherein each of the motion zones represents a range of motion detection for a field of view of at least one of the motion sensors of the doorbell;
    displaying, on the GUI, a slider for adjusting the range
    receiving an input to adjust the range of motion detection of the motion sensors, wherein receiving the input to adjust the range comprises receiving movement of the slider;
    determining whether any of the plurality of motion zones is selected for motion detection; and
    adjusting, based on the received input, the range of motion detection for at least a subset of the motion sensors that is associated with the selected motion zone or zones.

6. The method of claim 5, wherein the movement of the slider toward a first direction increases a distance within which the motion sensors detect motion, and wherein the movement of the slider toward a second direction decreases the distance within which the motion sensors detect the motion.

7. The method of claim 5, wherein the selected motion zone or zones are displayed in a darker color on the GUI and unselected motion zones are displayed in a lighter color on the GUI.

8. A method for a client device associated with a doorbell having a plurality of motion sensors, the method comprising:
    displaying, on a graphical user interface (GUI) displayed on a display of the client device, a plurality of motion zones on a diagram comprising boundary lines that separate the motion zones and each motion zone is enumerated with a unique zone number, wherein each of the motion zones represents a range of motion detection for a field of view of at least one of the motion sensors of the doorbell;
    receiving an input to adjust the range of motion detection of the motion sensors;
    determining whether any of the plurality of motion zones is selected for motion detection; and
    adjusting, based on the received input, the range of motion detection for at least a subset of the motion sensors that is associated with the selected motion zone or zones.

9. The method of claim 8, wherein the diagram further comprises an indicator for each of the motion zones, the indicator for indicating whether the motion zone is selected or unselected.

10. The method of claim 1, wherein adjusting the range of motion detection of motion sensors that are associated with the selected motion zone or zones comprises adjusting a motion detection distance from the doorbell for each motion sensor that is associated with the selected motion zone or zones.

11. The method of claim 1, wherein the client device receives a motion alert from each motion sensor that is associated with the selected motion zone or zones when the motion sensor detects motion within the motion detection range of the motion sensor.

12. The method of claim 11, wherein the client device further receives audio/video data from a camera of the doorbell when the motion sensor detects motion within the motion detection range of the motion sensor.

13. A non-transitory machine-readable medium of a client device associated with a doorbell comprising video camera and a plurality of motion sensors, the non-transitory machine-readable medium storing a program executable by at least one processing unit of the client device, the program comprising sets of instructions for:

displaying, on a graphical user interface (GUI) displayed on a display of the client device, a plurality of motion zones on a diagram comprising boundary lines that separate the motion zones and each motion zone is enumerated with a unique zone number, wherein each of the motion zones represents a range of motion detection for a field of view of at least one of the motion sensors of the doorbell, and wherein when any of the motion sensors detects motion within the motion detection range of the motion sensor, the camera starts capturing video images of an area within a field of view of the video camera;

receiving an input to increase the range of motion detection of the motion sensors;

determining whether any of the plurality of motion zones is selected for motion detection; and increasing, based on the received input, the range of motion detection for at least a subset of the motion sensors that is associated with the selected motion zone or zones.

14. The non-transitory machine-readable medium of claim 13, wherein the plurality of motion sensors comprises at least one Passive Infrared (PIR) motion sensor.

15. The non-transitory machine-readable medium of claim 13, wherein the program further comprises a set of instructions for receiving a motion alert from each motion sensor that is associated with a selected motion zone when the motion sensor detects motion within the motion detection range of the motion sensor.

16. The non-transitory machine-readable medium of claim 13, wherein the program further comprises a set of instructions for displaying, on the GUI, numbers that are indicative of minimum and maximum motion detection ranges of the motion sensors.

17. The non-transitory machine-readable medium of claim 13, wherein the program further comprises a set of instructions for receiving an input to decrease the range of motion detection of the motion sensors.

18. A non-transitory machine-readable medium of a client device associated with a doorbell comprising a plurality of motion sensors, the non-transitory machine-readable medium storing a program executable by at least one processing unit of the client device, the program comprising sets of instructions for:

displaying, on a graphical user interface (GUI) displayed on a display of the client device, a plurality of motion zones, wherein each of the motion zones represents a range of motion detection for a field of view of at least one of the motion sensors of the doorbell;

displaying, on the GUI, a slider for adjusting the range;

receiving movement of the slider to adjust the range of motion detection of the motion sensors;

determining whether any of the plurality of motion zones is selected for motion detection; and adjusting, based on the received input, the range of motion detection for at least a subset of the motion sensors that is associated with the selected motion zone or zones.

19. The non-transitory machine-readable medium of claim 18, wherein the set of instructions for displaying the plurality of motion zones comprises a set of instructions for displaying, on the GUI, the selected motion zone or zones in a darker color and unselected motion zones in a lighter color.

20. The non-transitory machine-readable medium of claim 18, wherein the program further comprises a set of instructions for receiving a motion alert from each motion sensor that is associated with a selected motion zone when the motion sensor detects motion within the motion detection range of the motion sensor.

* * * * *